United States Patent
Shiotani et al.

(10) Patent No.: US 10,779,214 B2
(45) Date of Patent: Sep. 15, 2020

(54) MULTI-HOP COMMUNICATION

(71) Applicants: Yoshimitsu Shiotani, Kanagawa (JP); Kengo Matsuyama, Tokyo (JP); Shintaro Kawamura, Kanagawa (JP)

(72) Inventors: Yoshimitsu Shiotani, Kanagawa (JP); Kengo Matsuyama, Tokyo (JP); Shintaro Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/332,894

(22) PCT Filed: Sep. 21, 2017

(86) PCT No.: PCT/JP2017/034107
§ 371 (c)(1),
(2) Date: Mar. 13, 2019

(87) PCT Pub. No.: WO2018/061979
PCT Pub. Date: Apr. 5, 2018

(65) Prior Publication Data
US 2019/0261245 A1    Aug. 22, 2019

(30) Foreign Application Priority Data
Sep. 27, 2016    (JP) ................ 2016-187777

(51) Int. Cl.
*H04W 40/04*    (2009.01)
*H04W 76/14*    (2018.01)
(Continued)

(52) U.S. Cl.
CPC ........... *H04W 40/04* (2013.01); *H04W 16/32* (2013.01); *H04W 40/02* (2013.01);
(Continued)

(58) Field of Classification Search
CPC ..... H04W 40/04; H04W 76/14; H04W 16/32; H04W 40/02; H04W 40/248; H04W 40/34; H04W 88/04; H04W 88/06; H04W 84/20
See application file for complete search history.

(56) References Cited

U.S. PATENT DOCUMENTS 7,218,891 B2    5/2007    Periyalwar et al.
8,325,643 B2    12/2012    Tocze et al.
(Continued)

FOREIGN PATENT DOCUMENTS

JP    2007-104629    4/2007
JP    2009-296184    12/2009
(Continued)

OTHER PUBLICATIONS

International Search Report dated Dec. 14, 2017 in PCT/JP2017/034107 filed on Sep. 21, 2017.
(Continued)

*Primary Examiner* — Duc C Ho
(74) *Attorney, Agent, or Firm* — IPUSA, PLLC

(57) ABSTRACT

A communication system includes: distributed control devices that use a first wireless communication to form network cells and to control communication devices coupled to the network cells based on multi-hop communication; relay devices coupled to a network cell that use the first wireless communication to transfer data between the distributed control devices; and a central control device that manages communication paths for transferring the data among the distributed control devices located in the communication path.

20 Claims, 37 Drawing Sheets

(51) Int. Cl.
  *H04W 16/32* (2009.01)
  *H04W 40/24* (2009.01)
  *H04W 40/34* (2009.01)
  *H04W 88/04* (2009.01)
  *H04W 88/06* (2009.01)
  *H04W 40/02* (2009.01)
  *H04W 84/20* (2009.01)

(52) U.S. Cl.
  CPC ......... *H04W 40/248* (2013.01); *H04W 40/34* (2013.01); *H04W 76/14* (2018.02); *H04W 88/04* (2013.01); *H04W 88/06* (2013.01); *H04W 84/20* (2013.01)

(56) References Cited

U.S. PATENT DOCUMENTS

| | | |
|---|---|---|
| 9,210,551 B2 | 12/2015 | Shiotani |
| 10,009,257 B2 | 6/2018 | Shiotani |
| 10,057,788 B2 | 8/2018 | Shiotani |
| 2003/0012164 A1 | 1/2003 | Mizoguchi et al. |
| 2003/0063585 A1 | 4/2003 | Younis et al. |
| 2008/0311930 A1 | 12/2008 | Kalhan |
| 2009/0232049 A1* | 9/2009 | Singh .................... H04W 84/18 370/328 |
| 2016/0007351 A1 | 1/2016 | Shiotani |
| 2016/0205613 A1* | 7/2016 | Watanabe ............. H04W 40/30 370/254 |
| 2016/0301604 A1 | 10/2016 | Wang et al. |
| 2017/0127308 A1* | 5/2017 | Li .................... H04W 72/0433 |
| 2017/0339732 A1 | 11/2017 | Matsuyama et al. |
| 2018/0042031 A1* | 2/2018 | Hampel ................ H04W 72/04 |

FOREIGN PATENT DOCUMENTS

| | | |
|---|---|---|
| JP | 2010-531559 | 9/2010 |
| JP | 2013-005055 | 1/2013 |
| JP | 2013-197909 | 9/2013 |
| JP | 2013-197928 | 9/2013 |
| JP | 2014-027616 | 2/2014 |
| JP | 2015-204509 | 11/2015 |
| JP | 2016-144034 | 8/2016 |
| JP | 2016-154299 | 8/2016 |
| JP | 2016-225744 | 12/2016 |
| JP | 2016-225922 | 12/2016 |
| JP | 2017-055414 | 3/2017 |
| JP | 2017-103586 | 6/2017 |
| JP | 2017-208649 | 11/2017 |
| JP | 2017-212714 | 11/2017 |
| WO | 2001/054353 | 7/2001 |
| WO | 2014/183693 | 11/2014 |

OTHER PUBLICATIONS

Taiwanese Office Action for 106132695 dated Aug. 17, 2018 (with English translation).

Office Action dated Jul. 14, 2020 issued with respect to the corresponding Japanese Patent Application No. 2016-187777.

* cited by examiner

[Fig. 1A]
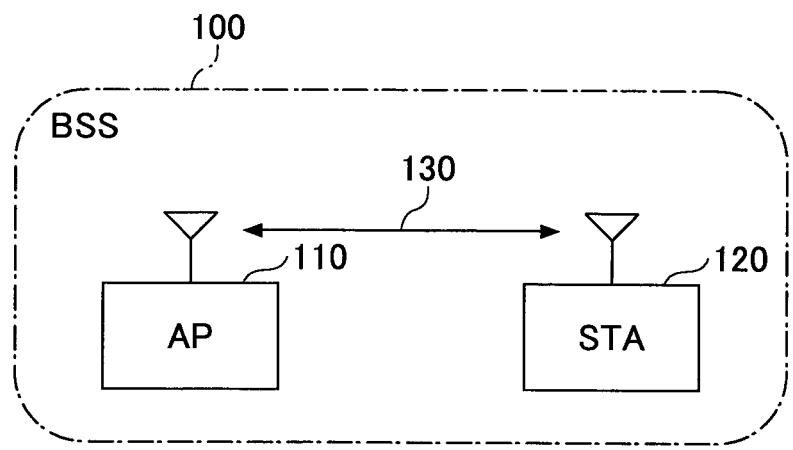
[Fig. 1B]
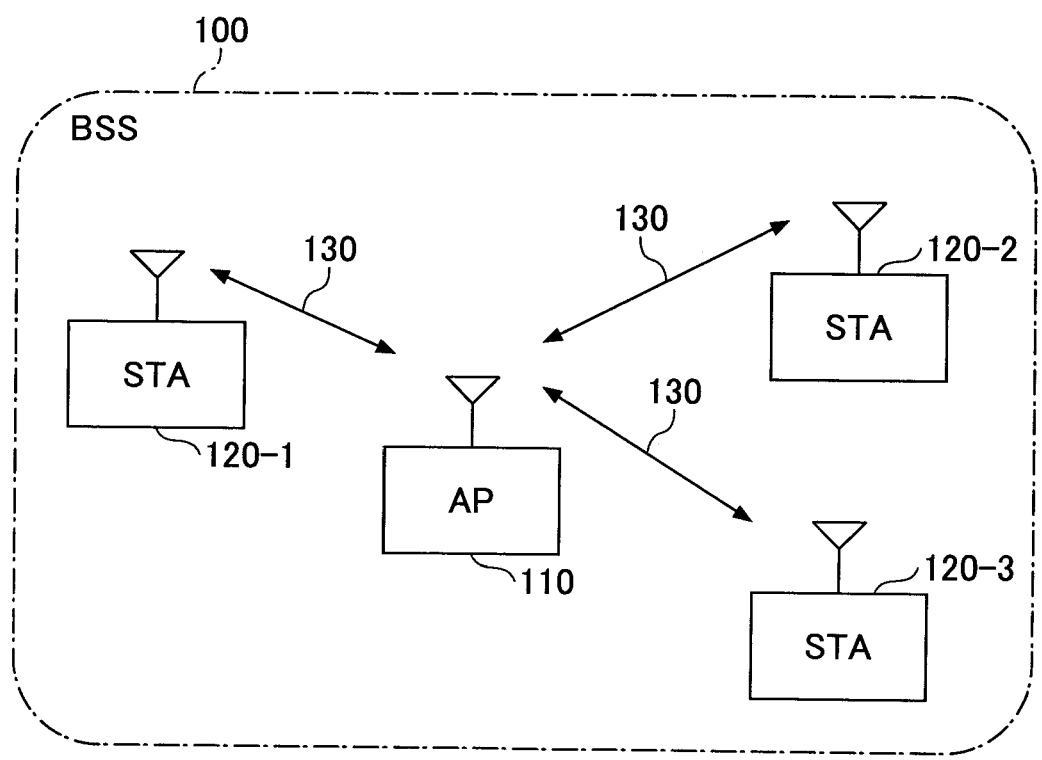

[Fig. 2A]
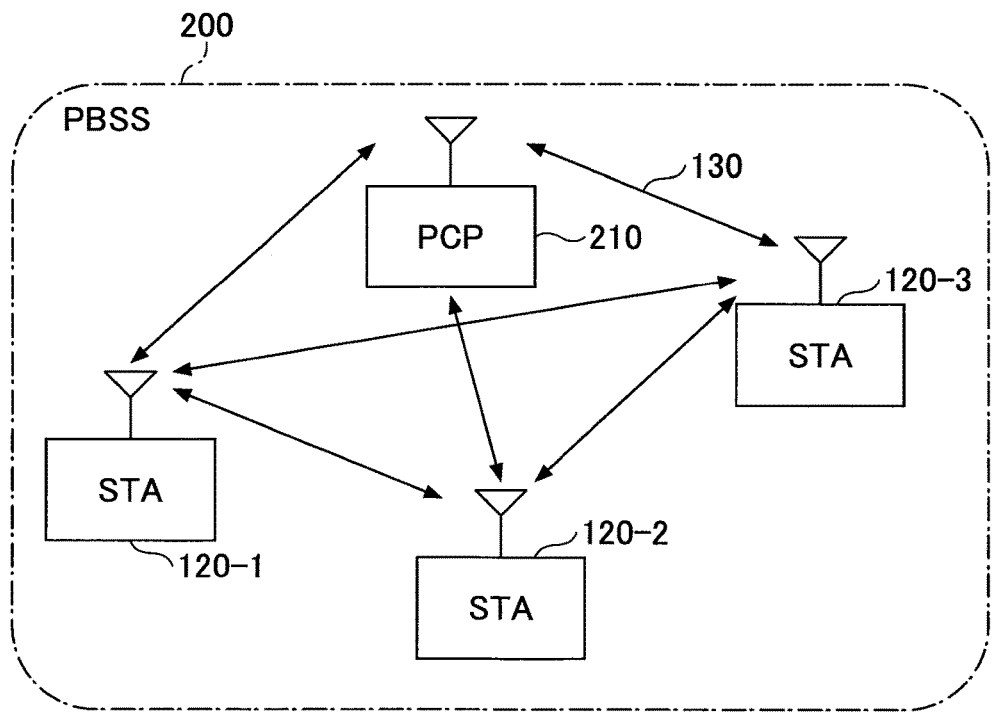
[Fig. 2B]
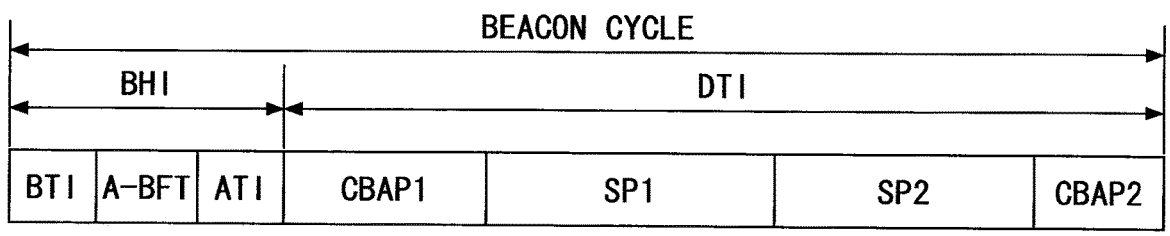

[Fig. 3]
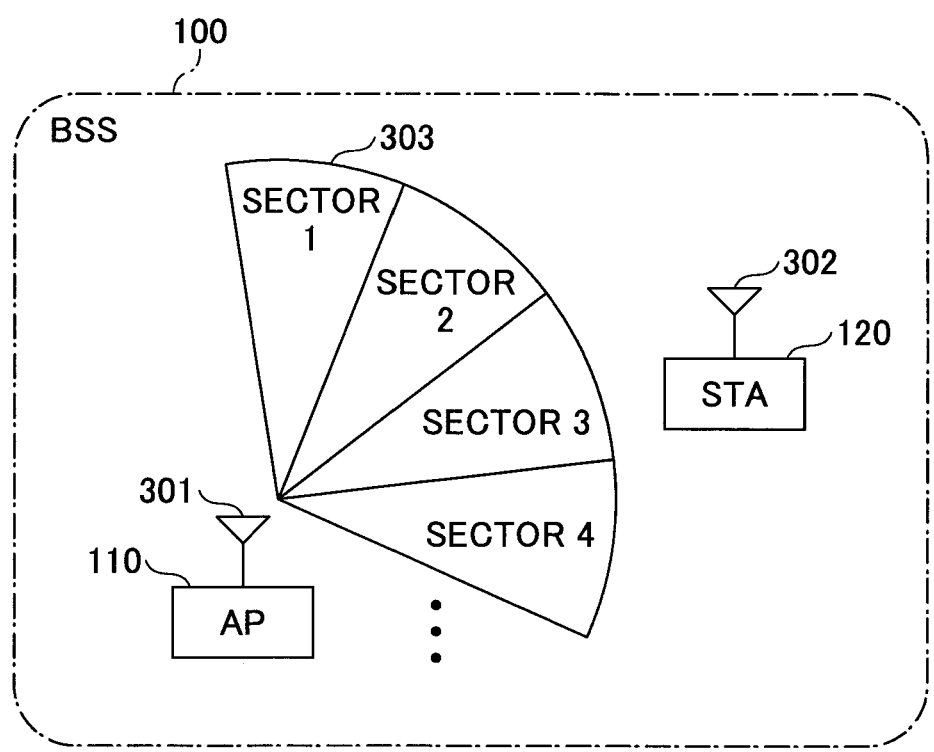

[Fig. 4]
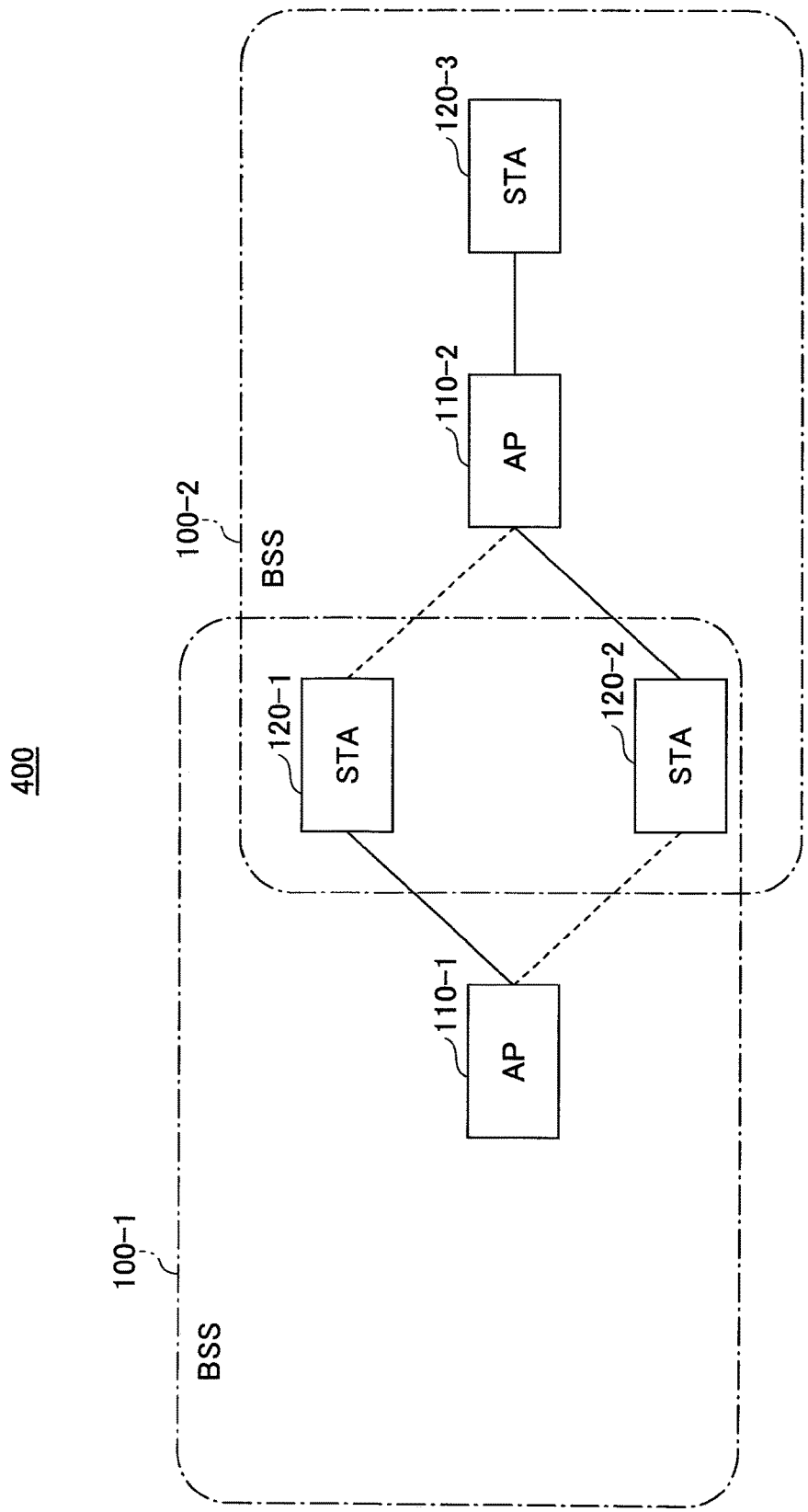

[Fig. 5]
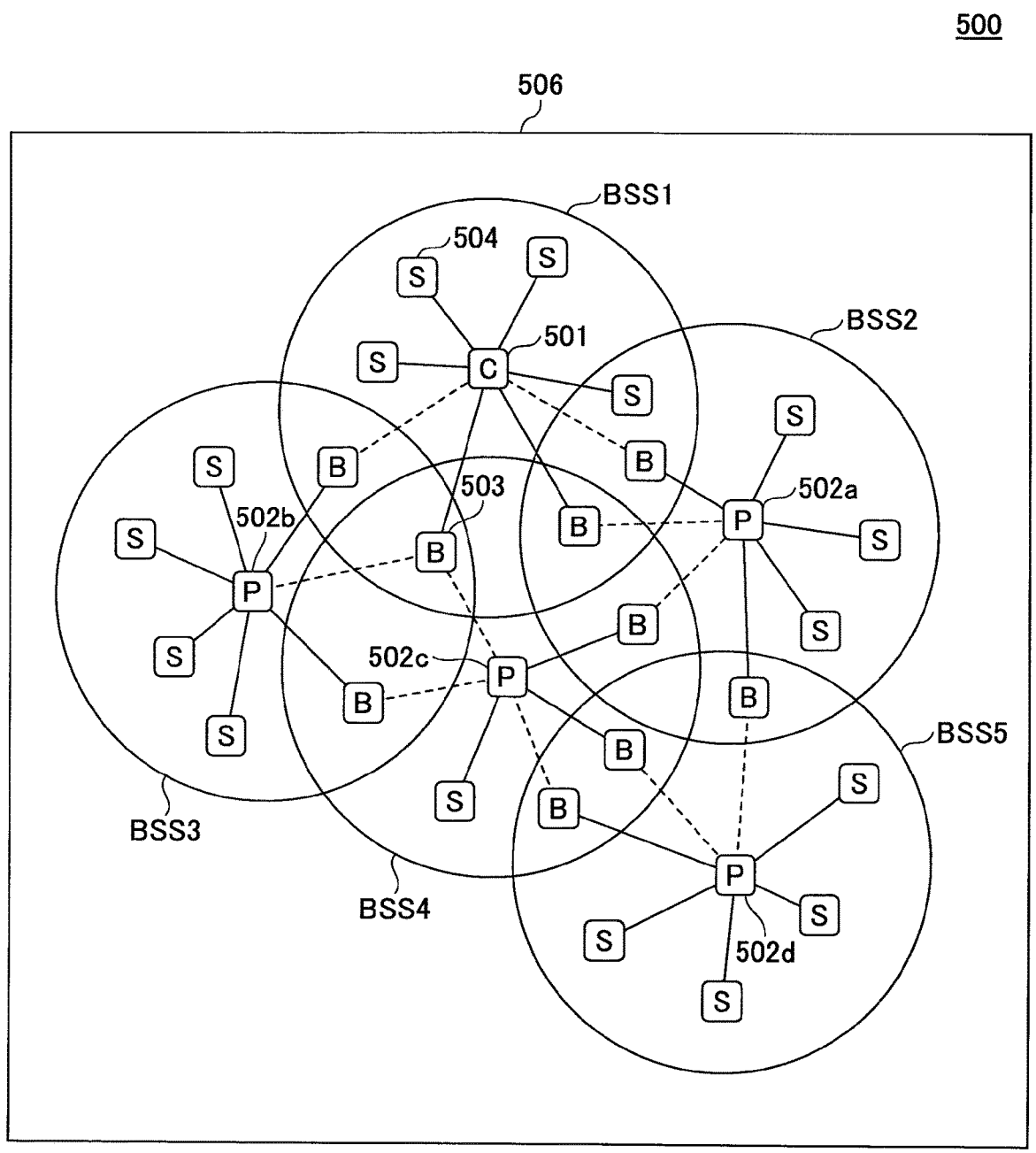

[Fig. 6]
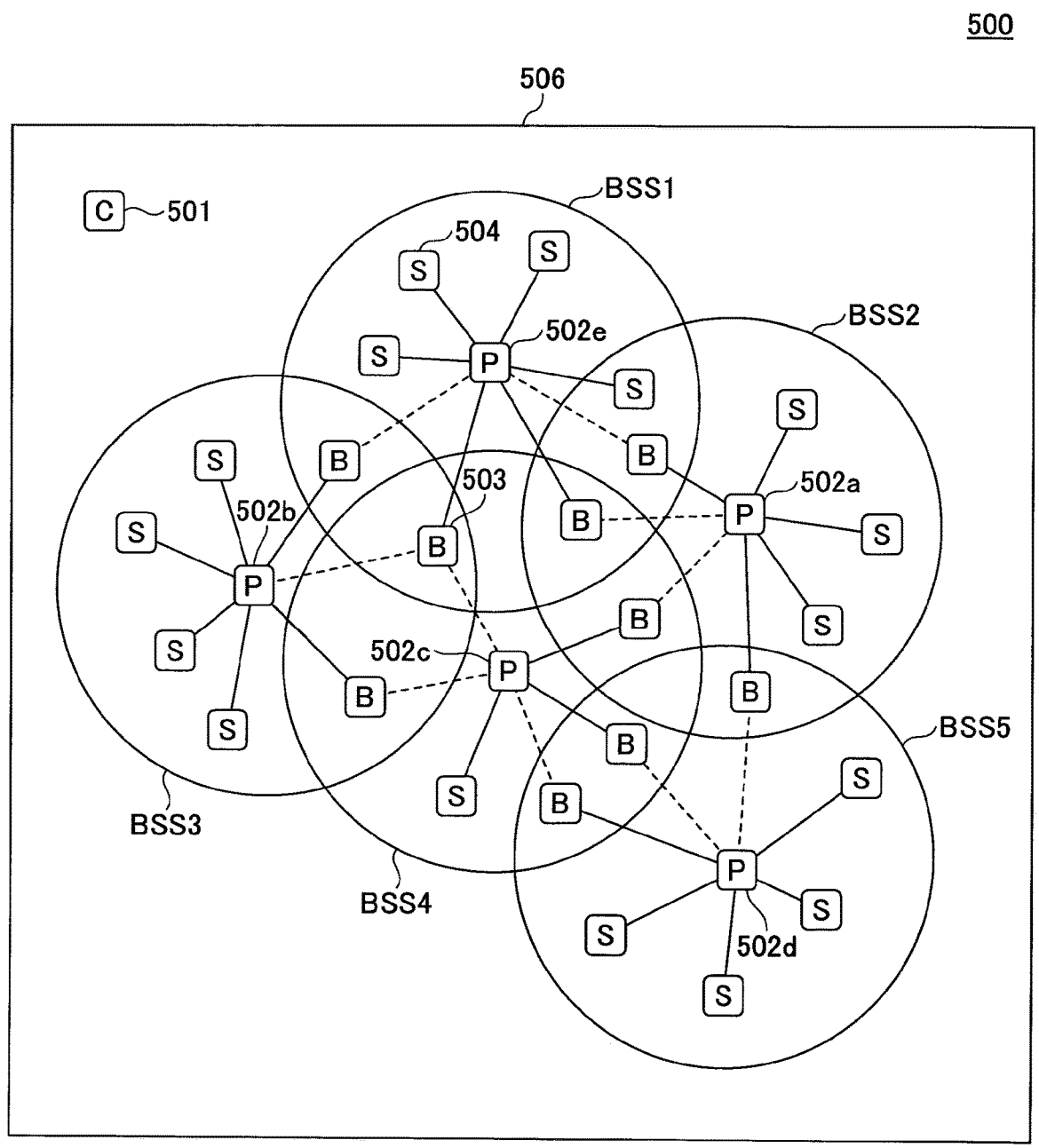

[Fig. 7A]
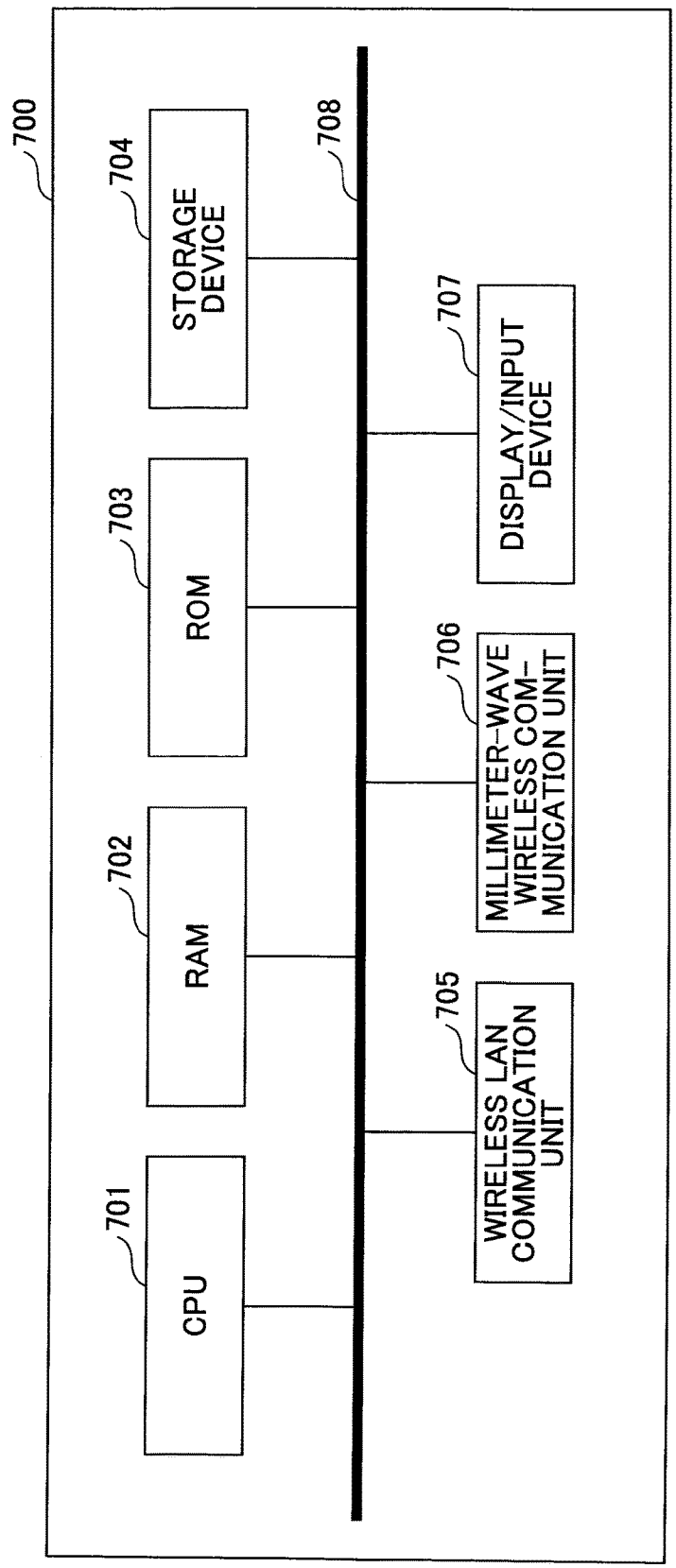

[Fig. 7B]
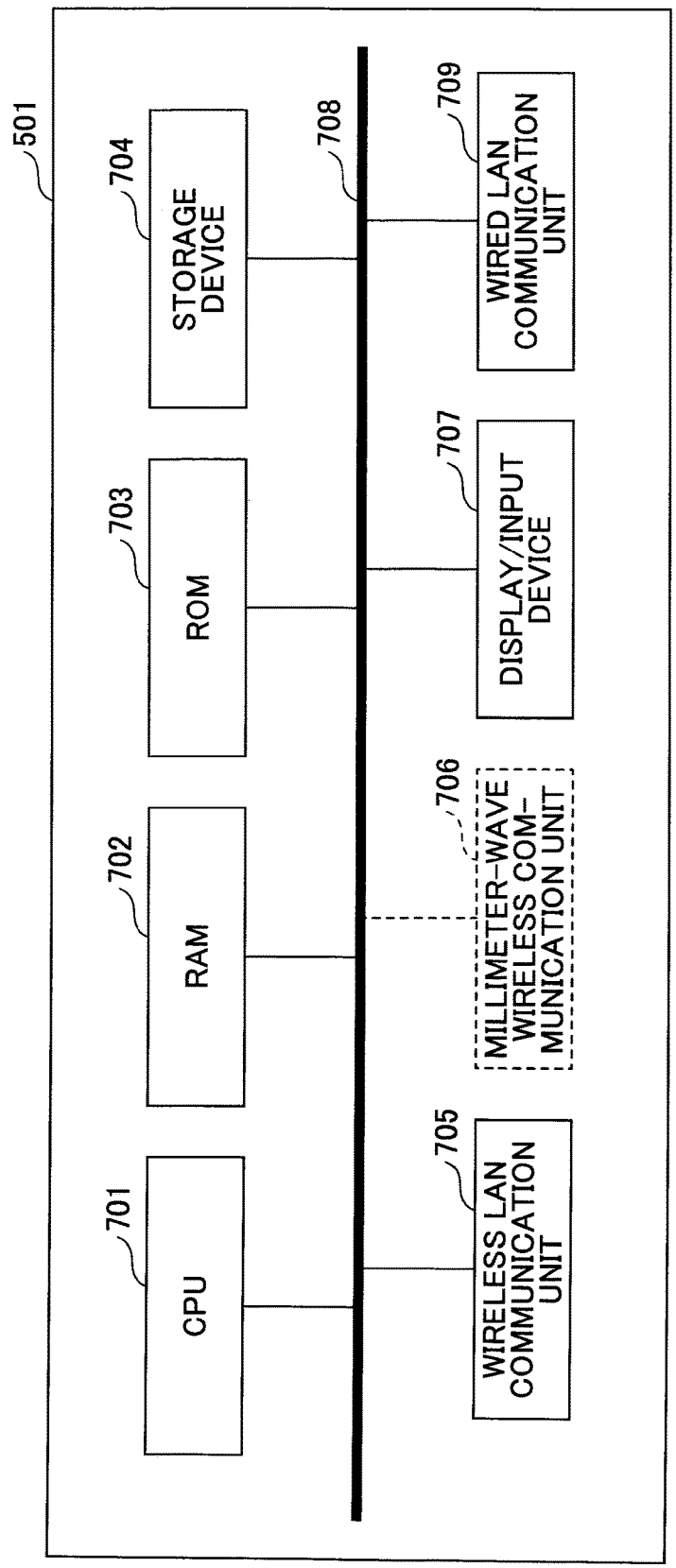

[Fig. 8]
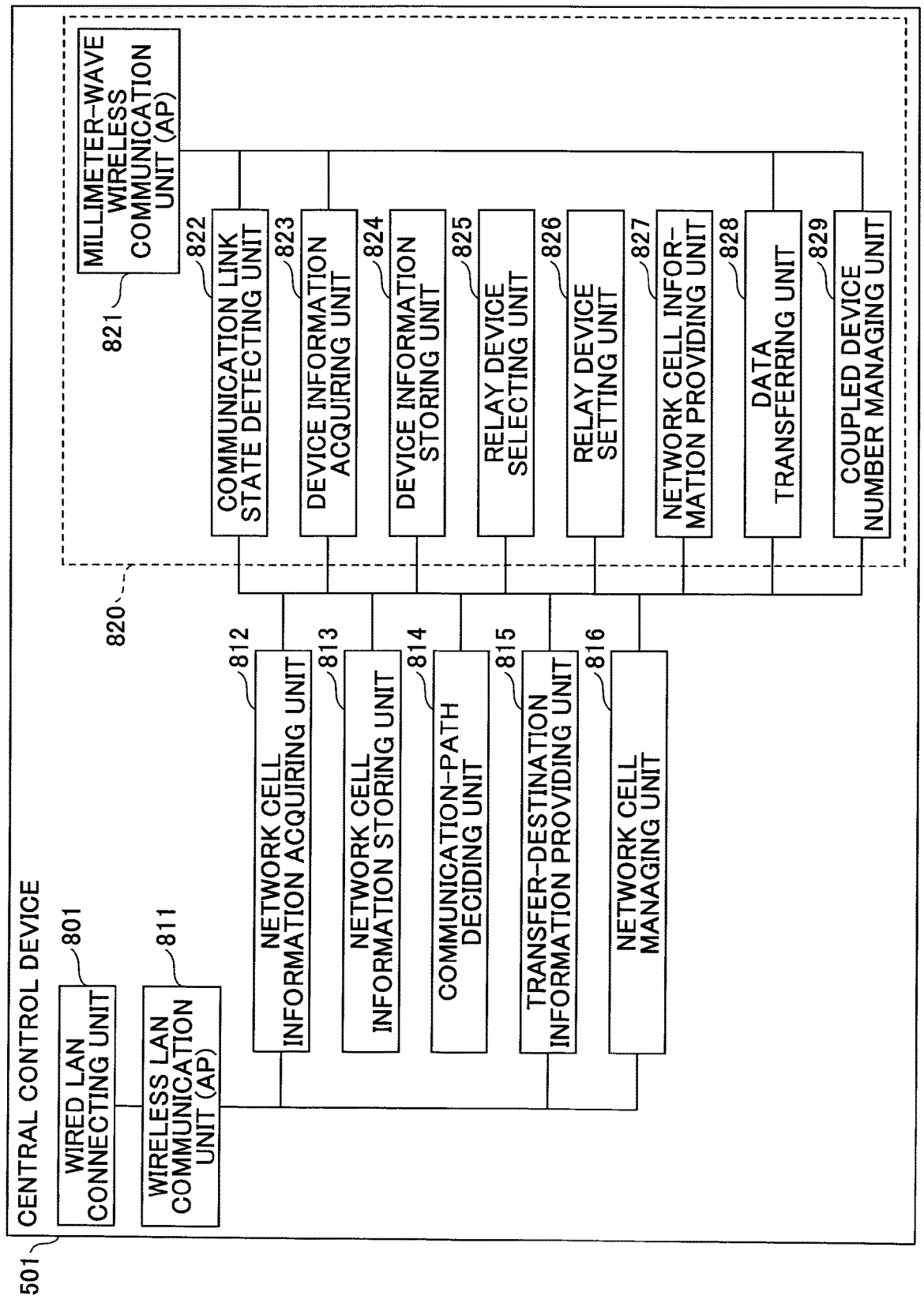

[Fig. 9]
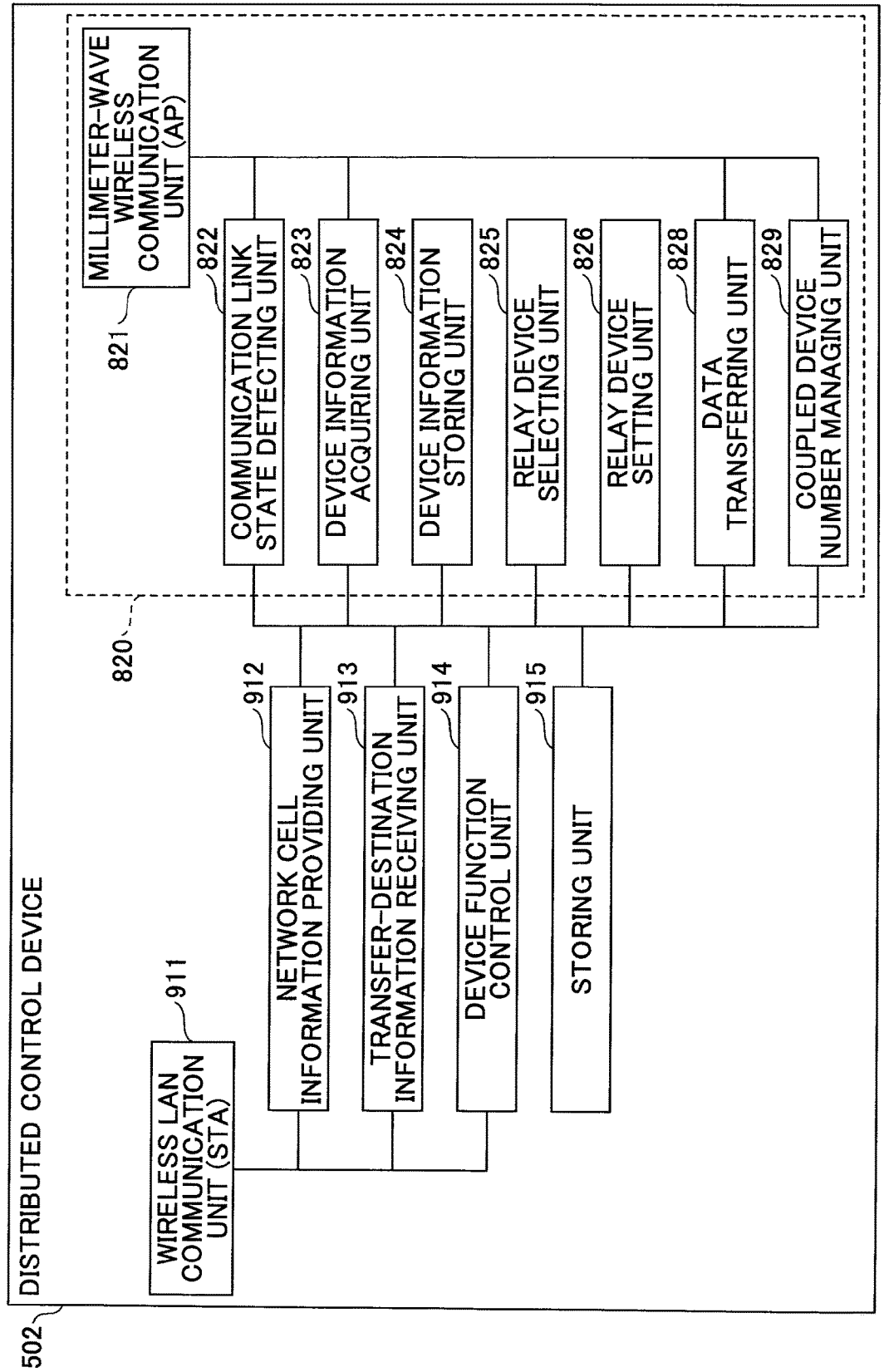

[Fig. 10A]
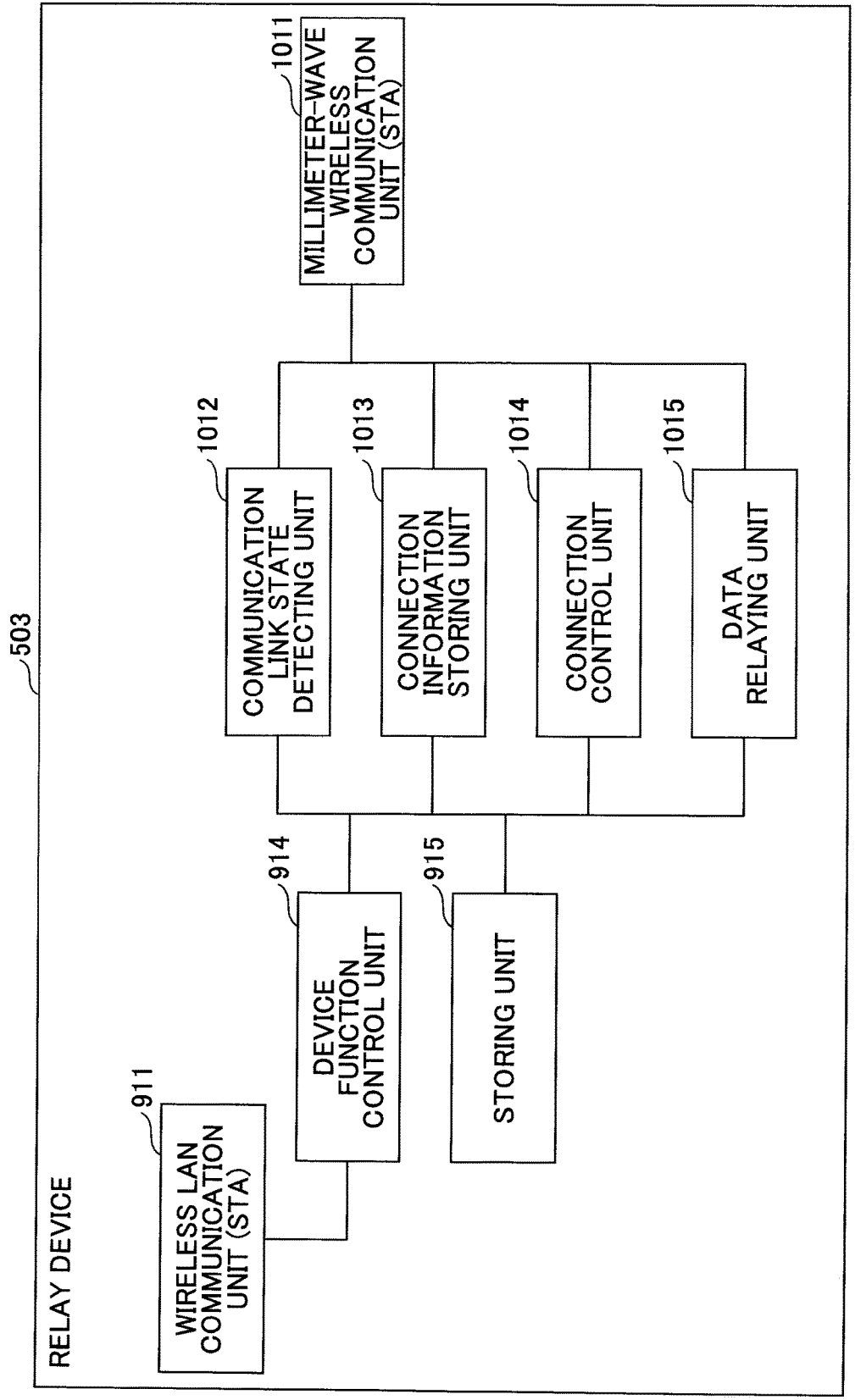

[Fig. 10B]
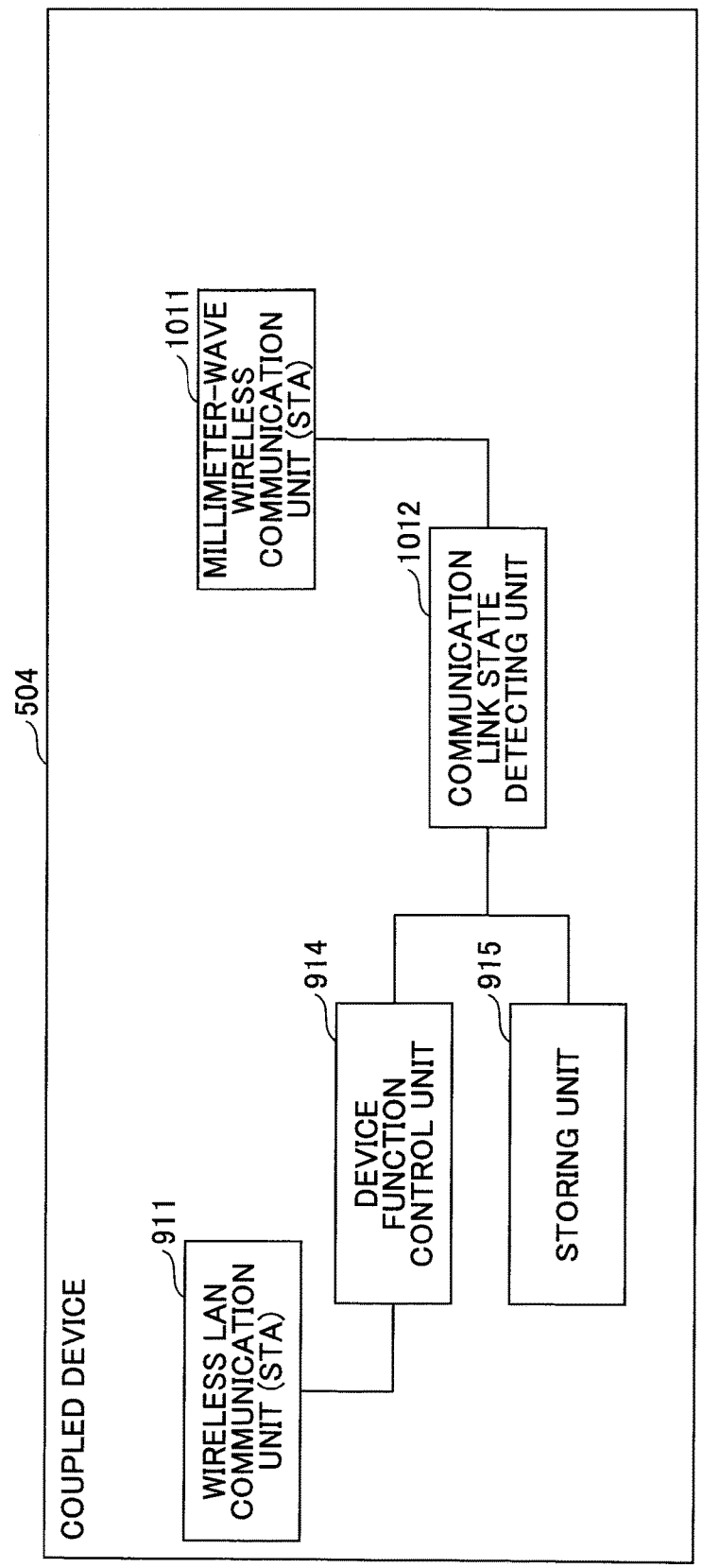

[Fig. 11A]

| NETWORK CELL NUMBER | BSSID | SSID | IP ADDRESS OF AP | | NUMBER OF COUPLED DEVICES | COMMU-NICATION CHANNEL | AP THAT CAN BE RELAYED TO 1110 | | |
|---|---|---|---|---|---|---|---|---|---|
| | | | MILLI-METER-WAVE | WIRE-LESS LAN | | | BSSID | SSID | |
| BSS1 | xx:xx:xx:xx:xx:01 | SSID001 | x.x.x.11 | y.y.y.21 | 6 | 1 | xx:xx:xx:xx:xx:02 | SSID002 | ⋮ |
| | | | | | | | xx:xx:xx:xx:xx:03 | SSID003 | ⋮ |
| | | | | | | | xx:xx:xx:xx:xx:04 | SSID004 | |
| BSS2 | xx:xx:xx:xx:xx:02 | SSID002 | x.x.x.12 | y.y.y.22 | 5 | 2 | xx:xx:xx:xx:xx:01 | SSID001 | ⋮ |
| | | | | | | | xx:xx:xx:xx:xx:05 | SSID005 | ⋮ |
| ⋮ | ⋮ | ⋮ | ⋮ | ⋮ | ⋮ | ⋮ | ⋮ | ⋮ | ⋮ |

[Fig. 11B]

| COUPLED DEVICE NUMBER | IP ADDRESS OF COMMUNICATION DEVICE | | LQ VALUE | THROUGH-PUT VALUE | MCS VALUE | RELAY DEVICE | AP THAT CAN BE COUPLED TO 1120 | | ⋮ |
|---|---|---|---|---|---|---|---|---|---|
| | MILLI-METER-WAVE | WIRE-LESS LAN | | | | | BSSID | SSID | |
| 1 | x.x.x.31 | y.y.y.41 | xxxx | xxxx | xxxx | YES | xx:xx:xx:xx:xx:02 | SSID002 | ⋮ |
| 2 | x.x.x.32 | y.y.y.42 | xxxx | xxxx | xxxx | YES | xx:xx:xx:xx:xx:03 | SSID003 | ⋮ |
| 3 | x.x.x.33 | y.y.y.43 | xxxx | xxxx | xxxx | NO | xx:xx:xx:xx:xx:04 | SSID004 | ⋮ |
| | | | | | | NO | — | — | ⋮ |
| ⋮ | ⋮ | | ⋮ | ⋮ | ⋮ | ⋮ | ⋮ | ⋮ | ⋮ |

[Fig. 11C]

| NETWORK CELL NUMBER | CONNECTION STATE | BSSID | SSID | IP ADDRESS | CHANNEL NUMBER |
|---|---|---|---|---|---|
| BSS1 | COUPLED | xx:xx:xx:xx:xx:01 | SSID001 | x.x.x.11 | 1 |
| BSS2 | COUPLING CANDIDATE | xx:xx:xx:xx:xx:02 | SSID002 | x.x.x.12 | 2 |
| ... | ... | ... | ... | ... | ... |

1130

[Fig. 12]
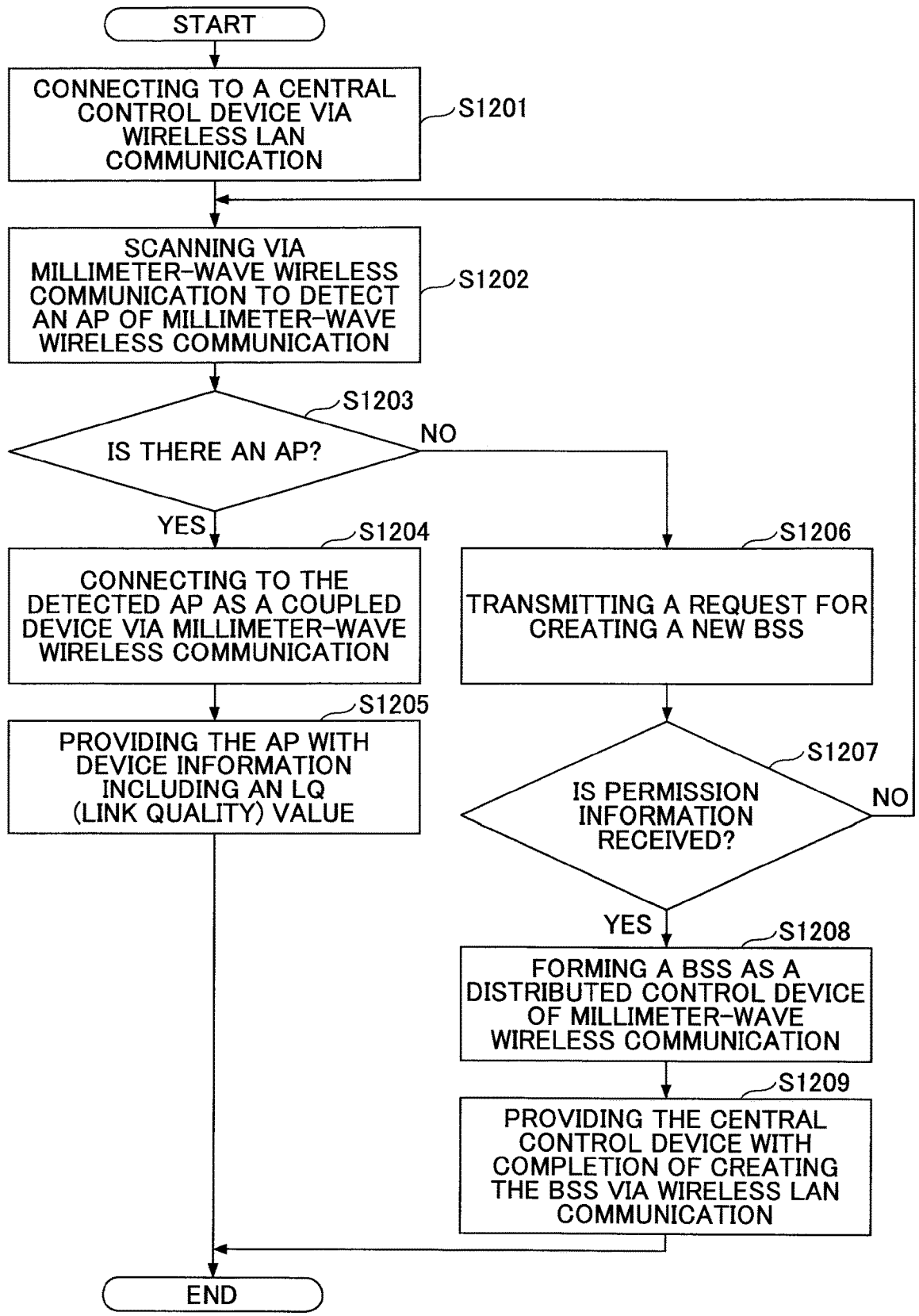

[Fig. 13A]
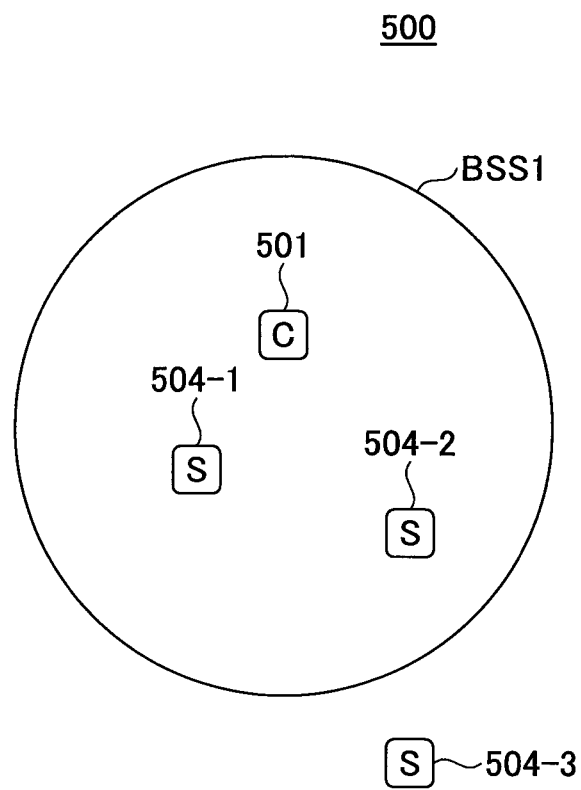

[Fig. 13B]
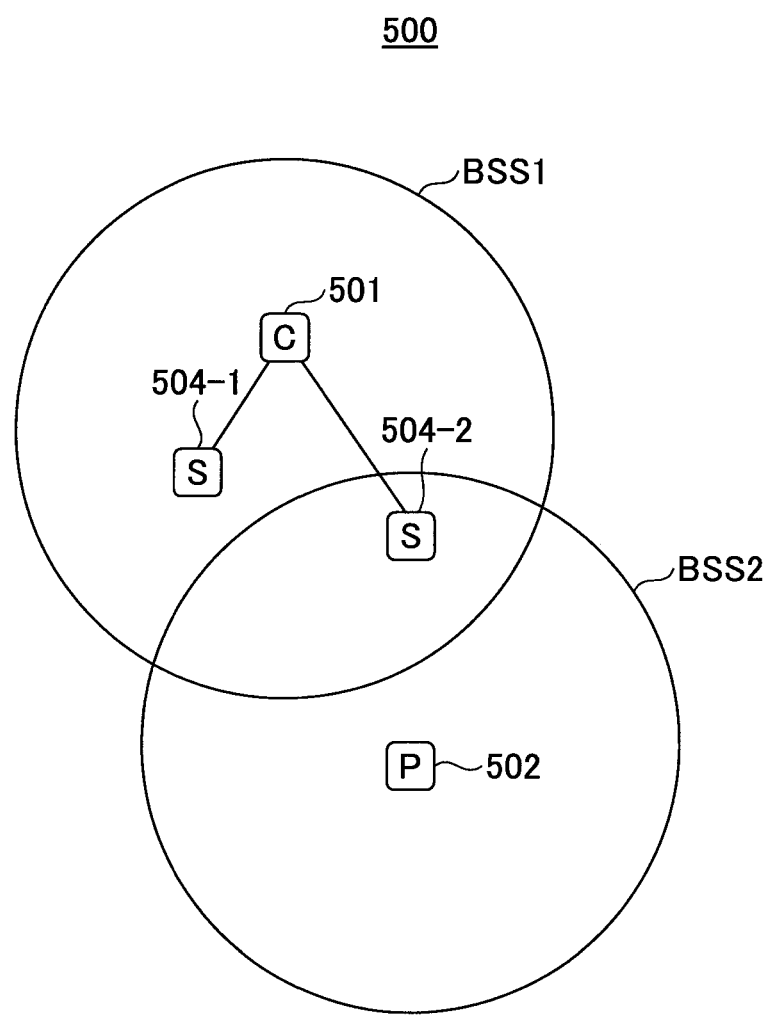

[Fig. 14]
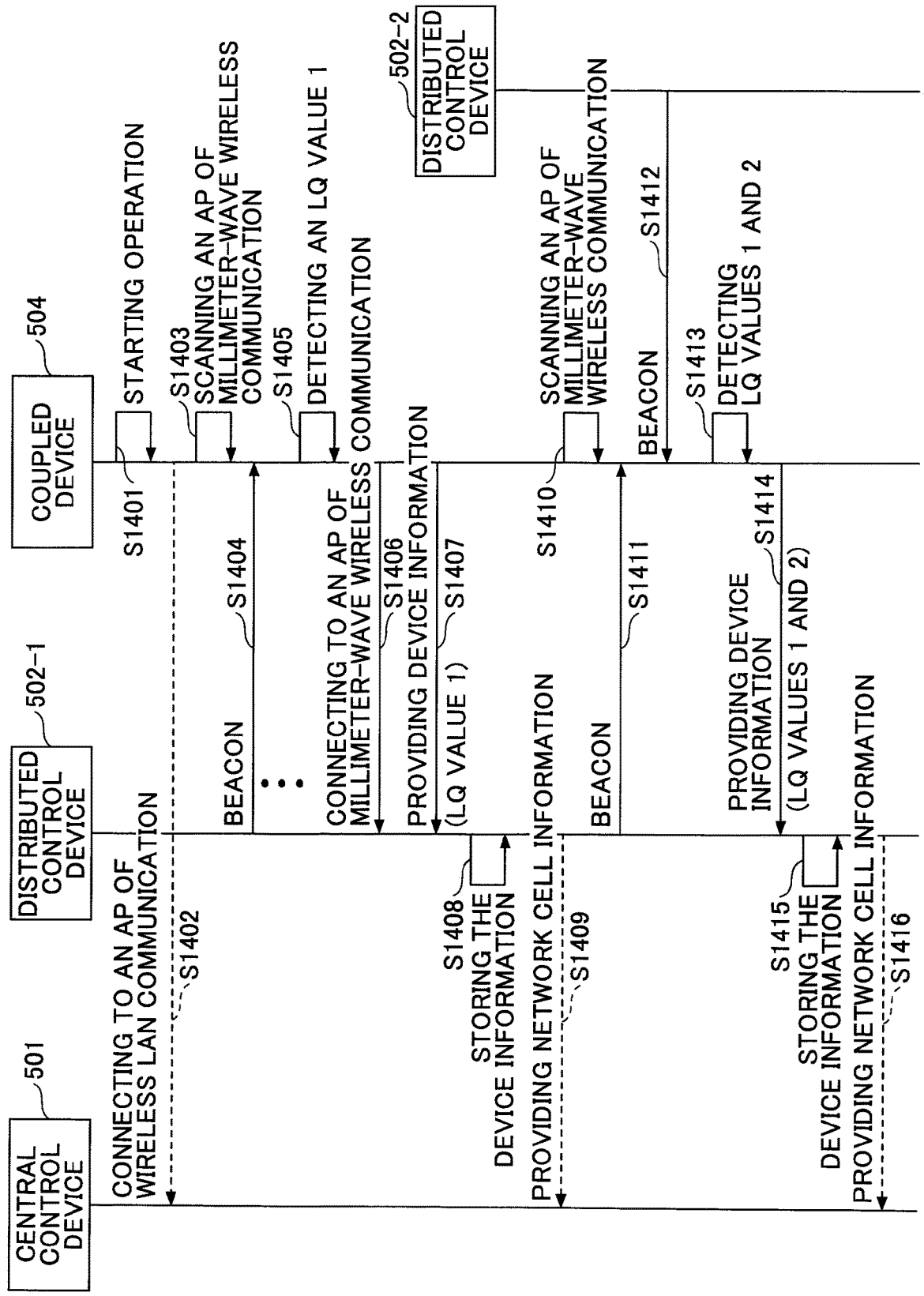

[Fig. 15]
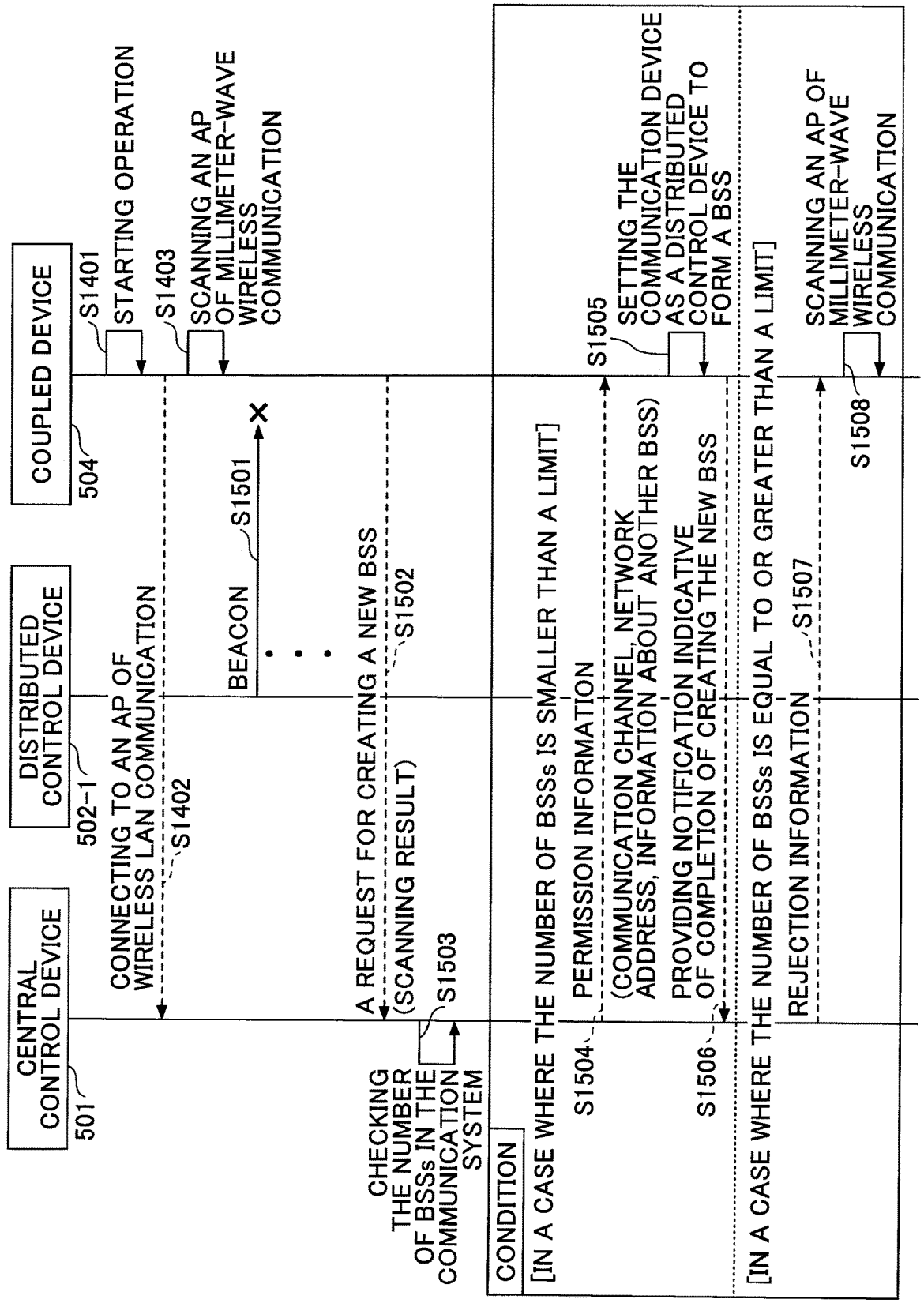

[Fig. 16]
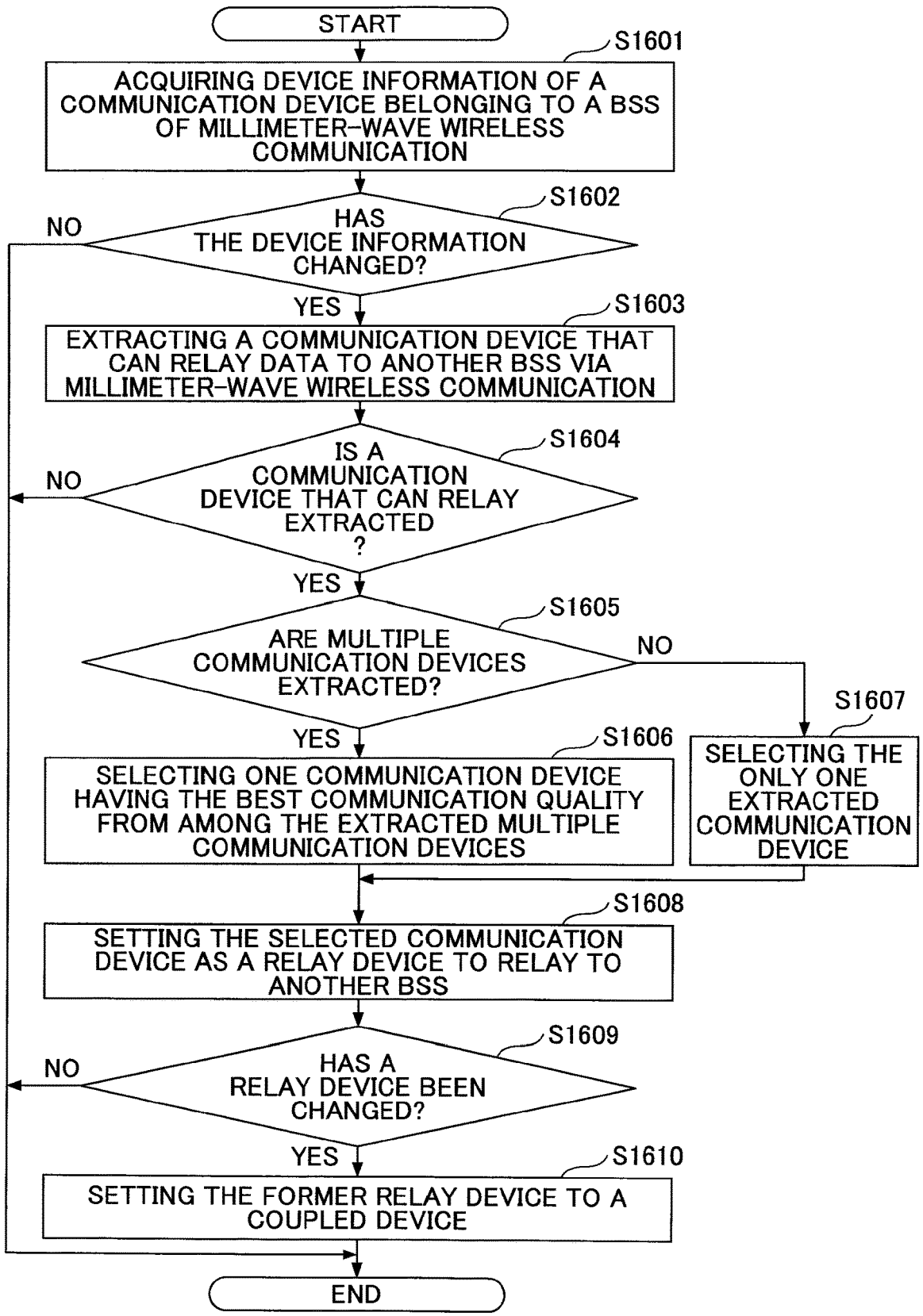

[Fig. 17A]
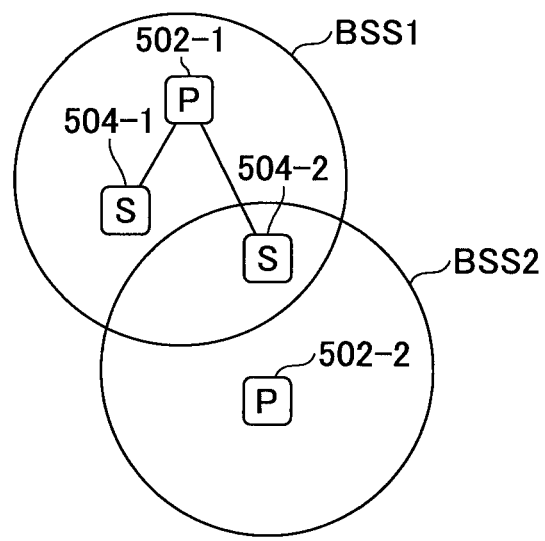
[Fig. 17B]
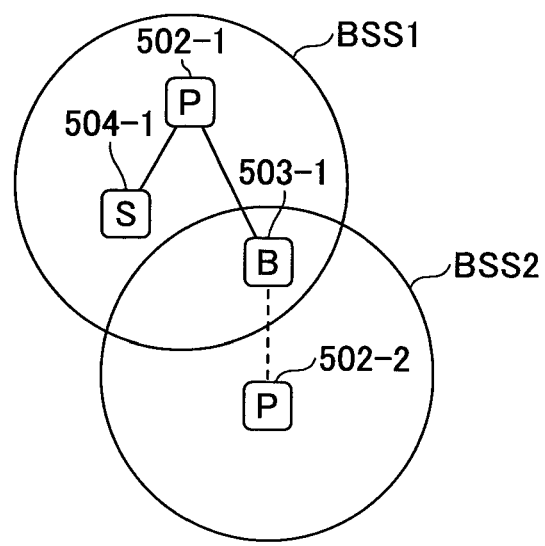

[Fig. 17C]
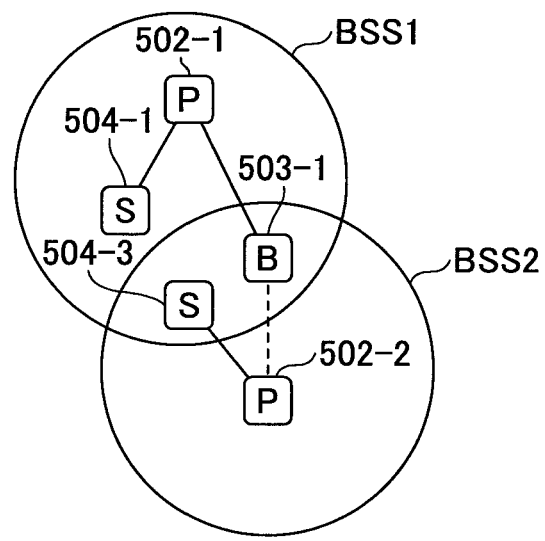
[Fig. 17D]
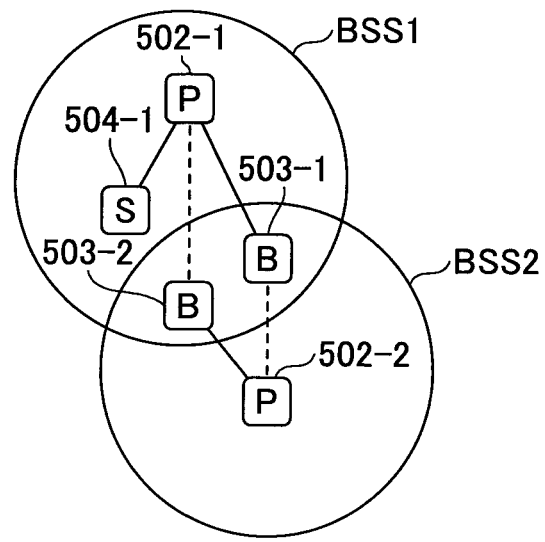

[Fig. 18A]
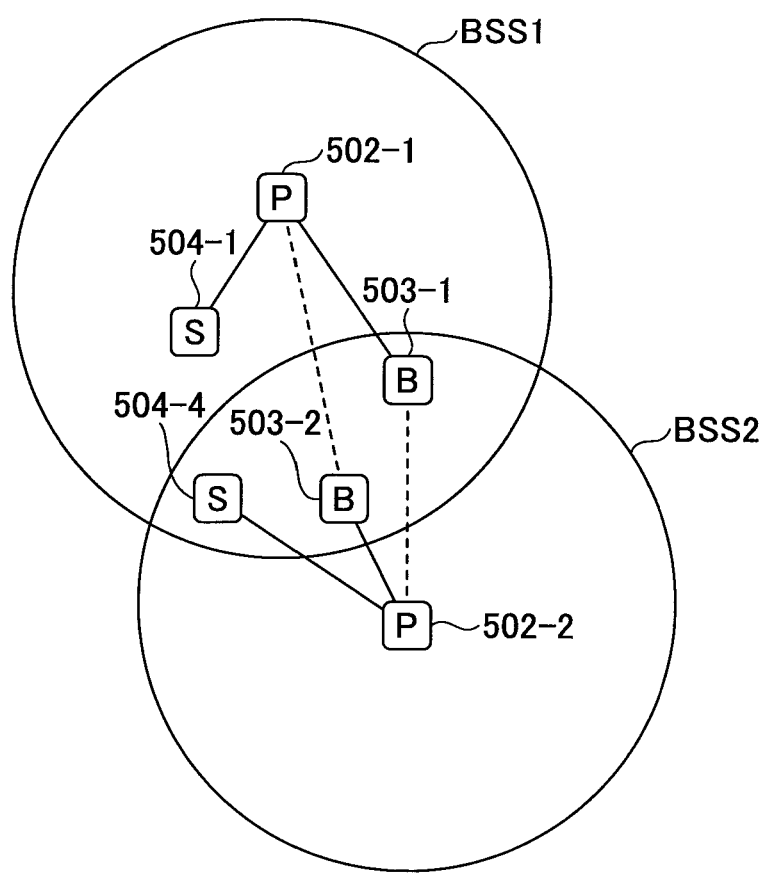

[Fig. 18B]
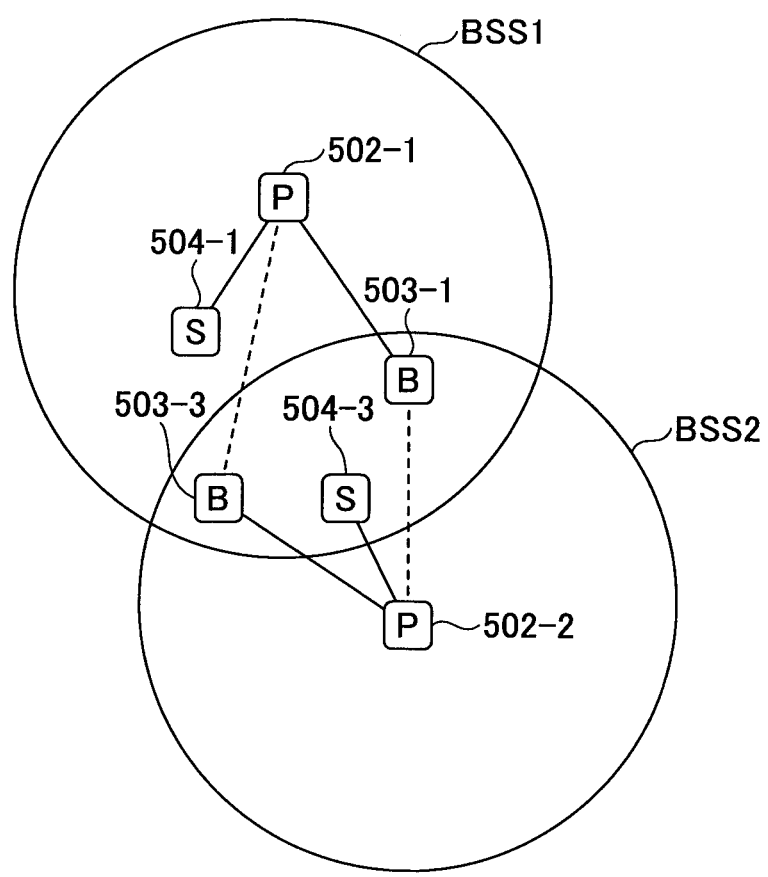

[Fig. 19A]
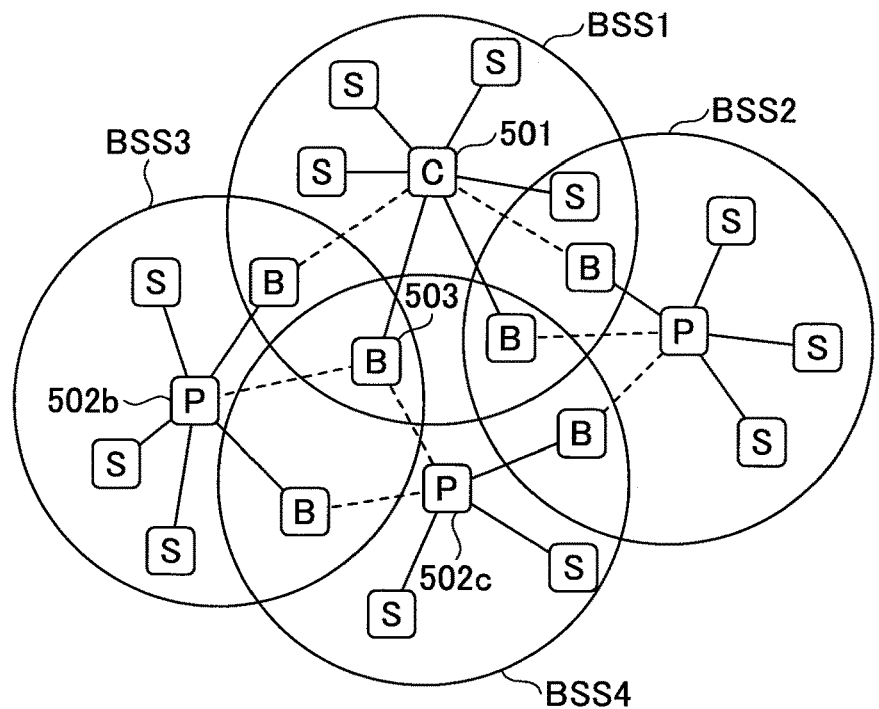
[Fig. 19B]
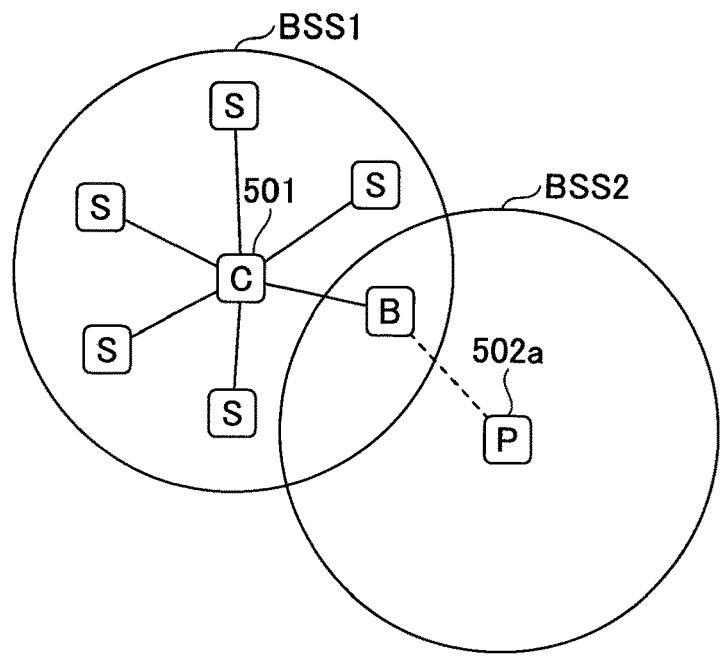

[Fig. 20]
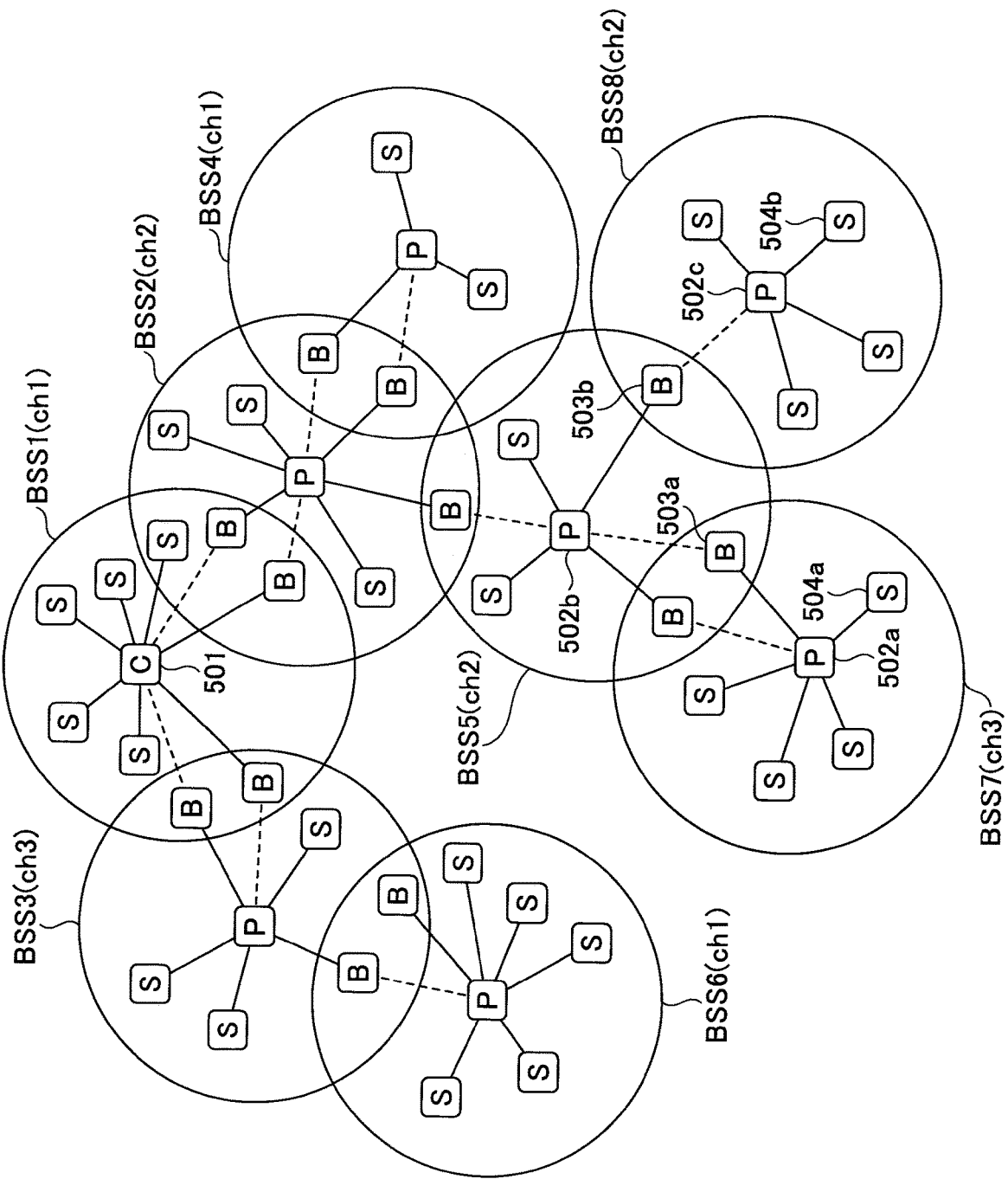

[Fig. 21]
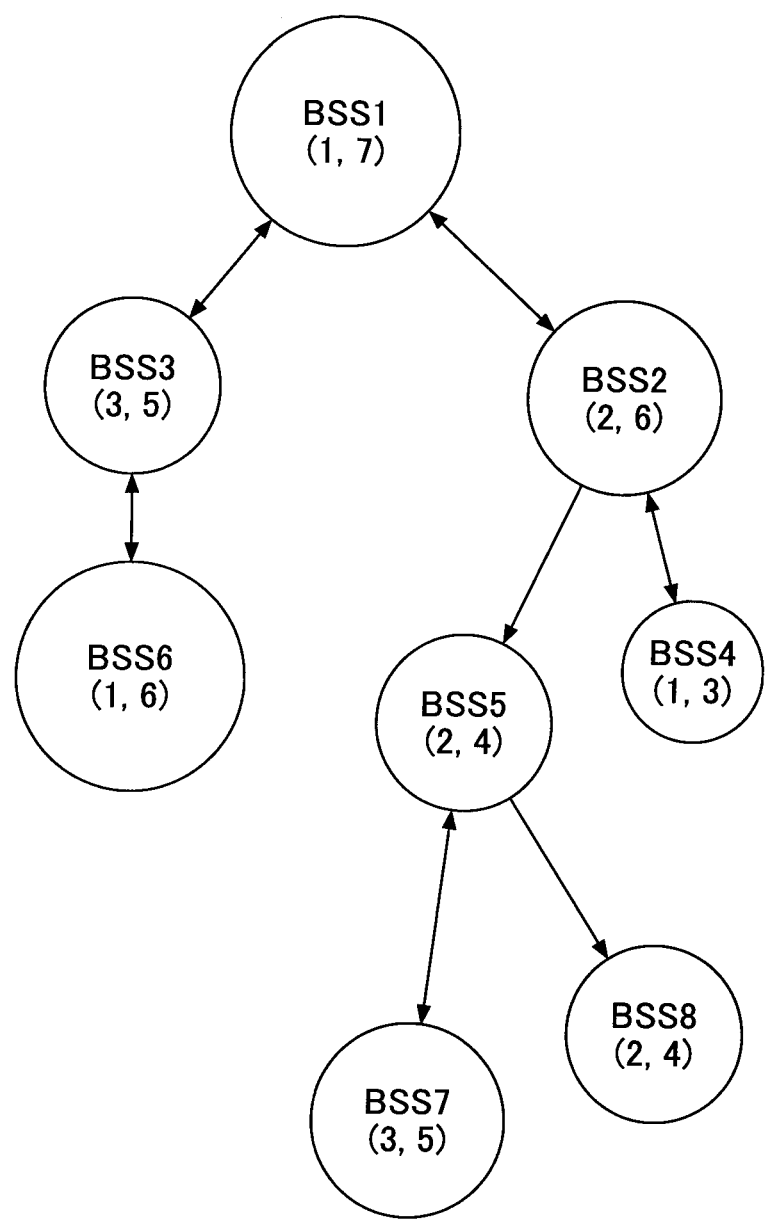

[Fig. 22]
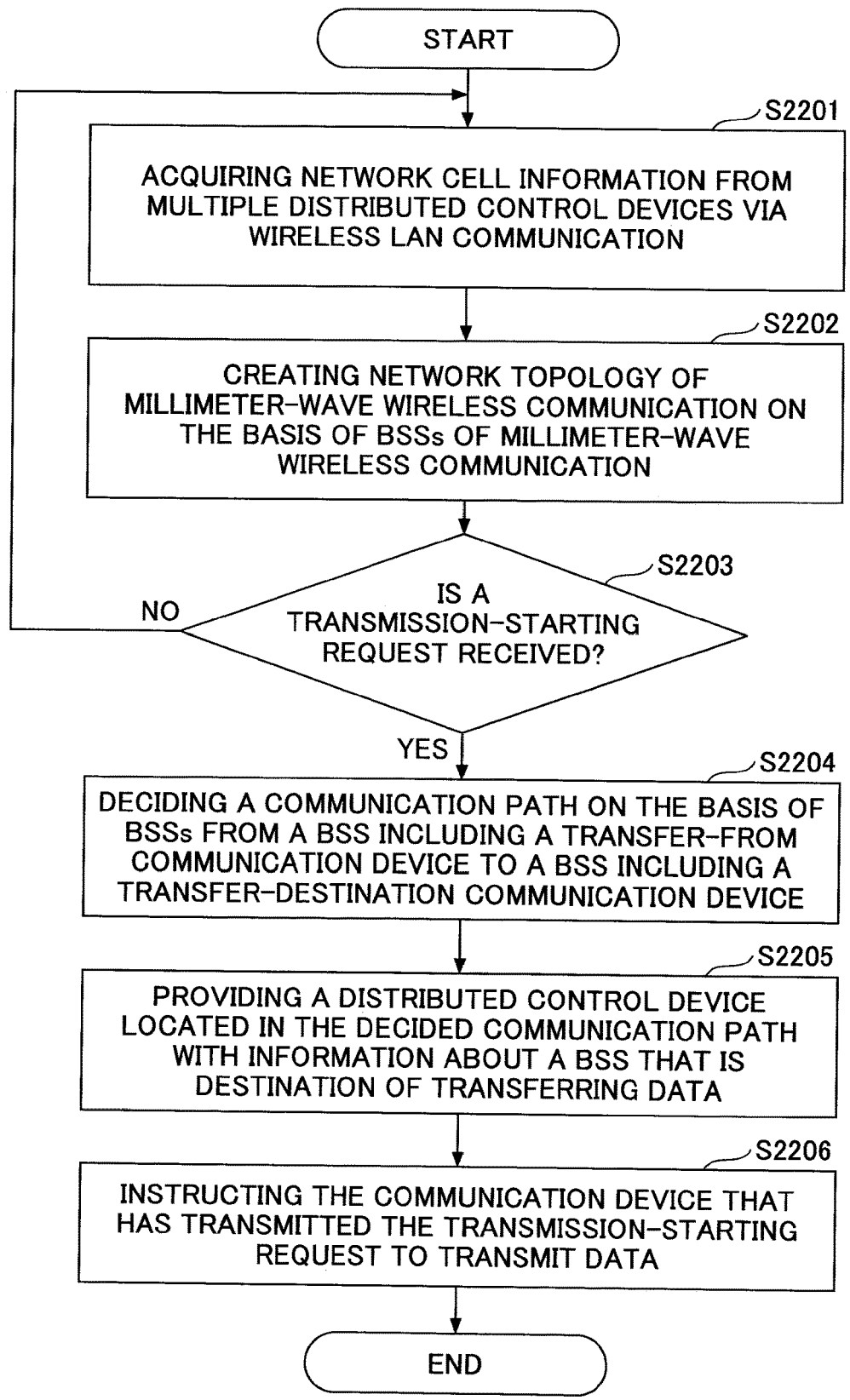

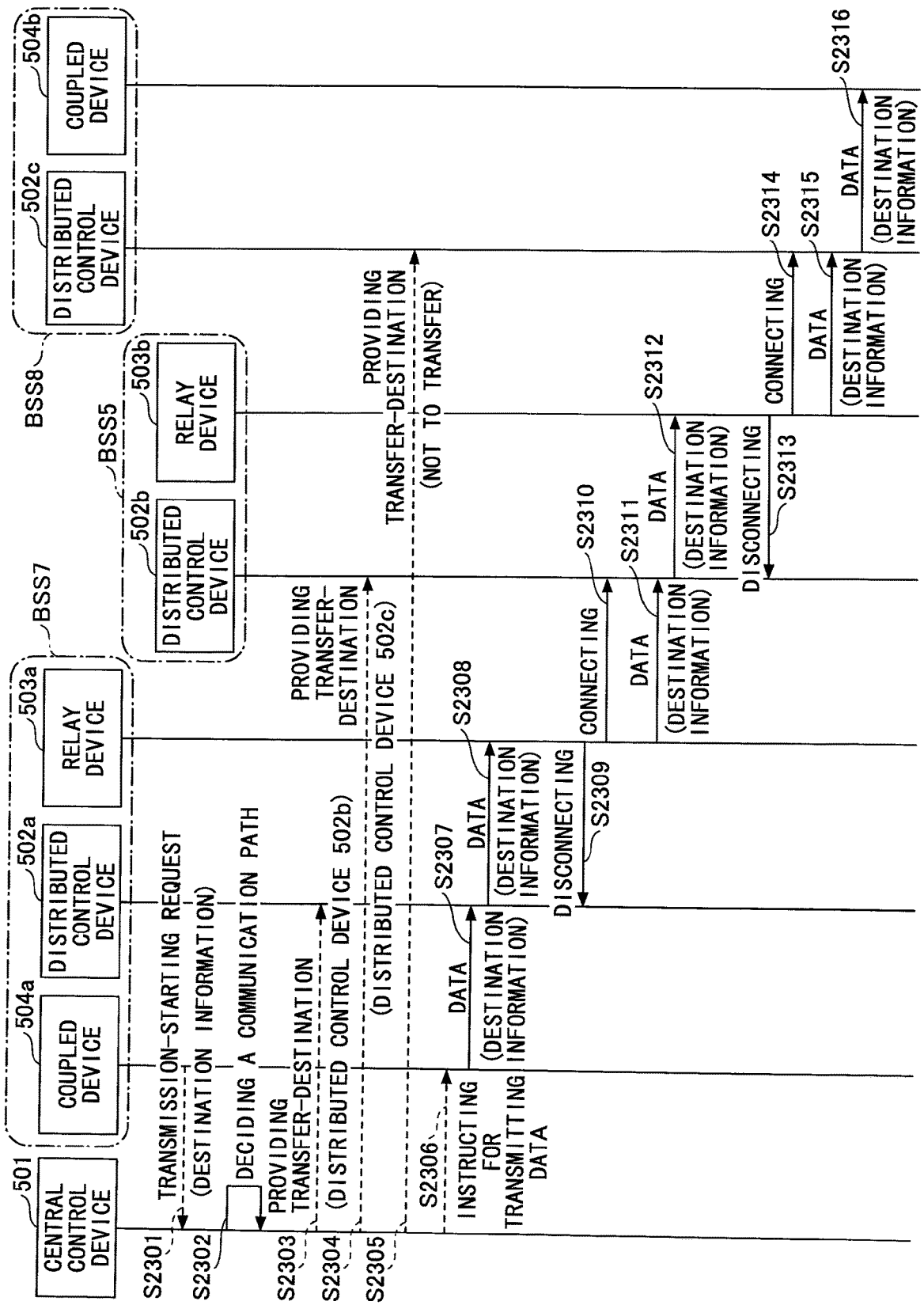
[Fig. 23]

[Fig. 24A]
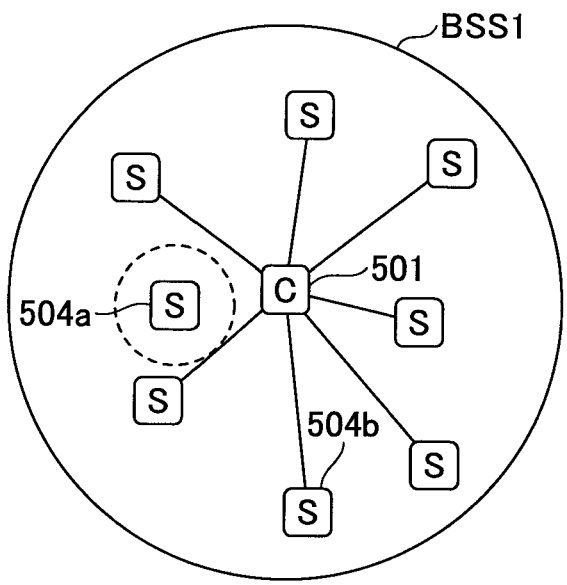
[Fig. 24B]
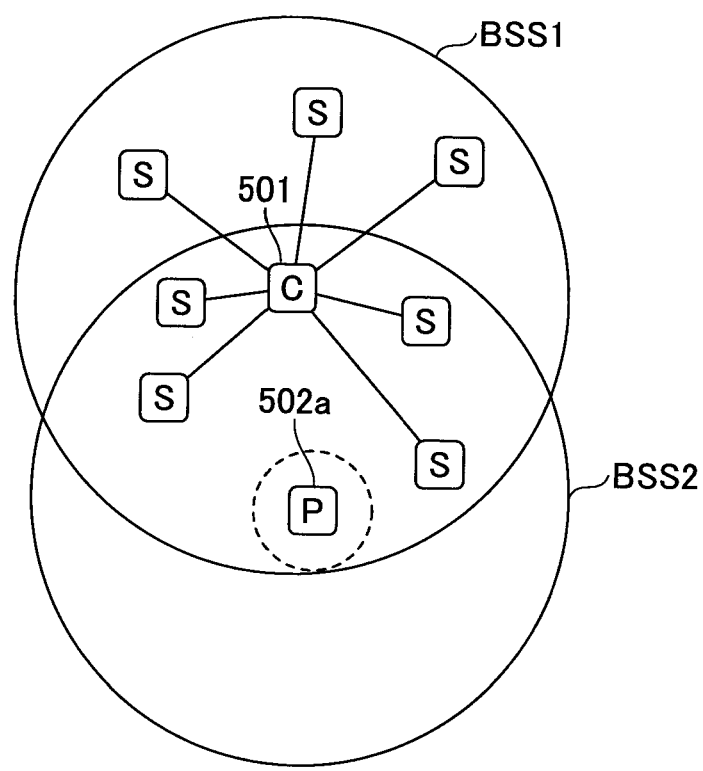

[Fig. 25]
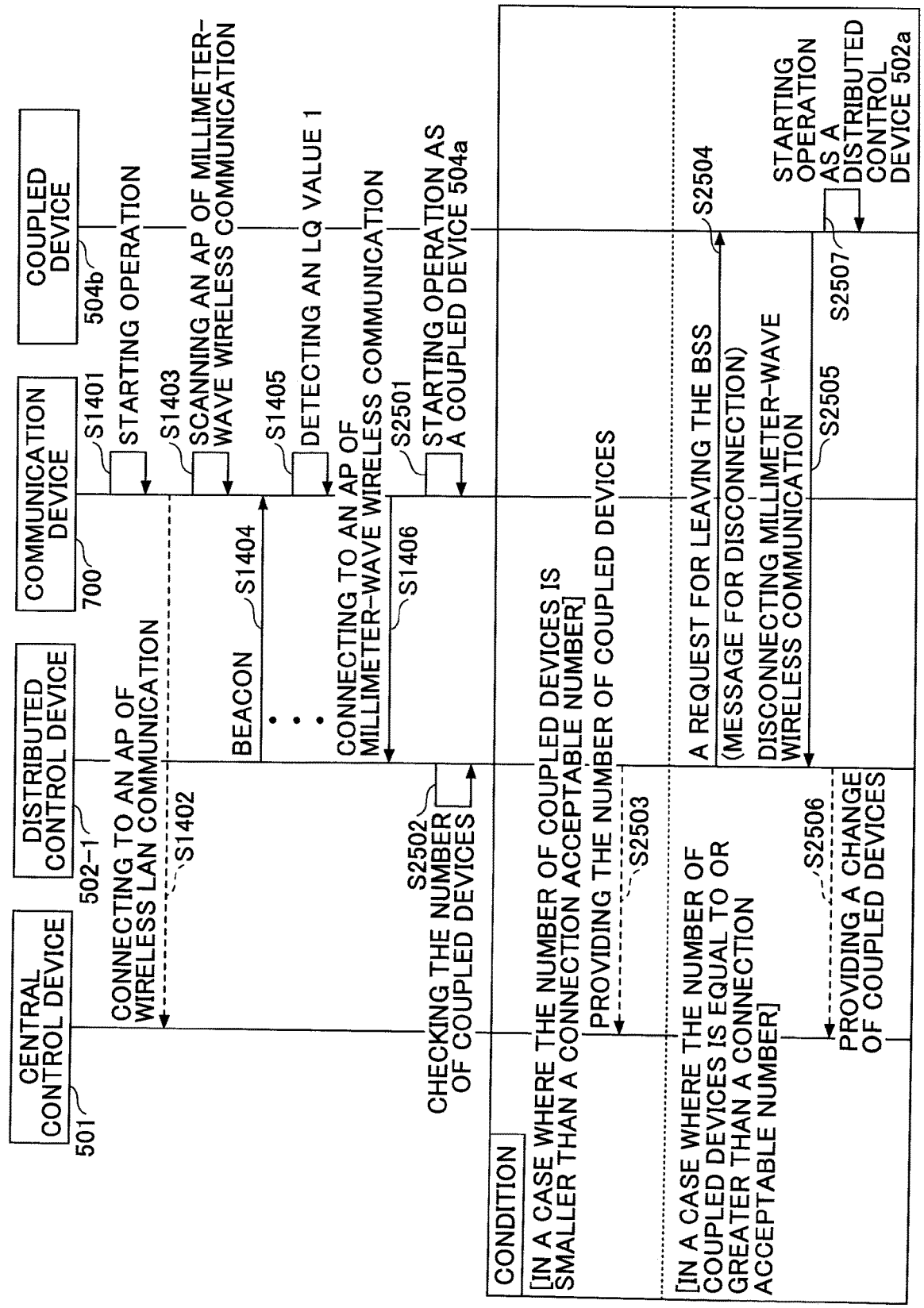

[Fig. 26A]
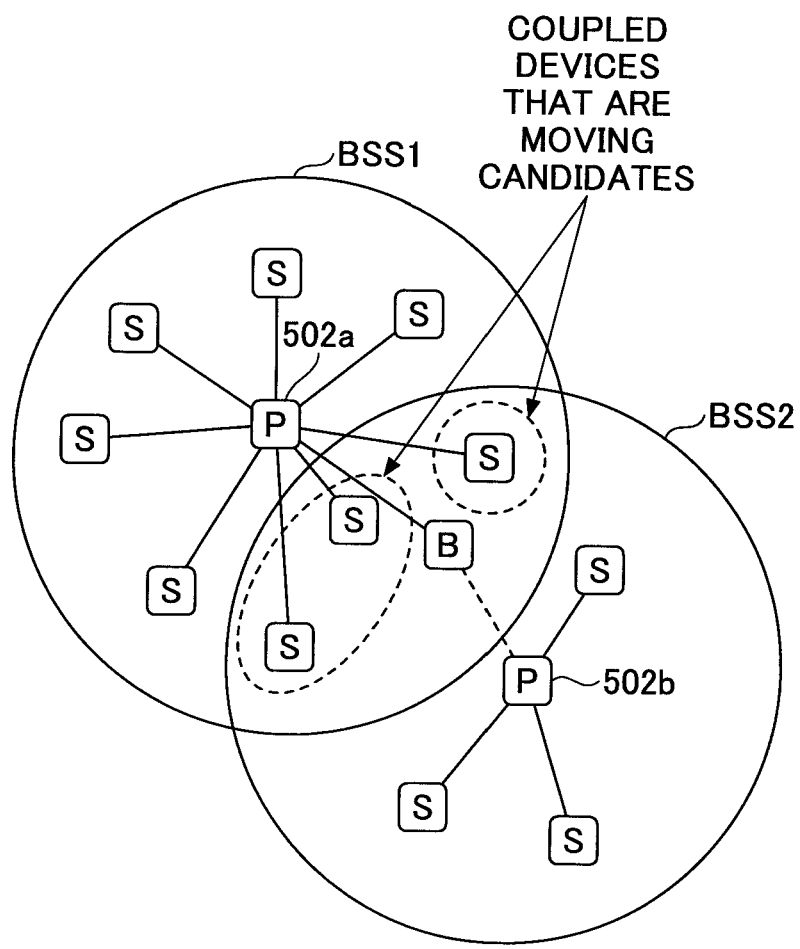

[Fig. 26B]
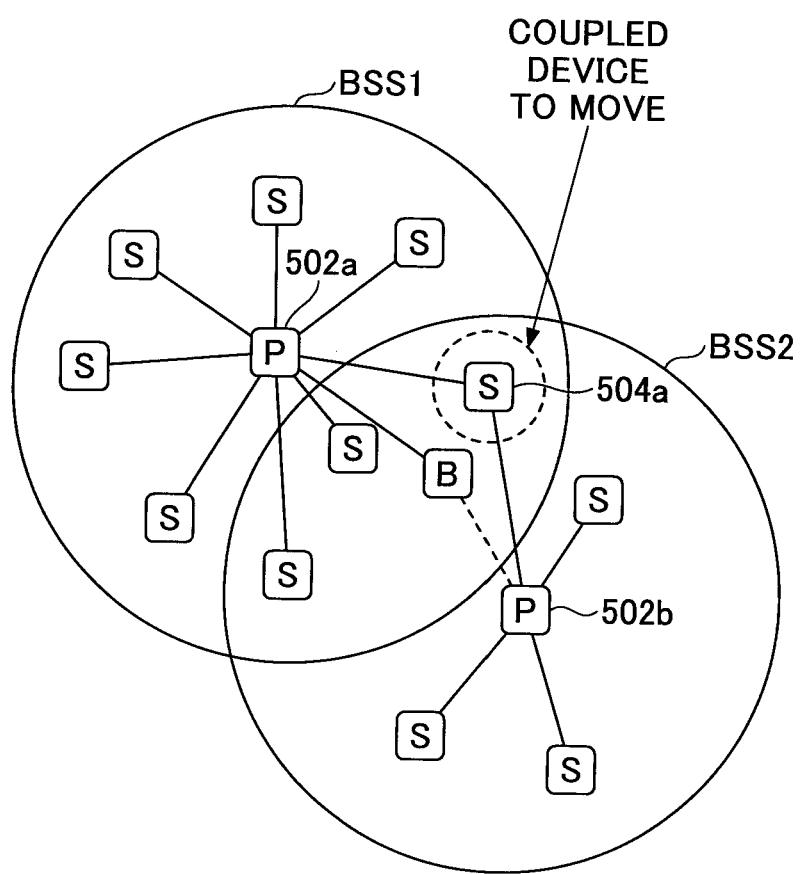

[Fig. 27]
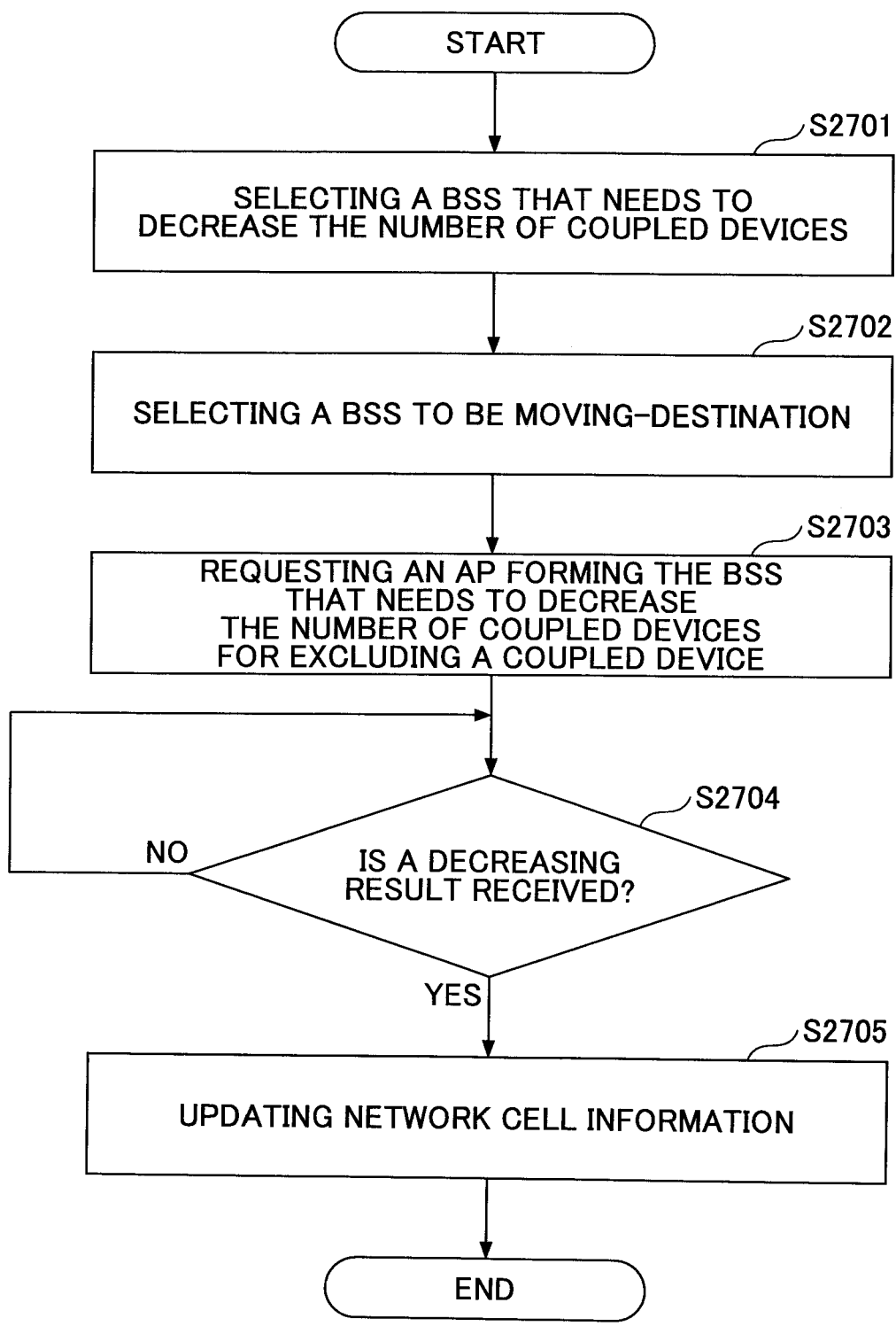

[Fig. 28]
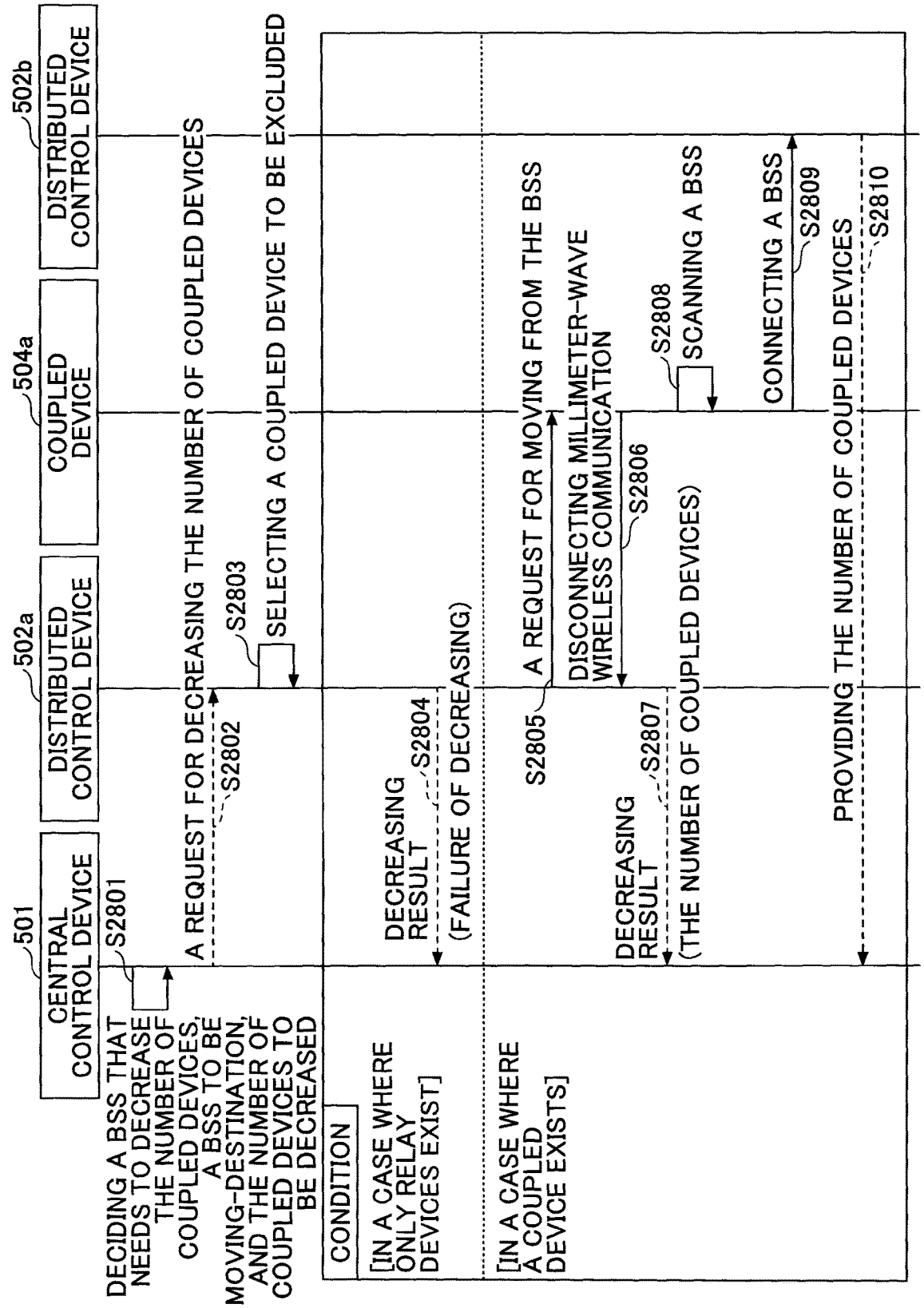

[Fig. 29]
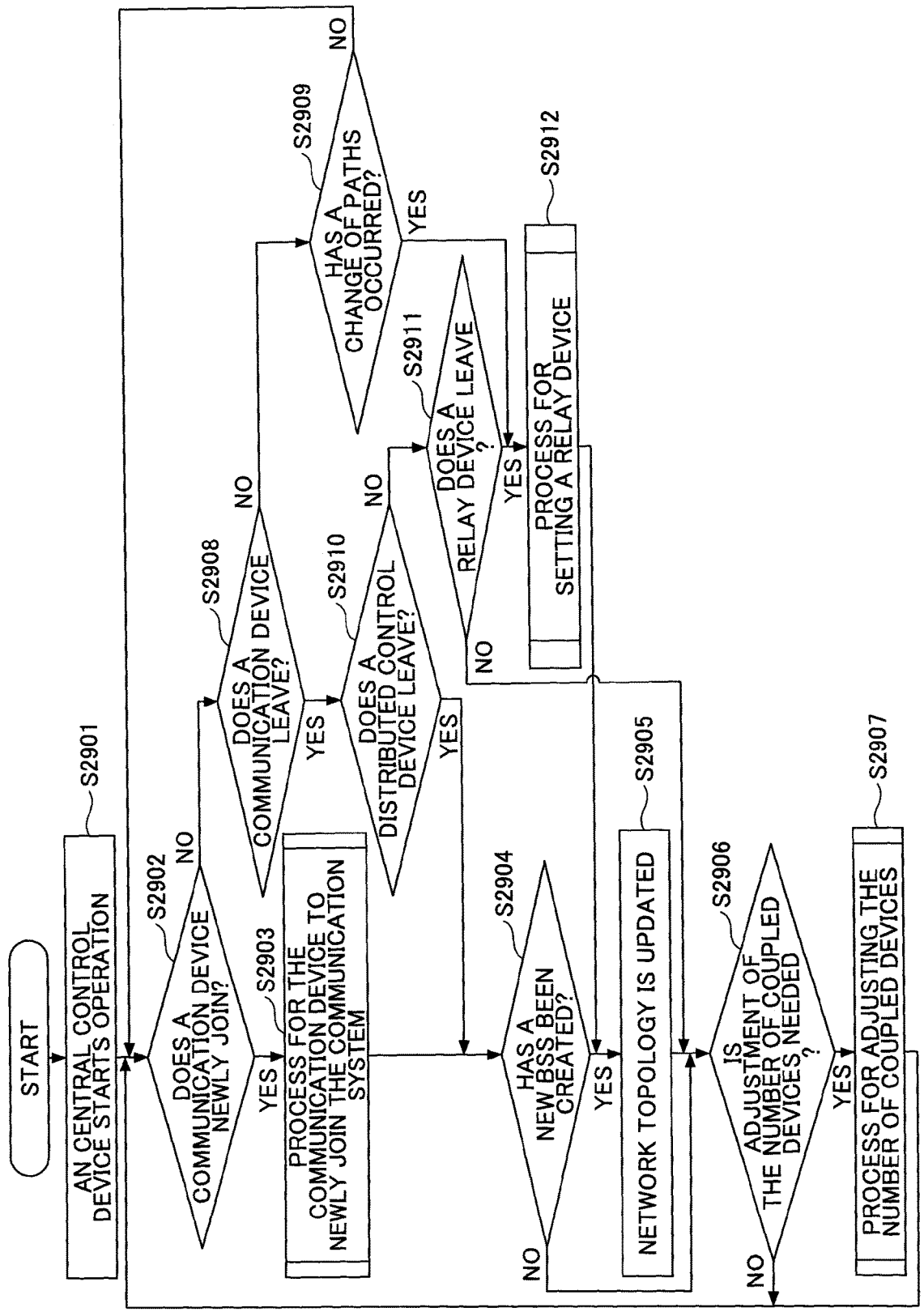

MULTI-HOP COMMUNICATION

TECHNICAL FIELD

The present invention relates to a communication system, a communication device, a method for managing communication, and a program.

BACKGROUND ART

Institute of Electrical and Electronics Engineers (IEEE) 802.11ad is known as a wireless communication standard for performing high-speed data transmission through a millimeter-waveband (60 GHz), which has a relatively narrow communication range where radio waves travel in a highly straight line.

Further, there is a communication network known in the art that broadcasts data contents from a transmitter-node to multiple receiver-nodes via a relaying receiver-node (see PTL 1, for example).

CITATION LIST

Patent Literature

[PTL 1] Japanese Translation of PCT International Application Publication No. JPT-2010-531559

SUMMARY OF INVENTION

Technical Problem

A communication system for providing high-speed data communication in a wider communication range may be possible by means of multi-hop communication, as disclosed, for example, in PTL 1, using multiple communication devices for performing communication in a millimeter-waveband.

However, it is difficult to perform multi-hop communication by use of the technique disclosed, for example, in PTL 1, because, in such a communication system for performing communication in a millimeter-waveband, communication is performed in a one-on-one network structure or in a star network structure with one central communication device.

Embodiments of the present invention are provided in light of the above problem, and therefore aim to facilitate multi-hop communication among wireless communication devices, by means of a wireless communication network that is structured in combination of wireless communication devices for performing communication in a one-on-one or star network structure.

Solution to Problem

As a solution to the above problem, one aspect of the present invention provides a communication system for performing multi-hop communication. The communication system includes: a plurality of communication devices, each of which includes a first communication unit for performing first wireless communication by use of a directional radio wave and a second communication unit for performing second wireless communication by use of a radio wave of a larger communication range than the first wireless communication, the plurality of communication devices being configured to utilize the first wireless communication for performing the multi-hop communication with each other; and a central control device including the second communication unit for performing the second wireless communication, the central control device being configured to utilize the second wireless communication for managing a communication path of the multi-hop communication through which data is transferred. The plurality of communication devices include a plurality of distributed control devices, each of which is configured to utilize the first wireless communication for forming a network cell to be coupled by at least one of the plurality of communication devices and for controlling the at least one of the plurality of communication devices to transfer the data via the first wireless communication, based on the communication path, and at least one relay device configured to become coupled to a network cell formed by one of the plurality of distributed control devices and configured to utilize the first wireless communication for receiving the data from the one of the plurality of distributed control devices and transferring the data to another one of the plurality of distributed control devices. The central control device utilizes the second wireless communication for controlling the plurality of distributed control devices located in the communication path to transfer the data, based on the communication path.

Advantageous Effects of Invention

According to embodiments of the present invention, multi-hop communication among wireless communication devices is facilitated, by means of a wireless communication network that is structured in combination of wireless communication devices for performing communication in a one-on-one or star network structure.

BRIEF DESCRIPTION OF DRAWINGS

FIG. 1A is one of a first set of drawings for explaining a millimeter-wave wireless communication system, according to an embodiment of the present invention;

FIG. 1B is another one of the first set of drawings for explaining a millimeter-wave wireless communication system, according to an embodiment of the present invention;

FIG. 2A is one of a second set of drawings for explaining a millimeter-wave wireless communication system, according to an embodiment of the present invention;

FIG. 2B is another one of the second set of drawings for explaining a millimeter-wave wireless communication system, according to an embodiment of the present invention;

FIG. 3 is a drawing for explaining an example of beamforming, according to an embodiment of the present invention;

FIG. 4 is a drawing for explaining data communication between network cells, according to an embodiment of the present invention;

FIG. 5 is a drawing illustrating an example of a system configuration of a communication system, according to an embodiment of the present invention;

FIG. 6 is a drawing illustrating another example of a system configuration of the communication system, according to an embodiment of the present invention;

FIG. 7A is a drawing illustrating an example of a hardware configuration of a communication device, according to an embodiment of the present invention;

FIG. 7B is a drawing illustrating another example of a hardware configuration of the communication device, according to an embodiment of the present invention;

FIG. 8 is a drawing illustrating an example of a functional configuration of a central control device, according to an embodiment of the present invention;

FIG. 9 is a drawing illustrating an example of a functional configuration of a distributed control device, according to an embodiment of the present invention;

FIG. 10A is a drawing illustrating an example of a functional configuration of a relay device, according to an embodiment of the present invention;

FIG. 10B is a drawing illustrating an example of a functional configuration of a coupled device, according to an embodiment of the present invention;

FIG. 11A is a drawing illustrating a first example of information managed in the communication system, according to an embodiment of the present invention;

FIG. 11B is a drawing illustrating a second example of information managed in the communication system, according to an embodiment of the present invention;

FIG. 11C is a drawing illustrating a third example of information managed in the communication system, according to an embodiment of the present invention;

FIG. 12 is a flowchart illustrating an example of a process for a communication device to newly join the communication system, according to a first embodiment of the present invention;

FIG. 13A is one of a set of drawings for explaining the process for a communication device to newly join the communication system, according to the first embodiment of the present invention;

FIG. 13B is another one of the set of drawings for explaining the process for a communication device to newly join the communication system, according to the first embodiment of the present invention;

FIG. 14 is a first sequence diagram illustrating an example of the process for a communication device to newly join the communication system, according to the first embodiment of the present invention;

FIG. 15 is a second sequence diagram illustrating an example of the process for a communication device to newly join the communication system, according to the first embodiment of the present invention;

FIG. 16 is a flowchart illustrating an example of a process for setting a relay device, according to the first embodiment of the present invention;

FIG. 17A is one of a first set of drawings for explaining the process for setting a relay device, according to the first embodiment of the present invention;

FIG. 17B is another one of the first set of drawings for explaining the process for setting a relay device, according to the first embodiment of the present invention;

FIG. 17C is another one of the first set of drawings for explaining the process for setting a relay device, according to the first embodiment of the present invention;

FIG. 17D is another one of the first set of drawings for explaining the process for setting a relay device, according to the first embodiment of the present invention;

FIG. 18A is one of a second set of drawings for explaining the process for setting a relay device, according to the first embodiment of the present invention;

FIG. 18B is another one of the second set of drawings for explaining the process for setting a relay device, according to the first embodiment of the present invention;

FIG. 19A is one of a third set of drawings for explaining the process for setting a relay device, according to the first embodiment of the present invention;

FIG. 19B is another one of the third set of drawings for explaining the process for setting a relay device, according to the first embodiment of the present invention;

FIG. 20 is a drawing illustrating an example of a network configuration of the communication system, according to the first embodiment of the present invention;

FIG. 21 is a drawing illustrating an example of network topology created by a central control device, according to the first embodiment of the present invention;

FIG. 22 is a flowchart illustrating an example of a process performed by the central control device, according to the first embodiment of the present invention;

FIG. 23 is a sequence diagram illustrating an example of a process for performing data communication in the communication system, according to the first embodiment of the present invention;

FIG. 24A is one of a set of drawings for explaining a process for a communication device to join a communication system, according to a second embodiment of the present invention;

FIG. 24B is another one of the set of drawings for explaining a process for a communication device to join the communication system, according to the second embodiment of the present invention;

FIG. 25 is a sequence diagram illustrating an example of the process for a communication device to join the communication system, according to the second embodiment of the present invention;

FIG. 26A is one of a set of drawings for explaining a process for adjusting the number of coupled devices, according to a third embodiment of the present invention;

FIG. 26B is another one of the set of drawings for explaining a process for adjusting the number of coupled devices, according to the third embodiment of the present invention;

FIG. 27 is a flowchart illustrating an example of a process performed by a central control device, according to the third embodiment of the present invention;

FIG. 28 is a sequence diagram illustrating an example of a process for adjusting the number of coupled devices, according to the third embodiment of the present invention;

FIG. 29 is a flowchart illustrating an example of a process for forming a millimeter-wave wireless communication network, according to the third embodiment of the present invention; and

DESCRIPTION OF EMBODIMENTS

The following description explains embodiments of the present invention, with reference to accompanied drawings.

<Overview of a Millimeter-Wave Wireless Communication System>

Before explanation of the embodiments of the present invention, an overview of a millimeter-wave wireless communication system pertaining to embodiments of the present invention is explained.

The millimeter-wave wireless communication system is a wireless communication system for performing high-speed data transmission through a millimeter-waveband (60 GHz), which has a relatively narrow communication range where radio waves travel in a highly straight line. Here, the following explanation is made on the premise that the millimeter-wave wireless communication system is a wireless communication system based on IEEE 802.11ad. Note that IEEE 802.11ad is an example of the millimeter-wave wireless communication system according to the present embodiments.

(Network Configuration)

In the millimeter-wave wireless communication system based on IEEE 802.11ad, communication is performed through a millimeter-waveband (60 GHz), which has a relatively narrow communication range where radio waves travel in a highly straight line, using a 2.16 GHz broadband per channel, so as to achieve high-speed data transmission.

Further, due to large propagation loss of radio waves in the millimeter-waveband, a beam-forming technique for transmitting and receiving radio waves in a narrowed beam direction is used in the millimeter-wave wireless communication system, so as to take advantage of an antenna to a larger extent. Therefore, for a communication device in the millimeter-wave wireless communication system, it is difficult to communicate simultaneously with multiple other communication devices located near the communication device.

Hence, in the millimeter-wave wireless communication system, communication protocol in a time division multiple access (TDMA) format is used as a wireless multiplex format, instead of a carrier sense multiple access/collision avoidance (CSMA/CA) format, which is used in a conventional wireless local area network (LAN) system.

In the millimeter-wave wireless communication system, a coordinator device called an access point (AP) forms a network cell called a basic service set (BSS) and manages time slots in the TDMA protocol.

FIGS. 1A through 2B are drawings for explaining a millimeter wireless communication system according to an embodiment. FIG. 1A is a drawing illustrating an example of a one-on-one network configuration in which an AP 110 forming a BSS 100, which is a network cell of the millimeter-wave wireless communication system, performs communication with a station (STA) 120 via millimeter-wave wireless communication 130. In the example of FIG. 1A, the AP 110 manages time slots in TDMA protocol. For example, the AP 110 transmits a beacon frame in a predetermined interval of time.

FIG. 1B is a drawing illustrating an example of a star network configuration, in which an AP 110 forming a BSS 100 performs communication with each of multiple STAs 120-1 through 120-3 via millimeter-wave wireless communication 130. In the example of FIG. 1B, the AP 110 manages time slots in TDMA protocol as well. For example, the AP 110 transmits a beacon frame in a predetermined interval of time.

In IEEE 802.11ad, in addition to the network configurations as illustrated in FIGS. 1A and 1B, a network configuration called a personal basic service set (PBSS) 200, which is formed by a coordinator device called a PBSS central point (PCP) 210, is defined as illustrated in FIG. 2A.

In the present embodiments, the following explanation is provided on the premise that a millimeter-wave wireless communication system is configured in combination of wireless communication devices that perform communication in a one-on-one and star network configuration as illustrated in FIGS. 1A and 1B. Note that the present invention is applicable to a network configuration (i.e. a PBSS) as illustrated in FIG. 2A as well.

(Configuration of Time Slots)

FIG. 2B is a drawing illustrating an example of time slots according to an embodiment. FIG. 2B is a drawing illustrating assignment of time slots in TDMA protocol, which is managed by an AP 110. As illustrated in FIG. 2B, the time slots in the TDMA protocol, which is managed by the AP 110, include a beacon header interval (BHI) and a data transfer interval (DTI).

The BHI includes a beacon transmission interval (BTI), an association beam-forming training (A-BFT), and an announcement transmission interval (ATI).

The BTI is a period in which an AP 110 transmits a beacon frame. The A-BFT is a training period for beam-forming. The ATI is a period in which an AP 110 and STAs 120-1 through 120-3 transmit and receive management information, control information, etc., with each other.

The DTI includes contention based access periods (CBAP) and service periods (SP).

Each CBAP is a contention period, which is assigned for an AP 110 and multiple STAs 120 to perform communication in a contention condition. Each SP is a designated period, which is assigned for an AP 110 and one STA 120 to perform communication.

In the BTI, the AP 110 transmits as many beacon frames as the number of antenna sectors, which are multiple beam-patterns formed by the AP 110. On the other hand, the STAs 120-1 through 120-3 receive all beacon frames transmitted from the AP 110 by use of an omni-directional antenna or a quasi-omni-directional antenna. Further, the STAs 120-1 through 120-3 provide the AP 110 a feedback of information indicative of the antenna sector with the best reception quality. In the above way, the AP 110 is informed of an antenna sector that should be used for communication with each of the STAs 120-1 through 120-3.

(Beam-Forming)

The following description simply explains an overview of a sector level sweep (SLS) as an example of a beam-forming technique.

There are two types of SLSs, i.e., a Tx sector sweep (TXSS) and an Rx sector sweep (RXSS). A TXSS is a beam-forming training for deciding an antenna sector used for transmission. A RXSS is a beam-forming training for deciding an antenna sector for reception.

FIG. 3 is a drawing for explaining an example of beam-forming according to an embodiment. In the example of FIG. 3, for ease of explanation, among all antenna sectors, which are multiple beam-patterns formed by the AP 110, only four antenna sectors, i.e., sectors 1 through 4 are illustrated.

In a TXSS, the AP 110 switches sectors (i.e., sectors 1 through 4), or multiple beam-patterns, and transmits predetermined packets from an antenna 301 in a sequential order. On the other hand, each STA 120 sets an antenna 302 to be an omni-directional antenna or a quasi-omni-directional antenna, to receive the packets transmitted from the AP 110 and to provide the AP 110 with information indicative of an antenna sector with the best reception quality as a feedback.

In a RXSS, a beam-forming training sequence opposite to the TXSS as described above is executed. After completion of the TXSS and the RXSS, transmission and reception of radio waves between the AP 110 and the STA 120 via millimeter-wave wireless communication become available.

<System Configuration>

Before explanation of a system configuration of the communication system according to the present embodiments, data communication via millimeter-wave wireless communication between BSSs (i.e., network cells) according to the present embodiments is explained.

(Data Communication Between Network Cells)

FIG. 4 is a drawing for explaining data communication between network cells according to an embodiment. In the example of FIG. 4, a communication system 400 includes multiple APs 110-1 and 110-2 and multiple STAs 120-1 through 120-3. Note that, in the following explanation, an arbitrary AP among the multiple APs 110-1 and 110-2 is indicated as "an AP 110". Further, an arbitrary STA among the multiple STAs 120-1 through 120-3 is indicated as "an STA 120". Further, the number of APs 110 and the number of STAs 120 illustrated in FIG. 4 are just examples.

The APs 110-1 and 110-2 are communication devices having a function as an AP of the millimeter-wave wireless communication system as explained in FIGS. 1A through 3. The APs 110-1 and 110-2 form BSSs 100-1 and 100-2, respectively, which are different network cells formed via millimeter-wave wireless communication.

The STAs 120-1 through 120-3 are communication devices having a function as an STA in the millimeter-wave wireless communication system as illustrated in FIGS. 1A through 3.

In FIG. 4, a solid line connecting, for example, the STA 120-1 and the AP 110-1 indicates that the STA 120-1 is in a state of being "coupled" to the AP 110-1 via millimeter-wave wireless communication. Further, a dashed line connecting, for example, the STA 120-1 and the AP 110-2 indicates that the STA 120-1 is in a state of being a "coupling candidate", i.e., being able to become coupled to the AP 110-2 via millimeter-wave wireless communication.

In the example of FIG. 4, the STA 120-1 is coupled to the BSS 100-1 formed by the AP 110-1, and is able to become coupled to the BSS 100-2 formed by the AP 110-2. Similarly, the STA 120-2 is coupled to the BSS 100-2 formed by the AP 110-2, and is able to become coupled to the BSS 100-1 formed by the AP 110-1. Further, the STA 120-3 is coupled to the BSS 100-2 formed by the AP 110-2.

In FIG. 4, the AP 110-1 is able to transmit data to APs 110 and STAs 120 coupled to the BSS 100-2 by use of the STA 120-1 as a relay device, which is coupled to the AP 110-1 and is able to become coupled to the AP 110-2.

For example, the AP 110-1 sets the STA 120-1, which is coupled to the AP 110-1 and is able to become coupled to the AP 110-2, as a relay device for transferring data received from the AP 110-1 to the AP 110-2.

When the STA 120-1, which is set as a relay device, receives data from the AP 110-1, the STA 120-1 disconnects from the AP 110-1 and becomes coupled to the AP 110-2 for transferring the received data to the AP 110-2.

Preferably, the STA 120-1 disconnects from the AP 110-2 after transferring the data to the AP 110-2, and becomes coupled to the AP 110-1 again.

Similarly, the AP 110-2 sets the STA 120-2, which is coupled to the AP 110-2 and is able to become coupled to the AP 110-1, as a relay device for transferring data received from the AP 110-2 to the AP 110-1.

For example, in FIG. 4, in a case where the AP 110-1 transmits predetermined data to the STAs 120-1 through 120-3 and to the AP 110-2 simultaneously, the AP 110-1 transmits the predetermined data to the 120-1 via millimeter-wave wireless communication.

When the STA 120-1 receives the predetermined data from the AP 110-1, the STA 120-1 disconnects from the AP 110-1 and becomes coupled to the AP 110-2, which is a preset transfer-destination, via millimeter-wave wireless communication. Further, the STA 120-1 transfers the predetermined data received from the AP 110-1 to the AP 110-2 via millimeter-wave wireless communication.

From among the STAs 120-1 through 120-3, when the AP 110-2 receives the predetermined data from the STA 120-1, the AP 110-2 transmits the received predetermined data to the others, i.e., the STAs 120-2 and 120-3.

In the above way as described above, for example, the AP 110-1 is able to transmit predetermined data to another communication device, which is coupled to the AP 110-2.

(System Configuration of Communication System)

FIG. 5 is a drawing illustrating an example of a system configuration of a communication system according to an embodiment. A communication system 500 includes multiple communication devices having a millimeter-wave wireless communication unit for performing millimeter-wave wireless communication and a wireless LAN communication unit for performing wireless LAN communication. In the communication system 500, multi-hop communication is performed among the communication devices via millimeter-wave wireless communication.

Note that millimeter-wave wireless communication is an example of first wireless communication for performing communication by use of a directional radio wave. Further, wireless LAN communication is an example of second wireless communication for performing communication with another communication device by use of a radio wave of a larger communication range than the first wireless communication.

The multiple communication devices in the communication system 500 include, for example, a central control device 501, multiple distributed control devices 502a through 502d, at least one relay device 503, and at least one coupled device 504. Note that, in the following explanation, an arbitrary distributed control device among the distributed control devices 502a through 502d may be indicated as "a distributed control device 502". Further, in FIG. 5 and subsequent drawings, a central control device 501 may be indicated as "C"; a distributed control device 502 may be indicated as "P"; a relay device 503 may be indicated as "B"; and a coupled device 504 may be indicated as "S".

The central control device (i.e., information processing apparatus) 501 has a function as an access point that forms a BSS 506 of wireless LAN communication, by use of wireless LAN communication (e.g., IEEE802.11a/b/g/n/ac, etc.) having a larger communication range than millimeter-wave wireless communication. Note that the BSS 506 of wireless LAN communication is a network formed by use of wireless LAN communication on infrastructure mode.

In the present embodiments, communication devices other than the central control device 501, i.e., a distributed control device 502, a relay device 503, and a coupled device 504 have a function as a station of wireless LAN communication, which enables the central control device 501 and other communication devices in the BSS 506 to perform communication with each other via wireless LAN communication (i.e., the second wireless communication).

The central control device 501 manages a communication path of multi-hop communication, which is performed via millimeter-wave wireless communication. Further, the central control device 501 utilizes wireless LAN communication for controlling distributed control devices 502 located on the communication path of the multi-hop communication to transfer data via millimeter-wave wireless communication.

Further, in the example of FIG. 5, the central control device 501 further includes a function as a distributed control device 502 as described below and forms a BSS1, which is a network cell of millimeter-wave wireless communication.

The distributed control devices 502 utilize millimeter-wave wireless communication for forming BSS2 through BSS5, respectively, which are individual network cells of millimeter-wave wireless communication. Further, with respect to a BSS formed by a distributed control device 502 via millimeter-wave wireless communication, the distributed control device 502 controls at least one communication device coupled to the BSS to transfer data via millimeter-wave wireless communication.

Note that, in the following explanation, a BSS 506 of wireless LAN communication may be indicated as a "BSS of wireless LAN communication". Further, a BSS of millimeter-wave wireless communication may be simply indicated as a "BSS", so as to be distinct from the "BSS of wireless LAN communication".

In FIG. 5, the distributed control device 502a forms the BSS2, which is a network cell of millimeter-wave wireless communication, and transmits beacon frames in the range of the BSS2.

In the example of FIG. 5, five communication devices are in a state of being "coupled" to the distributed control device 502a as connected with solid lines. Among the five communication devices in the state of being "coupled", the distributed control device 502a selects one communication device that is in a state of being a "coupling candidate" of the BSS1, and controls the selected communication device as a relay device for transferring data via millimeter-wave wireless communication to the BSS1. Similarly, among the five communication devices in the state of being "coupled", the distributed control device 502a selects one communication device that is in the state of being a "coupling candidate" of the BSS5, and controls the selected communication device as a relay device for transferring data via millimeter-wave wireless communication to the BSS5.

A relay device 503 is a communication device that is coupled to a BSS formed by a distributed control device 502, such as the BSS2 formed by the distributed control device 502a. Further, upon being controlled by the distributed control device 502a, the relay device 503 transfers data received from the distributed control device 502a to another distributed control device 502.

A coupled device 504 is a general communication device that is coupled to a BSS formed by a distributed control device 502. Further, a coupled device 504 is controlled by a distributed control device 502 to operate as a relay device 503.

In the example of FIG. 5, each of the communication devices included in the communication system 500 is able to perform wireless communication via both millimeter-wave wireless communication and wireless LAN communication, and is able to utilize both of the wireless communications simultaneously.

As millimeter-wave wireless communication is performed in a narrow communication range with directional radio waves, the communication system 500 for performing data communication among communication devices via millimeter-wave wireless communication is constituted, for example, in combination of multiple network cells (i.e., BSSs) as illustrated in FIG. 5. In a case where data is transmitted from a communication device to another communication device via millimeter-wave wireless communication in the communication system 500, multi-hop communication is performed. In the multi-hop communication, hopping-transfer for transmitting data in a sequential order among one or more BSSs is performed.

Further, in the present embodiments, the central control device 501 decides, on a per BSS basis, a communication path of multi-hop communication, which is performed via millimeter-wave wireless communication. Further, each distributed control device 502 decides a communication path inside a BSS. As the wireless communication network via millimeter-wave wireless communication is hierarchized in the above way, such that the load for controlling a communication path in multi-hop communication is dispersed, it is possible to perform high-speed decision and real-time formation-control of paths even in a situation where paths are frequently changed.

For example, a distributed control device 502 comprehends link states of millimeter-wave wireless communication among communication devices inside a BSS that is self-formed by the distributed control device 502 at all times. Further, the central control device 501 collects, from each distributed control device 502, information indicative of a link state of millimeter-wave wireless communication with a communication device belonging to each BSS.

Based on the collected information, the central control device 501 calculates a communication path of multi-hop communication, which is performed via millimeter-wave wireless communication, on a per BSS basis, and performs adjustments of the number of coupled devices inside a BSS, the number of BSSs, etc. Further, the central control device 501 provides results of the calculation and adjustments to each distributed control device 502. In the communication system 500, transmission and reception of such control information between the central control device 501 and a distributed control device 502 as described above is performed via wireless LAN communication, and transmission of content data is performed through multi-hop communication via millimeter-wave wireless communication. Therefore, in the communication system 500, it is possible to reduce the amount of packets and radio wave interference with respect to both of the wireless LAN communication and the millimeter-wave wireless communication.

Further, in the communication system 500 according to the present embodiments, information transmitted from the central control device 501 to a distributed control device 502 is in a simple command format, and the distributed control device 502 that has received a packet decodes the command to perform detail control of paths. Further, a distributed control device 502 transmits information relating to the BSS self-formed by the distributed control device 502 on a per event basis, not at all times. Therefore, as the amount of packets and the amount of communication via wireless LAN communication are reduced in the communication system 500, it is expected that a chance of occurrence of radio wave interference and congestion is reduced and an effect of low power consumption is achieved.

Note that, in order for all communication devices to be able to communicate with another communication device via millimeter-wave wireless communication, data-transfer between BSSs as explained with reference to FIG. 4, etc., is required. In the communication system 500, data-transfer between BSSs is achieved by means of a relay device 503.

A distributed control device 502 selects, from among communication devices coupled to the BSS self-formed by the distributed control device 502, a relay device 503 and a BSS to be a transfer-destination of data. Further, a distributed control device 502 sets (i.e., provides a setting to) the selected communication device to perform a relay (or a "bridge") between BSSs. Each distributed control device 502 provides the central control device 501 with information indicative of BSSs to which data can be transferred by use of a relay device 503.

Each distributed control device 502 sets a relay device 503 corresponding to an adjacent BSS, and controls the relay device 503 to transfer data to the adjacent BSS. Preferably, a distributed control device 502 controls one relay device 503 to transfer data to one another BSS. However, if the above is not possible, the distributed control device 502 may utilize one relay device 503 to transfer data to multiple BSSs.

For example, in FIG. 5, the central control device 501, which has a function as a distributed control device forming the BSS1, is able to transmit data via millimeter-wave wireless communication through a relay device 503 to other BSSs, i.e., the BSS2 through BSS4. Further, data-transfer from the BSS1 to the BSS3 and to the BSS4 is performed through one relay device 503.

Note that, as illustrated in FIG. 4, a solid line connecting communication devices indicates that the communication devices are in the state of being "coupled" via millimeter-wave wireless communication. Further, a dashed line connecting communication devices indicates that the communication devices are in the state of being a "coupling candidate", i.e., being able to become coupled to each other.

Note that, in the example of FIG. 5, as a distributed control device 502 selects a relay device 503 for transferring data to an adjacent BSS, different relay devices 503 are utilized for communication between BSSs in an uplink direction and in a downlink direction.

The above is simply a preferable example, and therefore the same relay device 503 may be utilized for communication between BSSs in an uplink direction and in a downlink direction. Explanation of the present embodiments is provided on the premise that different relay devices 503 are utilized for communication between BSSs in an uplink direction and in a downlink direction.

Note that, although the above explanation is provided on the premise that the central control device 501 has a function as a distributed control device 502, the central control device 501 need not have the function as a distributed control device 502.

FIG. 6 is a drawing illustrating another example of the system configuration according to an embodiment. In the example of FIG. 6, the central control device 501 utilizes wireless LAN communication to form the BSS 506 and to manage a communication path of multi-hop communication, which is performed via millimeter-wave wireless communication, similarly to the communication system 500 as illustrated in FIG. 5.

Further, in the example of FIG. 6, instead of the central control device 501, a distributed control device 502e forms the BSS1. As illustrated, the central control device 501 need not have a function as a distributed control device 502, i.e., a function for forming a BSS of millimeter-wave wireless communication. Even in such a case as illustrated in FIG. 6, the central control device 501 may utilize wireless LAN communication for managing a communication path of multi-hop communication, similarly to the communication system 500 as illustrated in FIG. 5.

As described above, in the communication system 500 according to the present embodiments, the central control device 501 utilizes wireless LAN communication for controlling, by use of a predetermined path-controlling message, multiple distributed control devices 502 to transfer data through a communication path of multi-hop communication.

Further, a distributed control device 502 controls the distributed control device 502 itself and at least one communication device coupled to the network cell self-formed by the distributed control device 502 to transfer data through a communication path of multi-hop communication, based on a path-controlling message received from the central control device 501.

In the communication system 500 according to the present embodiments, as a millimeter-wave wireless communication network has a hierarchic structure in which communication devices inside a network cell is controlled by a distributed control device 502, it is possible to disperse the load on the central control device 501 and to facilitate control of a dynamic communication path.

<Hardware Configuration>

FIGS. 7A and 7B are drawings illustrating an example of a hardware configuration of a communication device according to an embodiment.

For example, a distributed control device 502, a relay device 503, and a coupled device 504 have a hardware configuration of a communication device 700 as illustrated in FIG. 7A. Further, the central control device 501 may have the hardware configuration of a communication device 700 as illustrated in FIG. 7A and may have a hardware configuration of a central control device 501 as illustrated in FIG. 7B.

(Hardware Configuration of a Communication Device)

A communication device 700 has a configuration of a general computer. For example, a communication device 700 includes a central processing unit (CPU) 701, a random access memory (RAM) 702, a read only memory (ROM) 703, a storage device 704, a wireless LAN communication unit 705, a millimeter-wave wireless communication unit 706, a display/input device 707, a bus 708, etc.

The CPU 701 is an arithmetic device that retrieves a program or data stored in the ROM 703, the storage device 704, etc., onto the RAM 702 for executing a process to actualize each function of the communication device 700. The RAM 702 is a volatile memory used as a work area of the CPU 701. The ROM 703 is a non-volatile memory that is able to store a program or data even when the power is off.

The storage device 704 may be, for example, a hard disk drive (HDD), a solid state drive (SSD), a flash ROM, etc., which stores an operation system (OS), an application program, various types of data, etc.

The wireless LAN communication unit (i.e., the second communication unit) 705 is a wireless communication unit, such as IEEE802.11a/b/g/n/ac, etc., for performing wireless LAN communication. The wireless LAN communication unit 705 may include, for example, an antenna, a radio-communication unit, a media access control (MAC) unit, a communication control unit for wireless LAN communication, etc.

The millimeter-wave wireless communication unit (i.e., the first communication unit) 706 is a wireless communication unit, such as IEEE802.11ad, etc., for performing millimeter-wave wireless communication. The millimeter-wave wireless communication unit 706 may include, for example, an antenna, a radio-communication unit, a MAC unit, a communication control unit for millimeter-wave wireless communication, etc.

The display/input device 707 includes a display device for display, input device for accepting an input, etc. The bus 708 is coupled to each of the above constituent elements, so as to transmit an address signal, a data signal, various types of control signals, etc.

(Hardware Configuration of the Central Control Device)

The central control device 501 may include, for example, a wired LAN communication unit 709 in addition to the hardware configuration of the communication device 700 as illustrated in FIG. 7A. Further, the central control device 501 may not include the millimeter-wave wireless communication unit 706.

The wired LAN communication unit 709 connects (as a gateway function) a wireless communication network (i.e., a wireless LAN network or a millimeter-wave wireless network) in the communication system 500 with a wired communication network (such as a LAN network inside a building). The wired LAN communication unit 709 may include, for example, a network interface unit, a communication control unit for actualizing the gateway function, etc.

Note that the hardware configuration of the central control device 501 as illustrated in FIG. 7B is an example. The central control device 501 is not required to include the wired LAN communication unit 709, for example.

<Functional Configuration>

(Functional Configuration of the Central Control Device)

FIG. 8 is a drawing illustrating an example of a functional configuration of a central control device according to an embodiment. The central control device 501 may include, for example, a wired LAN connecting unit 801, a wireless LAN communication unit (AP) 811, a network cell information acquiring unit 812, a network cell information storing unit 813, a communication-path deciding unit 814, a transfer-destination information providing unit 815, a network cell managing unit 816, etc.

In addition, the central control device 501 may further have a function 820 as a distributed control device 502. The function 820 as a distributed control device 502 may include, for example, a millimeter-wave wireless communication unit (AP) 821, a communication link state detecting unit 822, a device information acquiring unit 823, a device information storing unit 824, a relay device selecting unit 825, a relay device setting unit 826, a network cell information providing unit 827, a data transferring unit 828, a coupled device number managing unit 829, etc.

The wired LAN connecting unit 801 is actualized, for example, by a wired LAN communication unit 709 illustrated in FIG. 7B. The wired LAN connecting unit 801 provides a function as a gateway for connecting a communication network in the communication system 500 with an external network.

The wireless LAN communication unit (AP) 811 enables the wireless LAN communication unit 705 of the central control device 501 to provide a function as an AP of wireless LAN communication. The wireless LAN communication unit (AP) 811 is actualized, for example, by the wireless LAN communication unit 705 illustrated in FIGS. 7A and 7B and a program executed by the CPU 701 illustrated in FIGS. 7A and 7B.

Note that, in the following explanation, an AP of wireless LAN communication may be indicated as an "AP of wireless LAN communication". Further, an AP of millimeter-wave wireless communication may be simply indicated as an "AP", so as to be distinct from the "AP of wireless LAN communication".

The wireless LAN communication unit (AP) 811 provides the BSS 506, which is a wireless LAN network on infrastructure mode, via wireless LAN communication (e.g., IEEE802.11a/b/g/n/ac, etc.).

The network cell information acquiring unit 812 utilizes wireless LAN communication for acquiring network cell information from multiple distributed control devices 502 that form different BSSs (i.e., network cells) via millimeter-wave wireless communication, respectively. Further, the network cell information acquiring unit 812 stores the network cell information in the network cell information storing unit 813. The network cell information acquiring unit 812 is actualized, for example, by a program executed by the CPU 701 illustrated in FIGS. 7A and 7B.

Note that, in a case where the central control device 501 has the function 820 of a distributed control device 502, the network cell information acquiring unit 812 may acquire network cell information from the network cell information providing unit 827 included in the function 820 of a distributed control device 502, for example.

The network cell information storing unit 813 is a mechanism for storing network cell information acquired by the network cell information acquiring unit 812. The network cell information storing unit 813 is actualized, for example, by the storage device 704 and the RAM 702 illustrated in FIGS. 7A and 7B and a program executed by the CPU 701 illustrated in FIGS. 7A and 7B. An exemplary image of network cell information that is acquired by the network cell information acquiring unit 812 and stored in the network cell information storing unit 813 is illustrated in FIG. 11A.

FIG. 11A is a drawing illustrating an exemplary image of network cell information 1110 that is managed by the central control device 501. In the example of FIG. 11A, the network cell information 1110 includes information such as "NETWORK CELL NUMBER", "BSSID", "SSID", "IP ADDRESS OF AP", "NUMBER OF COUPLED DEVICES", "COMMUNICATION CHANNEL", "AP THAT CAN BE RELAYED TO", etc.

"NETWORK CELL NUMBER" is information including a number or a name of a BSS formed by a distributed control device 502.

"BSSID (Basic Service Set Identifier)" and "SSID (Service Set Identifier)" is identification information of a distributed control device 502 (or a central control device 501).

"IP (Internet Protocol) ADDRESS OF AP" includes an IP address of a distributed control device 502 (or a central control device 501) in millimeter-wave wireless communication and an IP address of the distributed control device 502 (or the central control device 501) in wireless LAN communication.

"NUMBER OF COUPLED DEVICES" is the number of communication devices 700 coupled to a BSS formed by a distributed control device 502 (or a central control device 501) via millimeter-wave wireless communication. "COMMUNICATION CHANNEL" is a channel number of a communication channel used in a BSS formed by a distributed control device 502 (or a central control device 501) via millimeter-wave wireless communication.

"AP THAT CAN BE RELAYED TO" is identification information of a distributed control device 502 to which data can be transferred from a distributed control device 502 (or a central control device 501) through a relay device 503 via millimeter-wave wireless communication.

Referring back to FIG. 8, the central control device 501 is further explained in the following description.

The communication-path deciding unit 814 decides a communication path of multi-hop communication, based on network cell information 1110 that is acquired by the network cell information acquiring unit 812 and stored in the network cell information storing unit 813. The communication-path deciding unit 814 is actualized, for example, by a program executed by the CPU 701 illustrated in FIGS. 7A and 7B.

For example, the communication-path deciding unit 814 creates network topology that is indicative of a relation of connection among BSSs, based on the network cell information 1110 as illustrated in FIG. 11A, and decides a communication path of multi-hop communication on a per BSS basis.

The transfer-destination information providing unit 815 utilizes wireless LAN communication for providing each distributed control device 502 located in a communication path that is decided by the communication-path deciding unit 814 with information (i.e. transfer-destination information) indicative of a distributed control device 502 or a BSS to be destination of transferring data through multi-hop communication via millimeter-wave wireless communication. The transfer-destination information providing unit 815 is actualized, for example, by a program executed by the CPU 701 illustrated in FIGS. 7A and 7B.

The network cell managing unit 816 is a mechanism for performing management relating to BSSs in the communication system 500. The network cell managing unit 816 is actualized, for example, by a program executed by the CPU 701 illustrated in FIGS. 7A and 7B. The network cell managing unit 816 performs management, for example, such that the number of BSSs in the communication system 500 does not exceed a predetermined limit.

The millimeter-wave wireless communication unit (AP) 821 causes the millimeter-wave wireless communication unit 706 to provide a function as an AP of the millimeter-wave wireless communication system as explained in FIGS. 1A through 4. The millimeter-wave wireless communication unit (AP) 821 is actualized, for example, by the millimeter-wave wireless communication unit 706 illustrated in FIGS. 7A and 7B and by a program executed by the CPU 701 illustrated in FIGS. 7A and 7B.

The communication link state detecting unit 822 detects a communication link state (i.e., communication quality) between each communication device (i.e., a relay device 503 and a coupled device 504) coupled to a BSS formed by the millimeter-wave wireless communication unit (AP) 821. The communication link state detecting unit 822 is actualized, for example, by the millimeter-wave wireless communication unit 706 illustrated in FIGS. 7A and 7B and by a program executed by the CPU 701 as illustrated in FIGS. 7A and 7B.

The device information acquiring unit 823 acquires, from each communication device 700 coupled to a BSS formed by the millimeter-wave wireless communication unit (AP) 821, device information including information indicative of a distributed control device 502 that the communication device 700 is able to become coupled to via millimeter-wave wireless communication. The device information acquiring unit 823 is actualized, for example, by a program executed by the CPU 701 illustrated in FIGS. 7A and 7B.

The device information storing unit 824 is a mechanism for storing device information acquired by the device information acquiring unit 823. The device information storing unit 824 is actualized, for example, by the storage device 704 and the RAM 702 illustrated in FIGS. 7A and 7B and by a program executed by the CPU 701 as illustrated in FIGS. 7A and 7B, etc. An exemplary image of device information that is acquired by the device information acquiring unit 823 and stored in the device information storing unit 824 is illustrated in FIG. 11B.

FIG. 11B is a drawing illustrating an exemplary image of device information 1120. In the example of FIG. 11B, the device information 1120 includes information such as "COUPLED DEVICE NUMBER", "IP ADDRESS OF COMMUNICATION DEVICE", "LQ VALUE", "THROUGHPUT VALUE", "MCS VALUE", "RELAY DEVICE", "AP THAT CAN BE COUPLED TO", etc.

"COUPLED DEVICE NUMBER" is a management number that is assigned temporarily to a communication device 700 coupled to a BSS formed by a millimeter-wave wireless communication unit (AP) 821.

"IP ADDRESS OF COMMUNICATION DEVICE" includes an IP address of millimeter-wave wireless communication and an IP address of wireless LAN communication, with respect to a communication device 700 coupled to a BSS formed by a millimeter-wave wireless communication unit (AP) 821.

"LQ VALUE", "THROUGHPUT VALUE", and "MCS VALUE" are examples of information indicative of a communication link state of millimeter-wave wireless communication between the central control device 501 (or a distributed control device 502) and a communication device 700 coupled to a BSS formed by a millimeter-wave wireless communication unit (AP) 821. "LQ (Link Quality) VALUE" is information indicative of communication quality of a link via millimeter-wave wireless communication. "THROUGHPUT VALUE" is information indicative of throughput, or an amount of data-transfer per unit time. "MCS (Modulation Coding Scheme) VALUE" is information indicative of combination of a modulation type, a coding rate, etc.

"RELAY DEVICE" is information indicative of whether a communication device 700 is a relay device 503 corresponding to an "AP THAT CAN BE COUPLED TO".

"AP THAT CAN BE COUPLED TO" is identification information of another distributed control device 502 to which a communication device 700 is able to become coupled via millimeter-wave wireless communication.

Referring back to FIG. 8, the functional configuration of the central control device 501 is further explained in the following description.

Based on device information 1120 acquired by the device information acquiring unit 823, the relay device selecting unit 825 selects, from among communication devices 700 coupled to the BSS formed by the millimeter-wave wireless communication unit (AP) 821, a communication device 700 for transferring data to another distributed control device 502. The relay device selecting unit 825 is actualized, for example, by a program executed by the CPU 701 illustrated in FIGS. 7A and 7B.

For example, based on information of "AP THAT CAN BE COUPLED TO" that is included in the device information 1120, the relay device selecting unit 825 specifies a communication device 700 that can transfer data to another distributed control device 502 via millimeter-wave wireless communication. Further, in a case where there are multiple communication devices 700 that can transfer data to another distributed control device 502 via millimeter-wave wireless communication, the relay device selecting unit 825 selects one communication device 700 having the best communication quality, based on "LQ VALUE", "THROUGHPUT VALUE", "MCS VALUE", etc.

The relay device setting unit 826 sets the communication device 700 selected by the relay device selecting unit 825 as a relay device 503 for transferring data to another distributed control device 502 via millimeter-wave wireless communication. The relay device setting unit 826 is actualized, for example, by a program executed by the CPU 701 illustrated in FIGS. 7A and 7B.

For example, the relay device setting unit 826 provides a communication device 700 with connection information including identification information (e.g., a BSSID and an SSID), etc., of a distributed control device 502 that is destination of transferring data via millimeter-wave wireless communication. Further, the relay device setting unit 826 provides an instruction to the communication device 700 to operate as a relay device 503.

The network cell information providing unit 827 provides the network cell information acquiring unit 812 with network cell information of the BSS formed by the millimeter-wave wireless communication unit (AP) 821. The network cell information providing unit 827 is actualized, for example, by a program executed by the CPU 701 illustrated in FIGS. 7A and 7B.

The data transferring unit 828 transfers data to a distributed control device 502 that is destination of transferring data through multi-hop communication, based on information provided by the transfer-destination information providing unit 815, which is indicative of the distributed control device 502 that is destination of transferring data through multi-hop communication. The data transferring unit 828 is actualized, for example, by a program executed by the CPU 701 illustrated in FIGS. 7A and 7B.

The coupled device number managing unit 829 manages the number of communication devices 700 coupled to the BSS formed by the millimeter-wave wireless communication unit (AP) 821. The coupled device number managing unit 829 is actualized, for example, by a program executed by the CPU 701 illustrated in FIGS. 7A and 7B.

Note that, as described above, the central control device 501 is not required to have the function 820 of a distributed control device 502 illustrated in FIG. 8.

(Functional Configuration of a Distributed Control Device)

FIG. 9 is a drawing illustrating an example of a functional configuration of a distributed control device according to an embodiment. A distributed control device 502 may include, for example, a wireless LAN communication unit (STA) 911, a network cell information providing unit 912, a transfer-destination information receiving unit 913, and a device function control unit 914, a storing unit 915, etc. Further, the distributed control device 502 may include, for example, the millimeter-wave wireless communication unit (AP) 821, the communication link state detecting unit 822, the device information acquiring unit 823, the device information storing unit 824, the relay device selecting unit 825, the relay device setting unit 826, the data transferring unit 828, the coupled device number managing unit 829, etc.

The wireless LAN communication unit (STA) 911 causes the wireless LAN communication unit 705 of a communication device 700 to provide a function as an STA of wireless LAN communication. The wireless LAN communication unit (STA) 911 is actualized, for example, by the wireless LAN communication unit 705 illustrated in FIG. 7A and by a program executed by the CPU 701 illustrated in FIG. 7A.

For example, the wireless LAN communication unit (STA) 911 receives a beacon of wireless LAN communication transmitted by the central control device 501. Further, the wireless LAN communication unit (STA) 911 establishes wireless LAN communication with the central control device 501 and causes the distributed control device 502 to become coupled to the wireless LAN network.

The network cell information providing unit 912 utilizes wireless LAN communication for providing the central control device 501 with network cell information about the BSS (i.e., network cell) of millimeter-wave wireless communication formed by the distributed control device 502. The network cell information providing unit 912 is actualized, for example, by a program executed by the CPU 701 illustrated in FIG. 7A.

The transfer-destination information receiving unit 913 receives information (i.e., transfer-destination information) about transfer-destination, which is provided from the central control device 501 via wireless LAN communication. The information is indicative of a distributed control device 502 or a BSS, to which data should be transferred through multi-hop communication performed via millimeter-wave wireless communication.

The device function control unit 914 sets a communication device 700 to operate as a distributed control device 502, a relay device 503, or a coupled device 504. The device function control unit 914 is actualized, for example, by a program executed by the CPU 701 illustrated in FIG. 7A.

For example, the device function control unit 914 causes a communication device 700 to operate as a coupled device 504. Further, in a case where the communication device 700 operating as a coupled device 504 cannot detect a BSS of millimeter-wave wireless communication, the device function control unit 914 causes the communication device 700 to operate as a distributed control device 502. Further, when a communication device 700 is operating as a coupled device 504 coupled to a BSS, the device function control unit 914 causes the communication device 700 to operate as a relay device 503, upon being controlled by a distributed control device 502 or the central control device 501, which forms the BSS.

The storing unit 915 stores, for example, a program, etc., for causing a communication device 700 to operate as a distributed control device 502, a relay device 503, or a coupled device 504. The storing unit 915 is actualized, for example, by the storage device 704 illustrated in FIG. 7A and by a program executed by the CPU 701 illustrated in FIG. 7A.

The function 820 of a distributed control device, which is included in a distributed control device 502, is the same as the function 820 of a distributed control device 502 as illustrated in FIG. 8, except that the distributed control device 502 includes the network cell information providing unit 912 instead of the network cell information providing unit 827 illustrated in FIG. 8.

The millimeter-wave wireless communication unit (AP) 821 is a mechanism for causing the millimeter-wave wireless communication unit 706 of a communication device 700 to operate as an AP of millimeter-wave wireless communication. The millimeter-wave wireless communication unit (AP) 821 is actualized, for example, by the millimeter-wave wireless communication unit 706 illustrated in FIG. 7A and by a program executed by the CPU 701 illustrated in FIG. 7A.

The communication link state detecting unit 822 detects a communication link state with each of communication devices coupled to the BSS formed by the millimeter-wave wireless communication unit (AP) 821. The communication link state detecting unit 822 is actualized, for example, by the millimeter-wave wireless communication unit 706 illustrated in FIG. 7A and by a program executed by the CPU 701 illustrated in FIG. 7A.

The device information acquiring unit 823 acquires, from each communication device 700 coupled to the BSS formed by the millimeter-wave wireless communication unit (AP) 821, device information including information indicative of a distributed control device 502 to which the communication device 700 can become coupled via millimeter-wave wireless communication. The device information acquiring unit 823 is actualized, for example, by a program executed by the CPU 701 illustrated in FIG. 7A.

The device information storing unit 824 is a mechanism for storing device information acquired by the device information acquiring unit 823. The device information storing unit 824 is actualized, for example, by the storage device 704 and the RAM 702 illustrated in FIG. 7A and by a program executed by the CPU 701 illustrated in FIG. 7A.

Based on device information acquired by the device information acquiring unit 823, the relay device selecting unit 825 selects, from among at least one communication device 700 coupled to the BSS formed by the millimeter-wave wireless communication unit (AP) 821, a communication device 700 for transferring data to another distributed control device 502. The relay device selecting unit 825 is actualized, for example, by a program executed by the CPU 701 illustrated in FIG. 7A.

The relay device setting unit 826 sets the communication device 700 selected by the relay device selecting unit 825 as a relay device 503 for transferring data to another distributed control device 502 via millimeter-wave wireless communication. The relay device setting unit 826 is actualized, for example, by a program executed by the CPU 701 as illustrated in FIG. 7A.

Based on the information received by the transfer-destination information receiving unit 913, which is indicative of a distributed control device 502 that is destination of transferring data through multi-hop communication, the data transferring unit 828 transfers data to the distributed control device 502 that is the destination of transferring data through multi-hop communication. The data transferring unit 828 is actualized, for example, by a program executed by the CPU 701 illustrated in FIG. 7A.

The coupled device number managing unit 829 manages the number of communication devices 700 coupled to the BSS formed by the millimeter-wave wireless communication unit (AP) 821. The coupled device number managing unit 829 is actualized, for example, by a program executed by the CPU 701 illustrated in FIG. 7A.

(Functional Configuration of a Relay Device)

FIG. 10A is a drawing illustrating an example of a functional configuration of a relay device. A relay device 503 may include, for example, a wireless LAN communication unit (STA) 911, a device function control unit 914, a storing unit 915, a millimeter-wave wireless communication unit (STA) 1011, a communication link state detecting unit 1012, a connection information storing unit 1013, a connection control unit 1014, a data relaying unit 1015, etc.

Note that explanation of the wireless LAN communication unit (STA) 911, the device function control unit 914, and the storing unit 915 is omitted as the above units are the same as the wireless LAN communication unit (STA) 911, the device function control unit 914, and the storing unit 915 included in a distributed control device 502 as explained with reference to FIG. 9.

The millimeter-wave wireless communication unit (STA) 1011 causes the millimeter-wave wireless communication unit 706 of a communication device 700 to operate as an STA of the millimeter-wave wireless communication system as explained with reference to FIGS. 1A through 4. The millimeter-wave wireless communication unit (STA) 1011 is actualized, for example, by the millimeter-wave wireless communication unit 706 illustrated in FIG. 7A and by a program executed by the CPU 701 as illustrated in FIG. 7A.

For example, the millimeter-wave wireless communication unit (STA) 1011 causes to become coupled to a BSS formed by a distributed control device 502 (or the central control device 501) as an STA.

The communication link state detecting unit 1012 detects a communication link state with the distributed control device 502 forming the BSS to which the millimeter-wave wireless communication unit (STA) 1011 is coupled. The communication link state detecting unit 822 is actualized, for example, by the millimeter-wave wireless communication unit 706 illustrated in FIG. 7A and by a program executed by the CPU 701 illustrated in FIG. 7A.

The connection information storing unit 1013 stores connection information provided via wireless LAN communication by the distributed control device 502 (or the central control device 501). The connection information includes identification information (e.g., a BSSID and an SSID), etc., of a distributed control device 502 to be destination of transferring data via millimeter-wave wireless communication. The connection information storing unit 1013 is actualized, for example, by the RAM 702 and the storage device 704 illustrated in FIG. 7A and by a program executed by the CPU 701 illustrated in FIG. 7A. An exemplary image of connection information stored in the connection information storing unit 1013 is illustrated in FIG. 11C.

FIG. 11C is a drawing illustrating an exemplary image of connection information 1130. In the example of FIG. 11C, the connection information 1130 includes "NETWORK CELL NUMBER", "CONNECTION STATE", "BSSID", "SSID", "IP ADDRESS", "CHANNEL NUMBER", etc.

"NETWORK CELL NUMBER" is information indicative of a numerical number or a name of a BSS. "CONNECTION STATE" is indicative of whether being in a state of "COUPLED" or "COUPLING CANDIDATE" with respect to a BSS corresponding to "NETWORK CELL NUMBER".

"BSSID" and "SSID" are identification information of a distributed control device 502 (or the central control device 501) that forms a BSS corresponding to "NETWORK CELL NUMBER".

"IP ADDRESS" is an IP address of millimeter-wave wireless communication with respect to a distributed control device 502 (or the central control device 501) that forms a BSS corresponding to "NETWORK CELL NUMBER". "CHANNEL NUMBER" is a channel number of millimeter-wave wireless communication with respect to a BSS corresponding to "NETWORK CELL NUMBER".

Referring back to FIG. 10A, the functional configuration of a relay device 503 is further explained.

The connection control unit 1014 is coupled via millimeter-wave wireless communication to a distributed control device 502 (hereinafter referred to as a transfer-from distributed control device 502), which is in a connection state of "COUPLED" according to the connection information 1130 stored in the connection information storing unit 1013. Further, the connection control unit 1014 receives data via millimeter-wave wireless communication from the transfer-from distributed control device 502, and then disconnects from the transfer-from distributed control device 502 to become coupled to another distributed control device 502 (hereinafter referred to as a transfer-destination distributed control device 502), which had been in a connection state of "COUPLING CANDIDATE". The connection control unit 1014 is actualized, for example, by a program executed by the CPU 701 illustrated in FIG. 7A.

The data relaying unit 1015 transfers the data received via millimeter-wave wireless communication from the transfer-from distributed control device 502 to the transfer-destination distributed control device 502. The data relaying unit 1015 is actualized, for example, by a program executed by the CPU 701 illustrated in FIG. 7A.

(Functional Configuration of a Coupled Device)

FIG. 10B is a drawing illustrating an example of a functional configuration of a coupled device. A coupled device 504 may include, for example, a wireless LAN communication unit (STA) 911, a device function control unit 914, a storing unit 915, a millimeter-wave wireless communication unit (STA) 1011, a communication link state detecting unit 1012, etc.

Explanation of functions of the wireless LAN communication unit (STA) 911, the device function control unit 914, and the storing unit 915 is omitted as functions of the above units are the same as the wireless LAN communication unit (STA) 911, the device function control unit 914, and the storing unit 915 included in a distributed control device 502 as explained with reference to FIG. 9.

The millimeter-wave wireless communication unit (STA) 1011 causes the millimeter-wave wireless communication unit 706 of a communication device 700 to operate as an STA of the millimeter-wave wireless communication system as explained with reference to FIGS. 1A through 4. The millimeter-wave wireless communication unit (STA) 1011 is actualized by, for example, by the millimeter-wave wireless communication unit 706 illustrated in FIG. 7A and by a program executed by the CPU 701 illustrated in FIG. 7A.

The communication link state detecting unit 1012 detects a communication link state with a distributed control device 502 forming a BSS to which the millimeter-wave wireless communication unit (STA) 1011 is coupled. The communication link state detecting unit 1012 is actualized, for example, by the millimeter-wave wireless communication unit 706 illustrated in FIG. 7A and a program executed by the CPU 701 illustrated in FIG. 7A.

<Sequence of Processing>

Next, processing of a method for managing communication in the communication system 500 according to the present embodiments is explained in the following description.

First Embodiment

<<Process for Creating a Communication Network>>

(Process for a Communication Device to Newly Join a Communication System)

FIG. 12 is a flowchart illustrating an example of a process for a communication device according to the first embodiment to newly join a communication system. The following process is an example of a process for a communication device 700 to newly join the communication system 500. Note that, at the time when the process as illustrated in FIG. 12 starts, the central control device 501 is operating as an AP of wireless LAN communication, and a communication device 700 stores connection information in advance, for connecting to the central control device 501 via wireless LAN communication.

At Step S1201, a communication device 700 starts an operation as a coupled device 504 and utilizes wireless LAN communication for becoming coupled to a central control device 501 operating as an AP of wireless LAN communication.

At Step S1202, the coupled device 504 performs scanning via millimeter-wave wireless communication to detect an AP (i.e., a distributed control device 502 or the central control device 501) of millimeter-wave wireless communication.

At Step S1203, in a case where the coupled device 504 determines that there is an AP as a result of the scanning via millimeter-wave wireless communication, the coupled device 504 proceeds processing to Step S1204. Contrarily, in a case where the coupled device 504 determines that there is not an AP as a result of the scanning via millimeter-wave wireless communication, the coupled device 504 proceeds processing to Step S1206.

At Step S1204, the millimeter-wave wireless communication unit (STA) 1011 of the coupled device 504 becomes coupled to the detected AP via millimeter-wave wireless communication as a coupled device 504.

At Step S1205, the communication link state detecting unit 1012 of the coupled device 504 provides the coupled AP with device information including an LQ value that is detected as a result of scanning an AP at Step S1202.

On the other hand, at Step S1206, the device function control unit 914 of the coupled device 504 utilizes wireless LAN communication for transmitting a request for creating a new BSS, which includes the result of scanning an AP at Step S1202, to the central control device 501.

At Step S1207, the device function control unit 914 of the coupled device 504 divaricates processing, based on whether permission information for permitting creation of a new BSS is received from the central control device 501.

In a case where permission information is received from the central control device 501, the device function control unit 914 proceeds processing to Step S1208. Contrarily, in a case where the permission information is not received from the central control device 501, the device function control unit 914 reverses processing back to Step S1202, so as to repeat the same processing.

Note that, as an example of a case where the central control device 501 rejects creation of a new BSS, there may be a case where, in response to a request from a coupled device 504 to create a new BSS, the central control device 501 has provided a response indicative of permission of creation, but the new BSS has not been created yet. In a case where the central control device 501 receives a request for creating a new BSS from another coupled device 504 in such a situation as above, the central control device 501 may reject the request from the said another coupled device 504 in consideration of the possibility that a new BSS will be created by the coupled device 504 to which the permission of creating a new BSS has already been provided.

Additionally, the central control device 501 may reject creation of a new BSS requested by a coupled device 504, in a case where the number of BSSs in the communication system 500 would exceed a predetermined limit.

At Step S1208, the device function control unit 914 of the coupled device 504 changes the role of the communication device 700 from a coupled device 504 to a distributed control device 502. In the above way, the communication device 700 forms a new BSS of millimeter-wave wireless communication, as a distributed control device 502.

At Step S1209, the distributed control device 502 (i.e., the communication device 700) that has formed the new BSS utilizes wireless LAN communication for providing the central control device 501 with completion of creating the BSS.

Through the above processing, a communication device 700 that newly joins the communication system 500 starts operating as a distributed control device 502 or a coupled device 504.

FIGS. 13A and 13B are drawings for explaining a process for a communication device according to the first embodiment to newly join the communication system. In FIG. 13A, three communication devices 700 newly join the communication system 500 including a BSS1 formed by the central control device 501. In the above case, the three communication devices 700 start scanning an AP as coupled devices 504-1 through 504-3, respectively.

In the example of FIG. 13A, the coupled devices 504-1 and 504-2 can detect the BSS1 formed by the central control device 501. Therefore, the coupled devices 504-1 and 504-2 become coupled to the central control device 501 via millimeter-wave wireless communication as illustrated in FIG. 13B.

However, in the example of FIG. 13A, the coupled device 504-3 cannot detect the BSS1 formed by the central control device 501. Therefore, the coupled device 504-3 operates as a new distributed control device 502 to newly create a BSS2 as illustrated in FIG. 13B.

(Process for a Communication Device to Newly Join a Communication System)

FIG. 14 is a sequence diagram (1) illustrating an example of a process for a communication device to newly join a communication system according to the first embodiment. The process is an example of a process performed in the communication system 500 in the case where it is determined that "there is an AP" at Step S1203 of FIG. 12. Note that, in FIG. 14 and subsequent drawings, a solid arrow is indicative of a signal or information transmitted via millimeter-wave wireless communication, and a dashed arrow is indicative of a signal or information transmitted via wireless LAN communication.

At Step S1401 of FIG. 14, a communication device 700 starts operating as a coupled device 504.

At Step S1402, the wireless LAN communication unit (STA) 911 of the coupled device 504 becomes coupled via wireless LAN communication to a central control device 501 operating as an AP of wireless LAN communication.

At Step S1403, the millimeter-wave wireless communication unit (STA) 1011 of the coupled device 504 performs scanning (i.e., detects a beacon transmitted by an AP) of an AP (i.e., a distributed control device 502 or a central control device 501) of millimeter-wave wireless communication.

Suppose that, at Step S1404, the millimeter-wave wireless communication unit (STA) 1011 of the coupled device 504 receives a beacon transmitted by a distributed control device 502-1.

At Step S1405, the communication link state detecting unit 1012 of the coupled device 504 detects an LQ value (hereinafter referred to as an LQ value 1) of the received beacon.

At Step S1406, the millimeter-wave wireless communication unit (STA) 1011 of the coupled device 504 becomes coupled to the distributed control device 502-1 via millimeter-wave wireless communication.

At Step S1407, the communication link state detecting unit 1012 of the coupled device 504 provides the distributed control device 502-1 with device information including the detected LQ value 1. The device information includes, for example, information corresponding to a "COUPLED DEVICE NUMBER" included in the device information 1120 as illustrated in FIG. 11B.

At Step S1408, the device information acquiring unit 823 of the distributed control device 502-1 acquires the device information provided by the coupled device 504, and stores the device information in the device information storing unit 824 as device information 1120.

At Step S1409, the network cell information providing unit 912 of the distributed control device 502-1 utilizes wireless LAN communication for providing the central control device 501 with network cell information about the BSS formed by the distributed control device 502-1. The network cell information includes, for example, information corresponding to a "NETWORK CELL NUMBER" included in the network cell information as illustrated in FIG. 11A.

At Step S1410, the millimeter-wave wireless communication unit (STA) 1011 of the coupled device 504 coupled to the BSS formed by the distributed control device 502-1 performs scanning of millimeter-wave wireless communication, for example, on a regular basis.

Suppose that, at Step S1411, the millimeter-wave wireless communication unit (STA) 1011 of the coupled device 504 receives a beacon transmitted by the distributed control device 502-1.

Suppose that, at Step S1412, the millimeter-wave wireless communication unit (STA) 1011 of the coupled device 504 receives a beacon transmitted by a distributed control device 502-2.

At Step S1413, the communication link state detecting unit 1012 of the coupled device 504 detects an LQ value 1 of the beacon received at Step S1411 and an LQ value (hereinafter referred to as an LQ value 2) of the beacon received at Step S1412.

At Step S1414, the communication link state detecting unit 1012 of the coupled device 504 provides device information including the detected LQ values 1 and 2 to the distributed control device 502-1.

At Step S1414, the device information acquiring unit 823 of the distributed control device 502-1 acquires the device information provided by the coupled device 504. At Step S1415, the device information is stored in the device information storing unit 824 as device information 1120.

At Step S1416, the network cell information providing unit 912 of the distributed control device 502-1 utilizes wireless LAN communication for providing network cell information about the BSS formed by the distributed control device 502-1.

Through the above processing, the central control device 501 acquires network cell information as illustrated, for example, in FIG. 11A, and an AP (i.e., a distributed control device 502 or the central control device 501) manages device information 1120 as illustrated in FIG. 11B.

FIG. 15 is a sequence diagram (2) illustrating an example of a process for a communication device to newly join the communication system according to the first embodiment. The process is an example of a process performed in the communication system 500 in the case where it is determined that "there is not an AP" at Step S1203 of FIG. 12. Note that, as the processing of Steps S1401 trough S1403 of FIG. 15 are the same as in FIG. 14, the following description mainly explains differences from the processing illustrated in FIG. 14.

Suppose that, at Step S1501, the millimeter-wave wireless communication unit (STA) 1011 of the coupled device 504 cannot receive a beacon transmitted by a distributed control device 502-1.

At Step S1502, the device function control unit 914 of the coupled device 504 utilizes wireless LAN communication for transmitting a request for creating a new BSS, which includes the result of scanning an AP, to the central control device 501.

At Step S1503, the network cell managing unit 816 of the central control device 501 checks the number of BSSs in the communication system 500. The network cell managing unit 816 divaricates processing, based on the number of BSSs in the communication system 500.

In a case where the number of BSSs in the communication system 500 is smaller a predetermined limit, the network cell managing unit 816 utilizes wireless LAN communication for providing permission information for permitting creation of a network cell to the coupled device 504, at Step S1504. The permission information includes, for example, information about a communication channel and a network address of a BSS to be newly created, information about another BSS, etc.

At Step S1505, the device function control unit 914 of the coupled device 504 changes the role of the communication device 700 from a coupled device 504 to a distributed control device 502. Further, the communication device 700 that has started operating as a distributed control device 502 forms a new BSS, based on the information provided by the central control device 501.

At Step S1506, the distributed control device 502 (i.e., the coupled device 504) that has formed the new BSS provides the central control device 501 with notification indicative of completion of creating the BSS.

Contrarily, in a case where the number of the BSSs in the communication system 500 is equal to or greater than the predetermined limit, the network cell managing unit 816 utilizes wireless LAN communication for providing rejection information for rejecting creation of a network cell to the coupled device 504, at Step S1507.

At Step S1508, the millimeter-wave wireless communication unit (STA) 1011 of the coupled device 504 performs scanning of an AP of millimeter-wave wireless communication again, so as to repeat the same processing.

(Process for Setting a Relay Device)

Next, a process performed by an AP of millimeter-wave wireless communication for setting a relay device is explained in the following description.

FIG. 16 is a flowchart illustrating an example of a process for setting a relay device according to the first embodiment. The process is an example of a process for an AP (i.e., a distributed control device 502 or the central control device 501) to set one or more communication devices 700 coupled to the network cell formed by the AP as a relay device.

At Step S1601, the device information acquiring unit 823 of an AP acquires device information of a communication device 700 coupled to the BSS formed by the AP.

At Step S1602, the device information acquiring unit 823 of the AP determines whether the acquired device information has changed from device information acquired in the previous time.

In a case where the device information has not changed, the device information acquiring unit 823 of the AP terminates processing. Contrarily, in a case where the device information has changed, the device information acquiring unit 823 of the AP proceeds processing to Step S1603.

At Step S1603, the relay device selecting unit 825 of the AP extracts a communication device 700 (i.e., a relay device 503 or a coupled device 504) that is able to relay data to another BSS via millimeter-wave wireless communication.

Note that the process for setting a relay device is conducted the same number of times as the number of adjacent BSSs. However, for ease of explanation, the following explanation is provided on the premise that there is only one adjacent BSS.

At Step S1604, it is determined whether a communication device 700 that is able to relay data to another BSS via millimeter-wave wireless communication is extracted.

In a case where a communication device 700 that is able to relay data to another BSS via millimeter-wave wireless communication is not extracted, the relay device selecting unit 825 of the AP terminates processing. Contrarily, in a case where a communication device 700 that is able to relay data to another BSS via millimeter-wave wireless communication is extracted, the relay device selecting unit 825 of the AP proceeds processing to Step S1605.

At Step S1605, the relay device selecting unit 825 of the AP determines whether multiple communication devices 700 are extracted at Step S1604.

In a case where multiple communication devices 700 are extracted, the relay device selecting unit 825 of the AP proceeds processing to Step S1606. Contrarily, in a case where multiple communication devices 700 are not extracted, i.e., in a case where only one communication device 700 is extracted, the relay device selecting unit 825 of the AP proceeds processing to Step S1607.

At Step S1606, the relay device selecting unit 825 of the AP selects, from among the extracted multiple communication devices 700, one communication device 700 having the best communication quality (e.g., the highest LQ value or throughput value, etc.).

Contrarily, at Step S1607, the relay device selecting unit 825 of the AP selects the only one extracted communication device 700.

At Step S1608, the relay device setting unit 826 of the AP sets the selected communication device 700 as a relay device to relay to another BSS. For example, the relay device setting unit 826 of the AP transmits connection information as illustrated in FIG. 11C to the selected communication device 700 and sets the selected communication device 700 as a relay device 503. In the above way, the selected communication device 700 starts operating as a relay device 503 to relay to another BSS.

At Step S1609, the relay device setting unit 826 of the AP determines whether a relay device 503 has been changed because of the above processing.

In a case where a relay device 503 has not been changed, the relay device setting unit 826 of the AP terminates processing. Contrarily, in a case where a relay device 503 has been changed, the relay device setting unit 826 of the AP sets the former relay device 503 to a coupled device 504.

Through the above processing, in a case where there is a change with respect to communication devices 700 belonging to a BSS formed by an AP, the AP is able to update a relay device 503 for transferring data to another BSS via millimeter-wave wireless communication.

FIGS. 17A through 19B are drawings for explaining the process for setting a relay device according to the first embodiment.

In the case as illustrated in FIG. 17A, a distributed control device 502-1 forms a BSS1, and a distributed control device 502-2 forms a BSS2. Further, coupled devices 504-1 and 504-2 are coupled to the distributed control device 502-1 via millimeter-wave wireless communication.

In the above situation, in a case where the distributed control device 502-1 conducts the process for setting a relay device as illustrated in FIG. 16, the coupled device 504-2 as illustrated in FIG. 17A is set as a relay device 503-1 for transferring data to the BSS2, as illustrated in FIG. 17B. Note that, in the above situation, data can be transmitted from the distributed control device 502-1 to the distributed control device 502-2 via millimeter-wave wireless communication, although data cannot be transmitted from the distributed control device 502-2 to the distributed control device 502-1 via millimeter-wave wireless communication.

In the above situation, in a case where, for example, a coupled device 504-3 becomes newly coupled to the BSS2 as illustrated in FIG. 17C, the distributed control device 502-2 conducts the process for setting a relay device as illustrated in FIG. 16. Hence, the coupled device 504-3 illustrated in FIG. 17C is set as a relay device 503-2 for transferring data to the BSS1, as illustrated in FIG. 17D. In the above way, data transmission becomes possible via millimeter-wave wireless communication between the distributed control device 502-1 and the distributed control device 502-2 in both directions.

Further, in the above situation, in a case where a coupled device 504-4 becomes newly coupled to the BSS2, as illustrated in FIG. 18A, the distributed control device 502-2 conducts the process for setting a relay device as illustrated in FIG. 16. In the above case, the distributed control device 502-2 selects, from among communication devices 700 that is able to transfer data to the BSS1, i.e., the coupled device 504-4 and the relay device 503-2, a communication device 700 having better communication quality to be a new relay device.

For example, in a case where the coupled device 504-4 has better communication quality than the relay device 503-2, the coupled device 504-4 illustrated in FIG. 18A is newly set as a relay device 503-3 as illustrated in FIG. 19B. In the above situation, the relay device 503-2 illustrated in FIG. 18A starts operating as a coupled device 504-3 again, as illustrated in FIG. 18B.

The following description explains an exceptional process with respect to the process for setting a relay device.

In the example as illustrated in FIG. 19A, a central control device 501 forming a BSS1 is coupled, via one relay device 503, to a distributed control device 502*b* forming a BSS3 and to a distributed control device 502*c* forming a BSS4.

As described above, in a case where there is only one relay device 503 that is able to relay from the BSS1 to the BSS3 and to the BSS4, the relay device selecting unit 825 of an AP may select one relay device 503 for transferring data to multiple BSSs.

Note that, the above is an exceptional process that is performed, for example, in a case where there is only one relay device 503 that is able to relay to the BSS3 and to the BSS4 or in a case where there is a communication device 700 that is able to relay, but the communication quality is not desirable (e.g., lower than a threshold value).

In situations other than the above, it is preferred that the relay device selecting unit 825 of an AP controls such that transfer-destination of a relay device 503 is one BSS.

In the example as illustrated in FIG. 19B, there is not a relay device 503 in the BSS2. Therefore, a communication device 700 in the BSS2 such as a distributed control device 502*a* is able to receive data from the BSS1 but is not able to transmit data to the BSS1.

In the above case, with respect to a BSS with only a distributed control device 502 such as the BSS2 of FIG. 19B, it is preferred that the communication-path deciding unit 814 of a central control device 501 manages the communication path, such that data is transferred to the distributed control device 502*a* last, when transferring the data to multiple communication devices 700, etc.

Note that, in a case where a communication device 700 in the BSS2 as illustrated in FIG. 19B is where data is transferred from, the communication device 700 may utilize wireless LAN communication for transferring content data to the central control device 501. In the above case, the central control device 501 may utilize millimeter-wave wireless communication for transferring the content data to destination communication devices 700.

Note that, in the present embodiment, there may be a BSS that is not able to transfer data with any other BSSs through a relay device 503 via millimeter-wave wireless communication. In such a case, similarly to the case as illustrated in FIG. 19B, a distributed control device 502, which forms the BSS that is not able to transfer data with any other BSSs via millimeter-wave wireless communication, may utilize wireless LAN communication for transferring content data to the central control device 501.

Through the above processing a millimeter-wave wireless communication network is formed by multiple BSSs.

<<Process for Performing Communication>>

Next, the following description explains a process for performing communication regarding multi-hop communication performed by a central control device 501.

(Network Configuration)

FIG. 20 is a drawing illustrating an example of a network configuration of a communication system according to the first embodiment. In the example of FIG. 20, there are eight BSSs, i.e., BSS1 through BSS8 in the communication system 500. Further, in FIG. 20, for example, "ch1" in brackets as illustrated right by "BSS1" indicates that the communication channel used for the BSS1 is "ch1".

The central control device 501 according to the present embodiment manages a network configuration of the communication system 500 as illustrated in FIG. 20 on a per BSS basis, as illustrated in FIG. 21.

(Management of a Communication Path)

FIG. 21 is a drawing illustrating an example of network topology created by a central control device according to the first embodiment. For example, the central control device 501 creates network topology 2100 as illustrated in FIG. 21 on a per BSS basis, based on network cell information 1110 as illustrated in FIG. 11A.

In FIG. 21, the numbers in brackets below each BSS name indicate a communication channel and the number of communication devices 700 coupled to the BSS. For example, in the example of FIG. 21, it is indicated that the communication channel used for the BSS1 is "1", and the number of communication devices 700 coupled to the BSS1 is "7".

The central control device 501 manages a communication path of multi-hop communication on a per BSS basis, based on such network topology on a per BSS basis as illustrated in FIG. 21. The reason for such a management approach is that there is no need for the central control device 501 to manage a communication path inside a BSS, as a communication path inside a BSS is managed by a distributed control device 502 through such a process for setting a relay device as illustrated in FIG. 16. Therefore, the load imposed on the central control device 501 is considerably reduced.

(Processing Performed By a Central Control Device)

FIG. 22 is a flowchart illustrating an example of processing performed by a central control device according to the first embodiment.

At Step S2201, the network cell information acquiring unit 812 of a central control device 501 utilizes wireless LAN communication for acquiring network cell information from multiple distributed control devices 502.

At Step S2202, the communication-path deciding unit 814 of the central control device 501 creates such network topology 2100 of millimeter-wave wireless communication on a per BSS basis as illustrated in FIG. 21, based on the acquired network cell information.

At Step S2203, the central control device 501 determines whether a request (i.e., transfer-starting request) for starting transmission via millimeter-wave wireless communication is received. The transfer-starting request is transmitted from a communication device 700 in the communication system 500 via wireless LAN communication.

In a case where a transfer-starting request is not received, the central control device 501 repeats conducting processing of Steps S2201 and S2202. Contrarily, in a case where a transfer-starting request is received, the central control device 501 proceeds processing to Step S2204.

At Step S2204, the communication-path deciding unit 814 of the central control device 501 determines (i.e., calculates) a communication path on a per BSS basis from a BSS including a transfer-from communication device 700 to a BSS including a transfer-destination communication device 700. In the case of the following description, the communication-path deciding unit 814 calculates a path to the transfer-destination, based on a well-known path-searching algorithm such as Dijkstra's algorithm.

At Step S2205, the transfer-destination information providing unit 815 of the central control device 501 provides information about a BSS to be a transfer-destination of data to at least one distributed control device 502 located in the communication path determined by the communication-path deciding unit 814.

At Step S2206, the transfer-destination information providing unit 815 of the central control device 501 instructs the communication device 700, from which the transfer-starting request is transmitted, to transmit data.

(Process for Performing Communication in a Communication System)

Next, the following description explains an example of an overall process for transferring data in the communication system 500.

FIG. 23 is a sequence diagram illustrating an example of a process for transferring data in the communication system according to the first embodiment. The process is an example of a process for transferring data via millimeter-wave wireless communication in the communication system 500 as illustrated in FIG. 20, for example, from a coupled device 504a included in a BSS7 to a coupled device 504b included in a BSS8.

At Step S2301, a coupled device 504a, which is the transfer-from coupled device, utilizes wireless LAN communication for transmitting to a central control device 501 a transfer-starting request including destination-information (e.g., an IP address) of a coupled device 504b, which is the transfer-destination coupled device.

At Step S2302, the communication-path deciding unit 814 of the central control device 501 determines a communication path on a per BSS basis, from a BSS7 including the transfer-from coupled device 504a to a BSS8 including the transfer-destination coupled device 504b. For example, based on such network topology 2100 as illustrated in FIG. 21, the communication-path deciding unit 814 determines to transfer data in such an order as the BSS7, the BSS5, and the BSS8.

At Steps S2303 through S2305, the transfer-destination information providing unit 815 of the central control device 501 provides the distributed control devices 502a, 502b, and 502c that are located in the communication path determined by the communication-path deciding unit 814 with destination of transferring data.

For example, the transfer-destination information providing unit 815 provides the distributed control device 502a forming the BSS7 with information (e.g. a BSSID, an SSID, etc.) for designating the distributed control device 502b forming the BSS5 as destination of transferring data. Similarly, the transfer-destination information providing unit 815 provides the distributed control device 502b forming the BSS5 with information for designating the distributed control device 502c forming the BSS8 as destination of transferring data. Further, the transfer-destination information providing unit 815 provides the distributed control device 502c forming the BSS8 with, for example, information not to transfer the data to any other BSSs.

At Step S2306, the transfer-destination information providing unit 815 of the central control device 501 instructs the coupled device 504a, which is the transfer-from coupled device, to transmit data.

At Step S2307, the coupled device 504a transmits data including the destination-information to the distributed control device 502a to which the coupled device 504a is coupled via millimeter-wave wireless communication.

At Step S2308, based on such device information 1120 as illustrated in FIG. 11B, the distributed control device 502a specifies a relay device 503a for transferring the data to the distributed control device 502b, which is the designated transfer-destination, and then transmits the data to the relay device 503a.

At Step S2309, upon receiving the data, the connection control unit 1014 of the relay device 503a disconnects the millimeter-wave wireless communication from the distributed control device 502a.

At Step S2310, based on such connection information 1130 as illustrated in FIG. 11C, the connection control unit 1014 of the relay device 503a becomes coupled via millimeter-wave wireless communication to the distributed control device 502b, which is a pre-set as a "coupling candidate".

At Step S2311, the data relaying unit 1015 of the relay device 503a transfers the data received from the distributed control device 502a to the distributed control device 502b.

Preferably, after the data relaying unit 1015 transfers the data, the connection control unit 1014 of the relay device 503a disconnects from the distributed control device 502b, and then becomes coupled to the distributed control device 502a again via millimeter-wave wireless communication.

At Step S2312, based on such device information 1120 as illustrated in FIG. 11B, the distributed control device 502b specifies a relay device 503b for transferring the data to the distributed control device 502c, which is the designated transfer-destination, and then transmits the data to the relay device 503b.

At Step S2313, upon receiving the data, the connection control unit 1014 of the relay device 503b disconnects millimeter-wave wireless communication from the distributed control device 502b.

At Step S2314, based on such connection information 1130 as illustrated in FIG. 11C, the connection control unit 1014 of the relay device 503b becomes coupled via millimeter-wave wireless communication to the distributed control device 502c, which is pre-set as a "coupling candidate".

At Step S2315, the data relaying unit 1015 of the relay device 503b transfers the data received from the distributed control device 502b to the distributed control device 502c.

Preferably, after the data relaying unit 1015 transfers the data, the connection control unit 1014 of the relay device 503b disconnects from the distributed control device 502c, and then becomes coupled to the distributed control device 502b again via millimeter-wave wireless communication.

At Step S2316, the distributed control device 502c transmits the data to the coupled device 504b, based on the destination-information included in the data, not transferring the received data to any other BSSs.

As described above, in the communication system according to the present embodiment, data is easily transmitted among communication devices 700 by means of multi-hop communication via high-speed millimeter-wave wireless communication.

Second Embodiment

As the second embodiment, the following description explains an example of a process performed in a case where a limit is set for the number (hereinafter referred to as a connection acceptable number) of the communication devices 700 connectable to an AP (i.e., a distributed control device 502 or the central control device 501) of millimeter-wave wireless communication. The connection acceptable number may be calculated, for example, based on restriction relating to the millimeter-wave wireless communication unit 706 or system requirements, etc. Further, preferably, an administrator, etc., may be allowed to change the value of the connection acceptable number.

FIGS. 24A and 24B are drawings for explaining a process for a communication device to join a communication system according to the second embodiment. Suppose that the connection acceptable number of the central control device 501 is seven, in the example of FIG. 24A. Further, the following description explain a case where a BSS1 formed by the central control device 501 and coupled by seven coupled devices 504, which is the connection acceptable number of coupled devices 504, is requested to be coupled by a coupled device 504a, which is the eighth coupled device.

In the above case, the network cell managing unit 816 of the central control device 501 (or a distributed control device 502, in a case of a distributed control device 502) permits the eighth coupled device 504a to be temporarily coupled, although the connection acceptable number is exceeded. Then, the network cell managing unit 816 transmits a disconnection-requesting message for requesting a communication device 700 having the poorest communication quality (e.g., the lowest LQ value or throughput value) in the BSS1, for example, a coupled device 504b, to leave the BSS1. Note that a disconnection-requesting message is preferred to be transmitted through a packet of a layer higher than an IP layer, so as to separate from a case of disconnecting in a regular sequence (i.e., in a case of transmitting a frame for disconnecting through a MAC layer).

Upon receiving the message for disconnection from the central control device 501, the coupled device 504b disconnects millimeter-wave wireless communication from the central control device 501. Further, the coupled device 504b performs scanning of a BSS via millimeter-wave wireless communication and, in a case of detecting a BSS other than the BSS1, the coupled device 504b becomes coupled to the detected BSS.

Contrarily, in a case of not detecting any BSSs other than the BSS1, the coupled device 504b starts operating as a distributed control device 502a, as illustrated in FIG. 24B, to form a new BSS2.

Note that, in a case where the AP forming the BSS1 is a distributed control device 502, the distributed control device 502 provides the central control device 501 with information about all of the communication devices 700 coupled to the BSS1, upon a change of communication devices 700 connected to the BSS1 or a change in the number of communication devices 700 connected to the BSS1.

FIG. 25 is a sequence diagram illustrating an example of the process for a communication device to join the communication system according to the second embodiment. Note that, as the processing of Steps S1401 trough S1406 of FIG. 25 is the same as the processing for a communication device to newly join the communication system according to the first embodiment, which is illustrated in FIG. 14, the following description mainly explains differences from the processing illustrated in FIG. 14.

At Step S2501, a communication device 700 starts operating as a coupled device 504a.

At Step S2502, the coupled device number managing unit 829 of a distributed control device 502-1 checks the number of communication devices 700 coupled to the distributed control device 502-1. Further, the coupled device number managing unit 829 divaricates subsequent processing, based on the number of communication devices 700 coupled to the distributed control device 502-1.

In a case where the number of communication devices 700 coupled to the distributed control device 502-1 is smaller than the above-explained connection acceptable number, the coupled device number managing unit 829 of the distributed control device 502-1 provides the central control device 501 with information indicative of the number of communication devices 700 coupled to the distributed control device 502-1.

Contrarily, in a case where the number of communication devices 700 coupled to the distributed control device 502-1 is equal to or greater than the above-explained connection acceptable number, the coupled device number managing unit 829 provides a request for leaving the BSS to the communication device 700 having the poorest communication quality, for example, a coupled device 504b.

At Step S2505, the coupled device 504b disconnects millimeter-wave wireless communication from the distributed control device 502-1.

At Step S2506, the coupled device number managing unit 829 of the distributed control device 502-1 utilizes wireless LAN communication for providing the central control device 501 with information indicative of a change of communication devices 700 coupled to the distributed control device 502-1.

At Step S2507, in a case of not detecting any BSSs other than the BSS formed by the distributed control device 502-1, the coupled device 504b starts operating as a distributed control device 502a to form a new BSS2.

Through the above processing, a distributed control device 502 (or the central control device 501) controls the number of multiple communication devices 700 in the self-formed BSS to be equal to or smaller than a connection acceptable number, while keeping communication devices 700 having better communication quality.

Third Embodiment

As the third embodiment, the following description explains a case where the central control device 501 adjusts the number of communication devices 700 in each BSS of millimeter-wave wireless communication.

FIGS. 26A and 26B are drawings for explaining a process for adjusting the number of coupled devices according to the third embodiment.

In a millimeter-wave wireless communication network, times of transferring data between BSSs through a relay device 503 is preferred to be fewer. This is because throughput of multi-hop communication is decreased inversely with an increase of times of transferring data between BSSs through a relay device 503, as transferring data between BSSs through a relay device 503 takes comparatively more time.

Therefore, in a millimeter-wave wireless communication network, a smaller number of BSSs may be preferred, for example. Additionally, it is preferred that the number of communication devices 700 assigned to be coupled to each BSS is approximately equal.

In the case of FIG. 26A, eight coupled devices 504 are coupled via millimeter-wave wireless communication to a distributed control device 502a forming a BSS1, and three coupled devices 504 are coupled via millimeter-wave wireless communication to a distributed control device 502b forming a BSS2. In the case of FIG. 26A, among the eight coupled devices 504 coupled to the distributed control device 502a, three coupled devices 504 are connectable to the distributed control device 502b as well.

In the above case, a central control device 501 according the present embodiment may, for example, request the distributed control device 502a forming the BSS1, which is coupled by a large number of coupled devices 504, to decrease the number of coupled devices 504.

Further, upon being requested for decreasing the number of coupled devices 504, the distributed control device 502a may, for example, select a coupled device 504 as an exclusion target from among the three coupled devices 504, which are candidates for moving to the BSS2, and then requests the selected coupled device 504 to move.

The coupled device 504a, which is requested for moving from the BSS1, disconnects millimeter-wave wireless communication from the distributed control device 502a, and then becomes coupled to the distributed control device 502b forming the BSS2, for example.

In the communication system 500 according to the present embodiment, a central control device 501 is able to manage the number of coupled devices 504 coupled to each BSS in the above way.

(Process Performed by the Central Control Device)

FIG. 27 is a flowchart illustrating an example of a process performed by the central control device according to the third embodiment.

At Step S2701, the network cell managing unit 816 of the central control device 501 selects a BSS that needs to decrease the number of coupled devices 504. For example, the network cell managing unit 816 selects a BSS corresponding to an AP (i.e., a distributed control device 502 or the central control device 501) having the largest value of "COUPLED DEVICE NUMBER" according to network cell information 1110 as illustrated in FIG. 11A.

At Step S2702, the network cell managing unit 816 of the central control device 501 selects a BSS to be moving-destination of a coupled device 504 selected as an exclusion target. For example, the network cell managing unit 816 may select, from among APs included in "AP THAT CAN BE RELAYED TO" according to the network cell information 1110 as illustrated in FIG. 11A, a BSS corresponding to an AP having the smallest value of "COUPLED DEVICE NUMBER".

At Step S2703, the network cell managing unit 816 requests the AP forming the BSS that needs to decrease the number of coupled devices 504 to exclude a coupled device 504.

Upon receiving a decreasing result from the AP requested for excluding the coupled device 504 at Step S2704, the network cell managing unit 816 updates network cell information as illustrated in FIG. 11A, at Step S2705.

(Process Performed in the Communication System)

FIG. 28 is a sequence diagram illustrating an example of the process for adjusting the number of coupled devices according to the third embodiment.

At Step S2801, the network cell managing unit 816 of the central control device 501 decides a BSS that needs to decrease the number of coupled devices 504 and a BSS to be moving-destination of a coupled device 504 to be selected as an exclusion target. The above step corresponds to Steps S2701 and 2702 in FIG. 27. Note that in a case of excluding multiple coupled devices from a BSS that needs to decrease the number of coupled devices, the network cell managing unit 816 may decide the number of coupled devices to be selected as exclusion targets as well.

At Step S2802, the network cell managing unit 816 of the central control device 501 utilizes wireless LAN communication (i.e., second wireless communication) for transmitting a decreasing request to an AP (e.g., a distributed control device 502a) forming a BSS that needs to decrease the number of coupled devices 504 for excluding a coupled device 504. The above step corresponds to Step S2703 in FIG. 27, etc.

At Step S2803, the coupled device number managing unit 829 of the distributed control device 502a, which has received the decreasing request, selects a coupled device 504a as an exclusion target, from among coupled devices 504 coupled to the distributed control device 502a via millimeter-wave wireless communication.

Here, for example, based on such device information 1120 as illustrated in FIG. 11B, the coupled device number managing unit 829 may determine that a communication device 700 without "YES" on the column of "RELAY DEVICE" is a coupled device 504 coupled to the distributed control device 502a via millimeter-wave wireless communication. Further, the coupled device number managing unit 829 divaricates processing, based on whether there is a communication device 700 without "YES" on the column of "RELAY DEVICE".

In a case where all communication devices 700 coupled to the distributed control device 502a are set as relay devices 503, the coupled device number managing unit 829 provides the central control device 501 with a decreasing result indicative of failure of decreasing, at Step S2804.

Contrarily, in a case where there is a coupled device 504a that is not set as a relay device 503 among the communication devices 700 coupled to the distributed control device 502a, the coupled device number managing unit 829 requests the coupled device 504a selected as the exclusion target to move from the BSS1, at Step S2805.

At Step S2806, the coupled device 504a, which has been requested to move from the BSS1, disconnects millimeter-wireless communication from the distributed control device 502a that forms the BSS1.

At Step S2807, the network cell information providing unit 912 of the distributed control device 502a provides the central control device 501 with a decreasing result including information indicative of the number of coupled devices 504 (i.e., communication devices 700) coupled to the distributed control device 502a.

At Step S2808, the coupled device 504a performs scanning of an AP via millimeter-wave wireless communication. Further, at Step S2809, the coupled device 504a becomes coupled to a BSS2 instead of the BSS1, from which the coupled device 504a has been requested to move.

At Step S2810, the network cell information providing unit 912 of the distributed control device 502b provides the central control device 501 with information (e.g., network cell information) including information indicative of the number of coupled devices 504 (i.e., communication devices 700) coupled to the distributed control device 502b.

Through the above processing, in the communication system 500 according to the present embodiment, the central control device 501 is able to manage the number of coupled devices 504 coupled to multiple BSSs via millimeter-wave wireless communication, such that, for example, an approximately equal number of coupled devices 504 are coupled to each BSS.

Note that, although the above processing is a method for the central control device 501 to automatically manage the number of coupled devices 504 coupled to multiple BSSs of millimeter-wave wireless communication, there may be a case where a user desires to select a communication device 700 to be moved or select a BSS to be moving-destination.

In the above case, network application of the communication device 700 may receive information indicative of a communication device 700 to be moved or a BSS to be moving-destination, from user application on an upper layer. Further, the network application of the communication device 700 may transmit request-information including information indicative of a communication device 700 selected by the user, a BSS to be moving-destination, etc., to the central control device 501.

Upon receiving the request-information, the central control device 501 transmits, based on the request-information, a decreasing request for excluding a coupled device 504, which includes information indicative of a communication device 700 selected as an exclusion target and a BSS to be moving-destination, to the distributed control device 502 to which the communication device 700 selected by the user is coupled.

Upon receiving the decreasing request for excluding a coupled device 504, the distributed control device 502 skips the process at Step S2803, and executes the process for excluding a coupled device 504.

For example, in a case where the selected communication device 700 is set as a relay device 503, the distributed control device 502 provides the central control device 501 with a decreasing result that is indicative of failure of decreasing. Contrarily, in a case where the selected communication device 700 is not set as a relay device 503, the distributed control device 502 requests the selected communication device 700 (i.e., coupled device 504) to move from the BSS.

The central control device 501 provides the communication device 700 that has transmitted the request, with the decreasing result, which is provided by the distributed control device 502 to which the decreasing request for excluding a coupled device 504 has been transmitted.

<Process for Forming a Network via Millimeter-wave Wireless Communication>

Next, the following description explains an overall process for forming a millimeter-wave wireless communication network, which includes the processes explained in the above embodiments.

FIG. 29 is a flowchart illustrating a flow of the process for forming a millimeter-wave wireless communication network according to an embodiment of the present invention.

After a central control device 501 starts operating at Step S2901, the process for forming a millimeter-wave wireless communication network is executed in a communication system 500, as illustrated at Step S2902 and following steps.

After a communication device 700 newly joins the communication system 500 at Step S2902, processes at Step S2903 and following steps are executed in the communication system 500. Contrarily, in a case where a communication device 700 does not newly join the communication system 500, processes at Step S2908 and following steps are executed in the communication system 500.

At Step S2903, a process for a communication device to newly join the communication system, according to the first embodiment, is executed in the communication system 500, as illustrated in FIGS. 14 and 15.

In a case where a new BSS is formed at Step S2904, a process at Step S2905 is executed in the communication system 500. Contrarily, in a case where a new BSS is not formed at Step S2904, a process at Step S2906 is executed in the communication system 500.

At Step S2905, the central control device 501 of the communication system 500 updates network topology of millimeter-wave wireless communication.

At Step S2906, the central control device 501 of the communication system 500 determines whether there is a need for adjusting the number of coupled devices 504. For example, in a case where the number of communication devices 700 coupled to each BSS is not the same, the central control device 501 may determine that there is a need for adjusting the number of coupled devices 504.

In a case where adjustment of the number of coupled devices 504 is determined to be needed, the central control device 501 executes, at Step S2907, a process for adjusting the number of coupled devices 504 as illustrated in FIGS. 27 and 28.

Contrarily, in a case where adjustment of the number of coupled devices 504 is not determined be needed, processing returns back to Step S2902, so as to repeat the same processing in the communication system 500.

Note that, in a case where a communication device 700 does not join the communication system 500 at Step S2902, processes that relate to leaving of a communication device 700 are executed in the communication system 500, as illustrated at Steps S2908 through S2912.

For example, in a case where a distributed control device 502 leaves the millimeter-wave wireless communication network (YES at Step S2910), a process at Step S2904 is executed in the communication system 500.

Further, in a case where a relay device 503 leaves the millimeter-wave wireless communication network (YES at Step S2911), a process at S2912 is executed in the communication system 500, so that a process for setting a relay device as illustrated in FIG. 16 is executed.

Note that in a case where a communication device 700 other than a distributed control device 502 and a relay device 503, i.e., a coupled device 504 leaves the millimeter-wave wireless communication network (NO at Step S2911), a process at Step S2906 is executed in the communication system 500.

Contrarily, in a case where a communication device 700 does not leave the millimeter-wave wireless communication network at Step S2908, a distributed control device 502 determines whether there is a change of a communication path.

In a case where there is a change of a communication path (i.e., in a case where there is a change in device information), the distributed control device 502 causes a process at Step S2912 to be executed, so as to execute a process for setting a relay device 503. Contrarily, in a case where there is not a change of a communication path (i.e., in a case where there is not a change in device information), the processing returns back to Step S2902, so as to repeat the same processing.

Through the above processing, in the communication system 500, after the central control device 501 starts operating, a system configuration as illustrated in FIGS. 5 and 6, etc., is automatically constructed, assigning each communication device 700 with a role of a distributed control device 502, a relay device 503, or a coupled device 504. Further, in a case where a situation of a communication device 700 changes, for example, by moving a communication device 700, the system configuration is automatically updated.

As described above, by use of the communication system 500 according to the present embodiments of the present invention, multi-hop communication among communication devices 700 is facilitated, by means of a millimeter-wave wireless communication network that is structured in combination of communication devices 700 for performing communication in a one-on-one or star network structure.

Further, the present invention is not limited to these embodiments, but various variations and modifications may be made without departing from the scope of the present invention.

The present application is based on Japanese priority application No. 2016-187777 filed on Sep. 27, 2016, with the Japanese Patent Office, the entire content of which is hereby incorporated by reference.

REFERENCE SIGNS LIST 500 communication system
501 central control device (i.e., information processing device)
502 distributed control device
503 relay device
504 coupled device
700 communication device
706 millimeter-wave wireless communication unit (i.e., first communication unit)
705 wireless LAN communication unit (i.e., second communication unit)
812 network cell information acquiring unit
814 communication-path deciding unit
815 transfer-destination information providing unit
823 device information acquiring unit
825 relay device selecting unit
826 relay device setting unit
828 data transferring unit
912 network cell information providing unit
914 device function control unit

The invention claimed is:

1. A communication system for performing multi-hop communication, the communication system comprising:
a plurality of communication devices, each of which includes a first communication unit for performing first wireless communication by use of a directional radio wave and a second communication unit for performing second wireless communication by use of a radio wave of a larger communication range than the first wireless communication, the plurality of communication devices being configured to utilize the first wireless communication for performing the multi-hop communication with each other; and
a central control device including the second communication unit for performing the second wireless communication, the central control device being configured to utilize the second wireless communication for managing a communication path of the multi-hop communication through which data is transferred, wherein
the plurality of communication devices include
a plurality of distributed control devices, each of which is configured to utilize the first wireless communication for forming a network cell to be coupled by at least one of the plurality of communication devices and for controlling the at least one of the plurality of communication devices to transfer the data via the first wireless communication, based on the communication path, and
at least one relay device configured to become coupled to a network cell formed by one of the plurality of distributed control devices and configured to utilize the first wireless communication for receiving the data from the one of the plurality of distributed control devices and transferring the data to another one of the plurality of distributed control devices;

the central control device utilizes the second wireless communication for controlling the plurality of distributed control devices located in the communication path to transfer the data, based on the communication path; and
each communication device of the plurality of communication devices
starts operating as a coupled device that is coupled to the network cell formed by one of the plurality of distributed control devices in a case where the network cell is detected via the first wireless communication, and
starts operating as the distributed control device to form the network cell via the first wireless communication in a case where the network cell formed by one of the plurality of distributed control devices is not detected via the first wireless communication.

2. The communication system according to claim 1, wherein the central control device includes the first communication unit for perfbrming the first wireless communication, and operates as one of the plurality of distributed control devices to form a network cell.

3. The communication system according to claim 1, wherein the central control device includes
a network cell information acquiring unit configured to utilize the second wireless communication for acquiring information about a network cell from each one of the plurality of distributed control devices,
a communication-path deciding unit configured to decide the communication path of the multi-hop communication, based on the information acquired by the network cell information acquiring unit, and
a transfer-destination information providing unit configured to utilize the second wireless communication for providing each one of the plurality of distributed control devices located in the communication path decided by the communication-path deciding unit with information about transfer-destination to which the each one the plurality of distributed control devices is to transfer the data through the multi-hop communication, the transfer-destination being another one of the plurality of distributed control devices or a network cell formed by the said another one of the plurality of distributed control devices.

4. The communication system according to claim 3, wherein the communication-path deciding unit defines a relation of connection of network cells formed via the first wireless communication, based on the information acquired by the network cell information acquiring unit, and
wherein, based on the defined relation of connection, a sequential order of network cells for transferring the data through the multi-hop communication is decided.

5. The communication system according to claim 1, wherein each one of the plurality of distributed control devices includes
a device information acquiring unit configured to acquire, from the at least one of the plurality of communication devices coupled to the network cell formed by the each one of the plurality of distributed control devices, device information including information about another one of the plurality of distributed control devices to which the at least one of the plurality of communication devices is able to become coupled via the first wireless communication, a relay device selecting unit configured to select, based on the device information acquired by the device information acquiring unit, a communication device that transfers the data via the first wireless communication to the said another one of the plurality of distributed control devices, from among the at least one of the plurality of communication devices coupled to the network cell formed by the each one of the plurality of distributed control devices, and a relay device setting unit configured to set the communication device selected by the relay device selecting unit to operate as one of the at least one relay device that receives the data from the each one of the plurality of distributed control devices and transfers the data to the said another one of the plurality of distributed control devices via the first wireless communication.

6. The communication system according to claim 5, wherein the device information includes information about communication quality of the first wireless communication between the each one of the plurality of distributed control devices and the at least one of the plurality of communication devices coupled to the network cell formed by the each one of the plurality of distributed control devices, and wherein the relay device selecting unit selects the communication device that transfers the data via the first wireless communication to the said another one of the plurality of distributed control devices, based on the information about communication quality.

7. The communication system according to claim 5, wherein each one of the plurality of distributed control devices includes a network cell information providing unit configured to utilize the second wireless communication for providing the central control device with the information about the network cell formed by the each one of the plurality of distributed control devices, and a data transferring unit configured to transfer the data for the multi-hop communication to one of the at least one relay device that transfers the data via the first wireless communication to the said another one of the plurality of distributed control devices, the data for the multi-hop communication being transferred based on the information about the transfer-destination to which the data is transferred through the multi-hop communication, the transfer-destination being the said another one of the plurality of distributed control devices, the information about the transfer-destination being provided by the central control device via the second wireless communication.

8. The communication system according to claim 5, wherein the relay device selecting unit executes a process for selecting a communication device that transfers the data to the said another one of the plurality of distributed control devices, the process being executed upon a change of the at least one of the plurality of communication devices coupled to the network cell formed by the each one of the plurality of distributed control devices or upon a change in a number of the at least one of the plurality of communication devices.

9. The communication system according to claim 1, wherein, in a case where at least one of the plurality of communication devices detects at least one network cell formed by one of the plurality of distributed control devices or the central control device, the at least one of the plurality of communication devices becomes coupled to one of the detected at least one network cell.

10. The communication system according to claim 9, wherein the at least one of the plurality of communication devices includes a device function control unit configured to cause the at least one of the plurality of communication devices to operate as one of the at least one relay device, upon being controlled by the central control device or by one of the plurality of distributed control devices forming the one of the at least one network cell to which the at least one of the plurality of communication devices is coupled via the first wireless communication.

11. The communication system according to claim 10, wherein the device function control unit causes the at least one of the plurality of communication devices to operate as one of the plurality of distributed control devices, in a case of not detecting, via the first wireless communication, any network cells formed by any one of the plurality of distributed control devices or the central control device.

12. The communication system according to claim 10, wherein the device function control unit utilizes the second wireless communication for providing the central control device with a request for creating a new network cell, in a case of not detecting, via the first wireless communication, any network cells formed by any one of the plurality of distributed control devices or the central control device, and wherein, in a case where permission-information for permitting creation of the new network cell is provided via the second wireless communication by the central control device, the device function control unit causes the at least one of the plurality of communication devices to operate as one of the plurality of distributed control devices.

13. The communication system according to claim 1, wherein the central control device includes a network cell managing unit configured to manage a number of network cells in the communication system, such that the number does not exceed a predetermined limit.

14. The communication system according to claim 13, wherein, upon receiving a request for creating a new network cell from the at least one of the plurality of communication devices via the second wireless communication, the network cell managing unit checks the number of network cells in the communication system, and wherein, in a case where the number of network cells in the communication system is smaller than the predetermined limit, the network cell managing unit utilizes the second wireless communication for providing the permission-information for permitting creation of the new network cell to the at least one of the plurality of communication devices from which the request has been provided.

15. The communication system according to claim 14, wherein the permission-information includes a communication channel or a network address of the first wireless communication to be used in the new network cell, and wherein the network cell managing unit provides the permission-information to the at least one of the plurality of communication devices from which the request has been provided, so as to designate the communication channel or the network address of the first wireless communication.

16. The communication system according to claim 1, wherein the central control device utilizes a predetermined path-controlling message for controlling the plurality of distributed control devices via the second wireless communication to transfer the data through the multi-hop communication, based on the communication path, and wherein each one of the plurality of distributed control devices interprets the predetermined path-controlling message received from the central control device to obtain an instruction from the central control device and, based on the instruction, controls the each one of the plurality of distributed control devices or the at least one of the plurality of communication devices coupled to the network cell formed by the each one of the plurality of distributed control devices to transfer the data through the multi-hop communication, based on the communication path.

17. A communication device comprising:

a first communication unit configured to perform first wireless communication by use of a directional radio wave; and a second communication unit configured to perform second wireless communication by use of a radio wave of a larger communication range than the first wireless communication, wherein, in a case where a network cell formed by a distributed control device is detected via the first wireless communication, the communication device starts operating as a coupled device that is coupled to the detected network cell, and wherein, in a case where a network cell formed by a distributed control device is not detected via the first wireless communication, the communication device starts operating as a distributed control device to form a network cell via the first wireless communication.

18. The communication device according to claim 17, wherein, when the communication device is operating as the coupled device, upon being controlled by the distributed control device forming the network cell via the first wireless communication, the communication device starts operating as a relay device that receives data from the distributed control device and transfers the data to another distributed control device via the first wireless communication.

19. A method for managing communication in a communication system for performing multi-hop communication, the communication system comprising:

a plurality of communication devices, each of which includes a first communication unit for performing first wireless communication by use of a directional radio wave and a second communication unit for performing second wireless communication by use of a radio wave of a larger communication range than the first wireless communication, the plurality of communication devices being configured to utilize the first wireless communication for performing the multi-hop communication with each other; and an information processing apparatus including the second communication unit for performing the second wireless communication, the information processing apparatus being configured to utilize the second wireless communication for managing a communication path of the multi-hop communication through which data is transferred, wherein the plurality of communication devices include a plurality of distributed control devices, each of which is configured to utilize the first wireless communication for forming a network cell to be coupled by at least one of the plurality of communication devices and for controlling the at least one of the plurality of communication devices to transfer the data via the first wireless communication, based on the communication path, and at least one relay device configured to become coupled to a network cell formed by one of the plurality of distributed control devices and configured to utilize the first wireless communication for receiving the data from the one of the plurality of distributed control devices and transferring the data to another one of the plurality of distributed control devices;

the information processing apparatus utilizes the second wireless communication for controlling the plurality of distributed control devices located in the communication path to transfer the data, based on the communication path; and each communication device of the plurality of communication devices starts operating as a coupled device that is coupled to the network cell formed by one of the plurality of distributed control devices in a case where the network cell is detected via the first wireless communication, and starts operating as the distributed control device to form the network cell via the first wireless communication in a case where the network cell formed by one of the plurality of distributed control devices is not detected via the first wireless communication.

20. A non-transitory computer-readable recording medium storing a program that causes a computer to execute a process performed in an information processing apparatus for implementing the method for managing communication according to claim 19.

* * * * *